(12) United States Patent
Konings

(10) Patent No.: US 11,873,078 B2
(45) Date of Patent: Jan. 16, 2024

(54) AIRCRAFT NACELLES HAVING ADJUSTABLE CHINES

(71) Applicant: The Boeing Company, Chicago, IL (US)

(72) Inventor: Christopher Andrew Konings, Lynnwood, WA (US)

(73) Assignee: The Boeing Company, Chicago, IL (US)

( * ) Notice: Subject to any disclaimer, the term of this patent is extended or adjusted under 35 U.S.C. 154(b) by 989 days.

(21) Appl. No.: 16/416,990

(22) Filed: May 20, 2019

(65) Prior Publication Data

US 2020/0369379 A1 Nov. 26, 2020

(51) Int. Cl.
*B64C 23/06* (2006.01)
*B64C 7/02* (2006.01)

(52) U.S. Cl.
CPC .............. *B64C 23/06* (2013.01); *B64C 7/02* (2013.01)

(58) Field of Classification Search
CPC ........... B64C 7/02; B64C 23/06; B64C 21/00; B64C 2009/005; F15D 1/003
See application file for complete search history.

(56) References Cited

U.S. PATENT DOCUMENTS

| | | |
|---|---|---|
| 3,652,036 A | 3/1972 | Sans et al. |
| 3,664,612 A | 5/1972 | Skidmore et al. |
| 3,756,529 A | 9/1973 | Backlund et al. |
| 3,770,228 A | 11/1973 | Traksel et al. |
| 4,296,900 A | 10/1981 | Krall |
| 4,540,143 A | 9/1985 | Wang et al. |
| 4,784,355 A | 11/1988 | Brine |
| 5,779,191 A | 7/1998 | Brislawn |
| 6,607,161 B1 | 8/2003 | Krysinski et al. |
| 6,685,143 B1 | 2/2004 | Prince et al. |
| 8,087,617 B2 | 1/2012 | Sclafani et al. |
| 8,205,430 B2 | 6/2012 | Jain |
| 8,579,230 B2 | 11/2013 | Diochon et al. |
| 9,169,779 B2 | 10/2015 | Winter |
| 9,422,915 B2 | 8/2016 | Eisenberg |
| 9,638,176 B2 * | 5/2017 | Shivashankara ........ B64C 23/06 |

(Continued)

FOREIGN PATENT DOCUMENTS

| | | |
|---|---|---|
| DE | 4029307 | 10/1991 |
| DE | 102015008813 | 1/2017 |

(Continued)

OTHER PUBLICATIONS

European Patent Office, "Extended European Search Report," issued in connection with European Patent Application No. 20175355.5, dated Oct. 20, 2020, 7 pages.

(Continued)

*Primary Examiner* — Joshua J Michener
*Assistant Examiner* — Colin Zohoori
(74) *Attorney, Agent, or Firm* — Hanley, Flight & Zimmerman, LLC

(57) ABSTRACT

Aircraft nacelles having adjustable chines are described. An example apparatus includes a multi-segment chine rotatably coupled to a nacelle. The multi-segment chine includes at least two segments. The at least two segments include a first segment and a second segment. The first segment and the second segment are independently rotatable relative to the nacelle about an axis of rotation.

22 Claims, 34 Drawing Sheets

(56) References Cited

U.S. PATENT DOCUMENTS

| | | | |
|---|---|---|---|
| 9,914,528 B2 | 3/2018 | Hirano et al. | |
| 10,259,574 B2 | 4/2019 | Beckman et al. | |
| 10,889,370 B2 | 1/2021 | Bushmire | |
| 11,072,416 B2 | 7/2021 | Goering et al. | |
| 11,174,004 B2 | 11/2021 | Dodt et al. | |
| 11,235,857 B2 | 2/2022 | Vijgen et al. | |
| 11,535,362 B2 | 12/2022 | Konings et al. | |
| 11,591,097 B2 | 2/2023 | Philipp et al. | |
| 11,613,345 B2 | 3/2023 | Philipp et al. | |
| 2007/0221789 A1 | 9/2007 | Lee et al. | |
| 2008/0267762 A1* | 10/2008 | Jain | F02K 3/00 415/2.1 |
| 2009/0266942 A1 | 10/2009 | Karem | |
| 2010/0038492 A1* | 2/2010 | Sclafani | B64C 23/06 244/199.1 |
| 2010/0051744 A1 | 3/2010 | Bonnaud et al. | |
| 2010/0176249 A1 | 7/2010 | Schwetzler | |
| 2010/0269511 A1 | 10/2010 | Vauchel | |
| 2011/0024556 A1* | 2/2011 | Cazals | B64C 23/076 244/99.12 |
| 2011/0110777 A1 | 5/2011 | Abdallah et al. | |
| 2011/0142664 A1 | 6/2011 | Anjuri et al. | |
| 2011/0315827 A1 | 12/2011 | Collins et al. | |
| 2012/0104161 A1 | 5/2012 | Shah | |
| 2015/0090356 A1 | 4/2015 | Clingman et al. | |
| 2015/0204306 A1 | 7/2015 | Herr et al. | |
| 2016/0083083 A1 | 3/2016 | Bordoley et al. | |
| 2016/0229526 A1* | 8/2016 | Hegenbart | B64C 9/02 |
| 2017/0152025 A1 | 6/2017 | Stefes et al. | |
| 2018/0016019 A1 | 1/2018 | Ramlaoui | |
| 2018/0290727 A1 | 10/2018 | Bays-Muchmore | |
| 2019/0002118 A1 | 1/2019 | Nestico et al. | |
| 2020/0156761 A1* | 5/2020 | Tillotson | B64C 3/58 |
| 2020/0369367 A1 | 11/2020 | Philipp et al. | |
| 2020/0369368 A1 | 11/2020 | Konings et al. | |
| 2020/0369377 A1 | 11/2020 | Konings et al. | |
| 2020/0369378 A1 | 11/2020 | Konings | |
| 2020/0369379 A1 | 11/2020 | Konings | |
| 2020/0369398 A1 | 11/2020 | Philipp et al. | |
| 2020/0391854 A1 | 12/2020 | Arana Hidalgo | |

FOREIGN PATENT DOCUMENTS

| | | |
|---|---|---|
| EP | 1992807 | 11/2008 |
| EP | 2853486 | 4/2015 |
| EP | 2944802 | 11/2015 |
| EP | 3446970 | 2/2019 |
| EP | 3750800 | 12/2020 |

OTHER PUBLICATIONS

European Patent Office, "Extended European Search Report," issued in connection with European Patent Application No. 22162620.3, dated Apr. 7, 2022, 8 pages.

United States Patent and Trademark Office, "Non-Final Office Action," issued in connection with U.S. Appl. No. 16/416,960, dated Jan. 13, 2021, 10 pages.

United States Patent and Trademark Office, "Final Office Action," issued in connection with U.S. Appl. No. 16/416,960, dated Mar. 19, 2021, 15 pages.

United States Patent and Trademark Office, "Non-Final Office Action," issued in connection with U.S. Appl. No. 16/416,960, dated May 11, 2021, 14 pages.

United States Patent and Trademark Office, "Final Office Action," issued in connection with U.S. Appl. No. 16/416,960, dated Jun. 9, 2021, 13 pages.

United States Patent and Trademark Office, "Notice of Allowance and Fee(s) Due," issued in connection with U.S. Appl. No. 16/416,960, dated Jul. 28, 2021, 9 pages.

United States Patent and Trademark Office, "Non-Final Office Action," issued in connection with U.S. Appl. No. 16/416,985, dated Feb. 24, 2021, 10 pages.

United States Patent and Trademark Office, "Notice of Allowance and Fee(s) Due," issued in connection with U.S. Appl. No. 16/416,985, dated Apr. 29, 2021, 7 pages.

United States Patent and Trademark Office, "Non-Final Office Action," issued in connection with U.S. Appl. No. 16/416,970, dated Feb. 25, 2021, 14 pages.

United States Patent and Trademark Office, "Final Office Action," issued in connection with U.S. Appl. No. 16/416,970, dated May 14, 2021, 14 pages.

United States Patent and Trademark Office, "Non-Final Office Action," issued in connection with U.S. Appl. No. 16/416,970, dated Jun. 8, 2021, 7 pages.

United States Patent and Trademark Office, "Notice of Allowance and Fee(s) Due," issued in connection with U.S. Appl. No. 16/416,970, dated Sep. 22, 2021, 8 pages.

United States Patent and Trademark Office, "Notice of Allowance and Fee(s) Due," issued in connection with U.S. Appl. No. 16/416,985, dated Jun. 10, 2021, 5 pages.

United States Patent and Trademark Office, "Advisory Action," issued in connection with U.S. Appl. No. 16/416,960, dated Apr. 22, 2021, 3 pages.

United States Patent and Trademark Office, "Non-Final Office Action," issued in connection with U.S. Appl. No. 16/417,136, dated Jul. 25, 2022, 12 pages.

United States Patent and Trademark Office, "Non-Final Office Action," issued in connection with U.S. Appl. No. 16/416,973, dated Jul. 21, 2022, 10 pages.

United States Patent and Trademark Office, "Non-Final Office Action," issued in connection with U.S. Appl. No. 16/417,039, dated Aug. 15, 2022, 8 pages.

United States Patent and Trademark Office, "Non-Final Office Action," issued in connection with U.S. Appl. No. 16/416,981, dated Jul. 29, 2022, 9 pages.

United States Patent and Trademark Office, "Non-Final Office Action," issued in connection with U.S. Appl. No. 16/417,104, dated Aug. 16, 2022, 10 pages.

United States Patent and Trademark Office, "Final Office Action," issued in connection with U.S. Appl. No. 16/417,136, dated Aug. 17, 2022, 14 pages.

United States Patent and Trademark Office, "Final Office Action," issued in connection with U.S. Appl. No. 16/416,973, dated Sep. 27, 2022, 12 pages.

United States Patent and Trademark Office, "Non-Final Office Action," issued in connection with U.S. Appl. No. 16/417,136, dated Oct. 20, 2022, 16 pages.

United States Patent and Trademark Office, "Final Office Action," issued in connection with U.S. Appl. No. 16/416,981, dated Sep. 29, 2022, 14 pages.

United States Patent and Trademark Office, "Notice of Allowance and Fee(s) Due," issued in connection with U.S. Appl. No. 16/417,104, dated Nov. 4, 2022, 7 pages.

United States Patent and Trademark Office, "Advisory Action," issued in connection with U.S. Appl. No. 16/416,973, dated Nov. 17, 2022, 3 pages.

United States Patent and Trademark Office, "Notice of Allowance and Fee(s) Due," issued in connection with U.S. Appl. No. 16/417,136, dated Dec. 9, 2022, 8 pages.

United States Patent and Trademark Office, "Non-Final Office Action," issued in connection with U.S. Appl. No. 16/416,973, dated Dec. 23, 2022, 15 pages.

United States Patent and Trademark Office, "Advisory Action," issued in connection with U.S. Appl. No. 16/416,981, dated Dec. 28, 2022, 3 pages.

United States Patent and Trademark Office, "Non-Final Office Action," issued in connection with U.S. Appl. No. 16/416,981, dated Jan. 18, 2023, 16 pages.

United States Patent and Trademark Office, "Final Office Action," issued in connection with U.S. Appl. No. 16/416,973, dated Jan. 13, 2023, 14 pages.

United States Patent and Trademark Office, "Corrected Notice of Allowablity," issued in connection with U.S. Appl. No. 16/417,136, dated Jan. 30, 2023, 3 pages.

(56) References Cited

OTHER PUBLICATIONS

United States Patent and Trademark Office, "Notice of Allowance and Fee(s) Due," issued in connection with U.S. Appl. No. 16/417,039, dated Feb. 2, 2023, 10 pages.
United States Patent and Trademark Office, "Supplemental Notice of Allowability," issued in connection with U.S. Appl. No. 16/416,985, dated Jun. 29, 2021, 2 Pages.
United States Patent and Trademark Office, "Supplemental Notice of Allowability," issued in connection with U.S. Appl. No. 16/416,970, dated Oct. 4, 2021, 3 Pages.
United States Patent and Trademark Office, "Supplemental Notice of Allowability," issued in connection with U.S. Appl. No. 16/416,960, dated Oct. 20, 2021, 3 Pages.
United States Patent and Trademark Office, "Advisory Action," issued in connection with U.S. Appl. No. 16/417,136, dated Sep. 20, 2022, 3 pages.
United States Patent and Trademark Office, "Supplemental Notice of Allowability," issued in connection with U.S. Appl. No. 16/417,104, dated Nov. 18, 2022, 2 Pages.
United States Patent and Trademark Office, "Supplemental Notice of Allowability," issued in connection with U.S. Appl. No. 16/417,039, dated Mar. 3, 2023, 3 pages.
United States Patent and Trademark Office, "Advisory Action," issued in U.S. Appl. No. 16/416,973, dated Mar. 15, 2023, 3 pages.
United States Patent and Trademark Office, "Notice of Allowance," issued in connection with U.S. Appl. No. 16/416,981, dated Apr. 19, 2023, 8 pages.
Canadian Intellectual Property Office, "Examination Report," issued in connection with Canadian Patent Application No. 3,080,914, dated Aug. 18, 2023, 4 pages.

* cited by examiner

AIRCRAFT NACELLES HAVING ADJUSTABLE CHINES

FIELD OF THE DISCLOSURE

This disclosure relates generally to aircraft nacelles having chines and, more specifically, to aircraft nacelles having adjustable chines.

BACKGROUND

On certain aircraft (e.g., commercial aircraft, transport aircraft, etc.), an engine of the aircraft is mounted in a nacelle that extends from a pylon located under a wing of the aircraft. Such aircraft may include any number (e.g., 2, 4, etc.) of wing-mounted nacelles. In many such aircraft, the leading edge of the nacelle is positioned forward of the leading edge of the wing. The high angle of attack lift capability of the wing is often limited by flow separation that occurs in the vicinity of the nacelle and the region downstream of the nacelle.

Aircraft manufacturers have addressed the above-described flow separation phenomenon by installing various vortex-generating devices such as chines on the outer surface of the nacelle. The chine is typically mounted on a side of the nacelle and is sized and positioned to control the separation of the flow over the wing by generating a vortex that interacts beneficially with a boundary layer of the upper surface of the wing in order to reduce flow separation. Although effective in improving wing lift capacity at high angles of attack, chines as conventionally installed possess certain deficiencies which detract from their overall utility. For example, because conventional chines are fixed in place on the nacelle and extend outwardly into the airflow, the chines produce unwanted aerodynamic drag that can have an adverse impact on the operating efficiency of the aircraft during cruise, takeoff and landing. The optimal chine design for delaying stall can be constrained due to the drag penalty just mentioned, or due to the need to ensure acceptable airplane pitch characteristics at angles of attack beyond stall.

More recently, aircraft manufacturers have considered implementing chines that are configured to generate a vortex at angles of attack for favorably interacting with the boundary layer of the upper surface of the wing to delay stall, and which are further configured to minimize (e.g., eliminate) the aerodynamic drag that traditionally has been caused by the chine during low angle-of-attack portions of flight, or to provide a nose-down pitching moment at very high, post-stall angles of attack. Known solutions have included chines that are rotatable relative to the nacelle between a deployed position (e.g., for flight conditions where vortex generation is desirable) and a stowed position (e.g., for flight conditions where vortex generation is undesirable). Known solutions have also included introducing a vortex-impeding spoiler door located forward of the chine, with the spoiler door being rotatable between a stowed position (e.g., for flight conditions where vortex generation is desirable) and a deployed position (e.g., for very high angle-of-attack flight conditions where vortex generation is undesirable).

SUMMARY

Aircraft nacelles having adjustable chines are disclosed herein. In some examples, an apparatus is disclosed. In some disclosed examples, the apparatus comprises a chine rotatably coupled to a nacelle. In some disclosed examples, the chine includes at least two segments. In some disclosed examples, the at least two segments include a first segment and a second segment. In some disclosed examples, the first segment and the second segment are independently rotatable relative to the nacelle about an axis of rotation.

In some examples, a method is disclosed. In some disclosed examples, the method comprises rotating a first segment of a chine. In some disclosed examples, the chine is rotatably coupled to a nacelle. In some disclosed examples, the chine has at least two segments including the first segment and a second segment. In some disclosed examples, the method further comprises rotating the second segment of the chine. In some disclosed examples, the first and second segments are independently rotatable relative to the nacelle about an axis of rotation.

Figure 1:
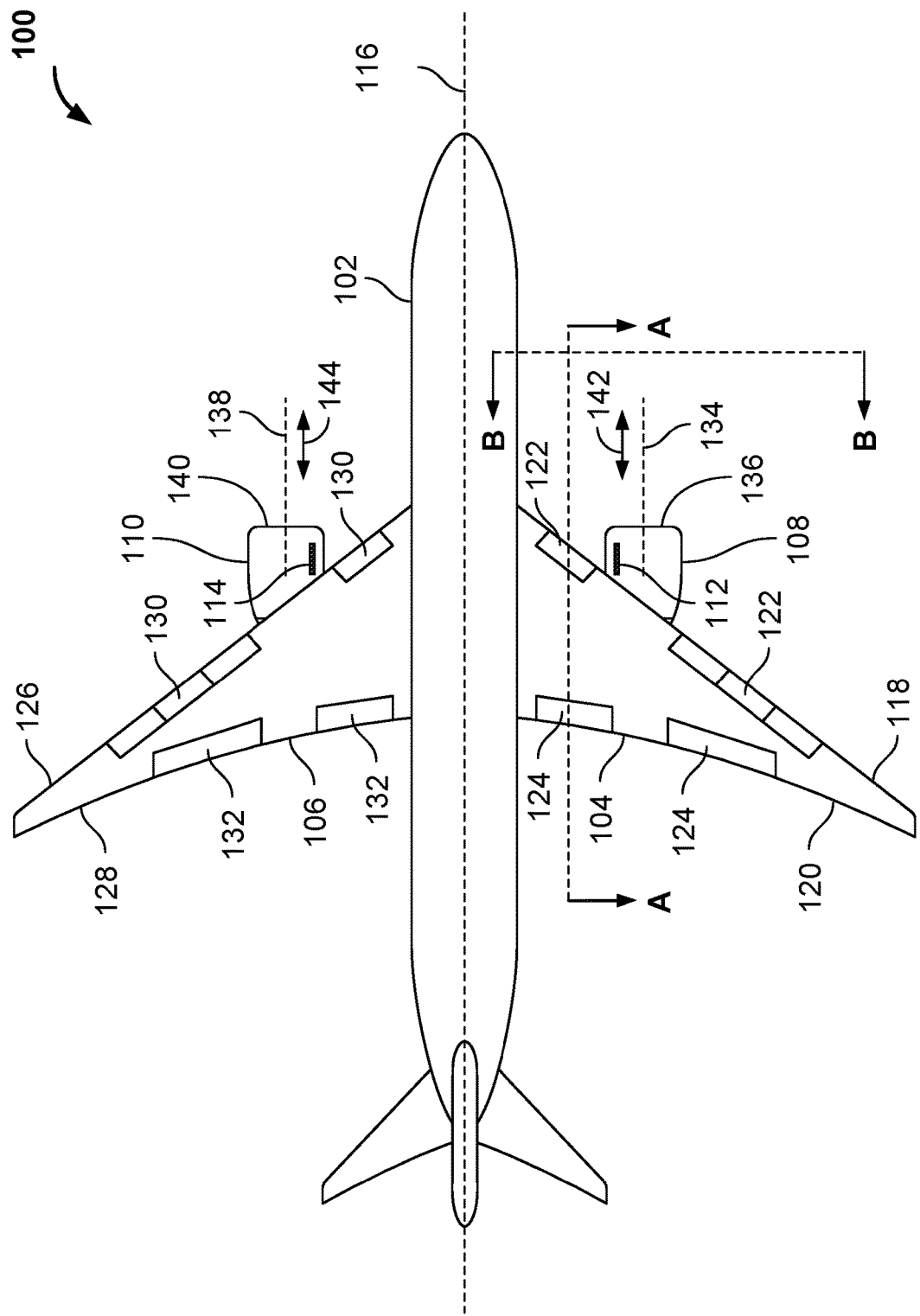
FIG. 1 illustrates an example aircraft in which an example nacelle having an example adjustable chine can be implemented in accordance with the teachings of this disclosure.

Certain examples are shown in the above-identified figures and described in detail below. In describing these examples, like or identical reference numbers are used to identify the same or similar elements. The figures are not necessarily to scale and certain features and certain views of the figures may be shown exaggerated in scale or in schematic for clarity and/or conciseness.

Descriptors "first," "second," "third," etc. are used herein when identifying multiple elements or components which may be referred to separately. Unless otherwise specified or understood based on their context of use, such descriptors are not intended to impute any meaning of priority or ordering in time but merely as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Aircraft manufacturers have considered implementing chines that are attached to engine nacelles and configured to generate a vortex at angles of attack for favorably interacting with the boundary layer of the upper surface of the wing to delay stall, and which are further configured to minimize (e.g., eliminate) the aerodynamic drag that traditionally has been caused by the chine during low angle-of-attack portions of flight, or to affect the airplane pitching moment characteristics at angles of attack above stall. Known solutions have included chines that are rotatable relative to the nacelle between a deployed position (e.g., for flight conditions where vortex generation is desirable) and a stowed position (e.g., for flight conditions where vortex generation is undesirable). Known solutions have also included introducing a vortex-impeding spoiler door located forward of the chine, with the spoiler door being rotatable between a stowed position (e.g., for flight conditions where vortex generation is desirable) and a deployed position (e.g., for flight conditions where vortex generation is undesirable).

While the above-described nacelle chine implementations represent considerable advancements to the state of the art, one shortcoming of such known chine implementations is that they lack an ability to actively adjust and/or tune (e.g., granularly adjust and/or tune) the position of the generated vortex during flight. Another shortcoming of such known chine implementations is that they provide only near-binary control (e.g., on or off) of the strength of the generated vortex during flight. Unlike the known solutions and/or known chine implementations described above, aircraft nacelles having adjustable chines disclosed herein advantageously provide the ability to actively adjust and/or tune (e.g., granularly adjust and/or tune) the position and/or the strength of a vortex generated by the chine during flight, thereby improving near-stall pitch control of the aircraft and increasing the maximum coefficient of lift associated with the wings of the aircraft.

As used herein in the context of describing the position and/or orientation of a first object relative to a second object, the term "substantially parallel" encompasses the term parallel and more broadly encompasses a meaning whereby the first object is positioned and/or oriented relative to the second object at an absolute angle of no more than ten degrees (10°) from parallel. For example, a first axis that is substantially parallel to a second axis is positioned and/or oriented relative to the second axis at an absolute angle of no more than ten degrees (10°) from parallel. As another example, a planar surface of a first chine that is substantially parallel to a planar surface of a second chine is positioned and/or oriented relative to the planar surface of the second chine at an absolute angle of no more than ten degrees (10°) from parallel. As another example, a planar surface of a first segment of a multi-segment chine that is substantially parallel to a planar surface of a second segment of the multi-segment chine is positioned and/or oriented relative to the planar surface of the second segment of the multi-segment chine at an absolute angle of no more than ten degrees (10°) from parallel.

As used herein in the context of describing the position and/or orientation of a first object relative to a second object, the term "substantially perpendicular" encompasses the term perpendicular and more broadly encompasses a meaning whereby the first object is positioned and/or oriented relative to the second object at an absolute angle of no more than ten degrees (10°) from perpendicular. For example, a first axis that is substantially perpendicular to a second axis is positioned and/or oriented relative to the second axis at an absolute angle of no more than ten degrees (10°) from perpendicular.

As used herein in the context of describing the position and/or orientation of a first object relative to a second object, the term "substantially coplanar" encompasses the term coplanar and more broadly encompasses a meaning whereby a planar surface of the first object is at least substantially parallel (as defined above) to an opposing planar surface of the second object, and whereby the planar surface of the first object can be offset from the opposing planar surface of the second object by a spacing (e.g., a tolerance) sufficient to enable the planar surface of the first object to slide past at least a portion of the opposing planar surface of the second object without interference, the offset not to exceed three times the combined width of the first and second objects. For example, a first chine that is substantially coplanar with and/or relative to a second chine has a planar surface that is at least substantially parallel to an opposing planar surface of the second chine, and that can be offset from the opposing planar surface of the second chine by a spacing (e.g., a tolerance) sufficient to enable the planar surface of the first chine to slide past at least a portion of the opposing planar surface of the second chine without interference, the offset not to exceed three times the combined width of the first and second chines. As another example, a first segment of a multi-segment chine that is substantially coplanar with and/or relative to a second segment of the multi-segment chine has a planar surface that is at least substantially parallel to an opposing planar surface of the second segment of the multi-segment chine, and that can be offset from the opposing planar surface of the second segment of the multi-segment chine by a spacing (e.g., a tolerance) sufficient to enable the planar surface of the first segment of the multi-segment chine to slide past at least a portion of the opposing planar surface of the second segment of the multi-segment chine without interference, the offset not to exceed three times the combined width of the first and second segments of the multi-segment chine.

FIG. 1 illustrates an example aircraft 100 in which an example nacelle having an example adjustable chine can be implemented in accordance with the teachings of this disclosure. The aircraft 100 includes an example fuselage 102, a first example wing 104, a second example wing 106, a first example nacelle 108, a second example nacelle 110, a first example chine 112, and a second example chine 114.

The fuselage 102 of FIG. 1 has a generally cylindrical shape that defines an example longitudinal axis 116 of the aircraft 100. The first wing 104 of FIG. 1 is coupled to the fuselage 102 and swept in a rearward direction of the aircraft 100. In other examples, the first wing 104 can alternatively be swept in a forward direction, or can alternatively be implemented in a straight wing configuration. The first wing 104 of FIG. 1 includes an example leading edge 118 and an example trailing edge 120. In some examples, the first wing 104 of FIG. 1 includes one or more leading edge device(s) 122 (e.g., one or more slat(s), slot(s), flap(s), etc.) mounted and/or positioned proximate the leading edge 118 of the first wing 104, and/or one or more trailing edge device(s) 124 (e.g., flap(s), aileron(s), spoiler(s), etc.) mounted and/or positioned proximate the trailing edge 120 of the first wing 104. The leading edge device(s) 122 and/or the trailing edge device(s) 124 can be moved to various positions relative to the first wing 104 to adjust the coefficient of lift generated by the first wing 104 relative to a local airflow.

The second wing 106 of FIG. 1 is coupled to the fuselage 102 and swept in a rearward direction of the aircraft 100. In other examples, the second wing 106 can alternatively be swept in a forward direction, or can alternatively be implemented in a straight wing configuration. The second wing 106 of FIG. 1 includes an example leading edge 126 and an example trailing edge 128. In some examples, the second wing 106 of FIG. 1 includes one or more leading edge device(s) 130 (e.g., one or more slat(s), slot(s), flap(s), etc.) mounted and/or positioned proximate the leading edge 126 of the second wing 106, and/or one or more trailing edge device(s) 132 (e.g., flap(s), aileron(s), spoiler(s), etc.) mounted and/or positioned proximate the trailing edge 128 of the second wing 106. The leading edge device(s) 130 and/or the trailing edge device(s) 132 can be moved to various positions relative to the second wing 106 to adjust the coefficient of lift generated by the second wing 106 relative to a local airflow.

The first nacelle 108 of FIG. 1 is coupled to the first wing 104. The first nacelle 108 of FIG. 1 includes an example central axis 134 and an example leading edge 136. In the illustrated example of FIG. 1, the central axis 134 of the first nacelle 108 is substantially parallel to the longitudinal axis 116 of the fuselage 102, and the leading edge 136 of the first nacelle 108 is substantially perpendicular to the central axis 134 of the first nacelle 108. In some examples, the central axis 134 of the first nacelle 108 is defined by a rotational axis of an engine housed by the first nacelle 108.

The second nacelle 110 of FIG. 1 is coupled to the second wing 106. The second nacelle 110 of FIG. 1 includes an example central axis 138 and an example leading edge 140. In the illustrated example of FIG. 1, the central axis 138 of the second nacelle 110 is substantially parallel to the longitudinal axis 116 of the fuselage 102, and the leading edge 140 of the second nacelle 110 is substantially perpendicular to the central axis 138 of the second nacelle 110. In some examples, the central axis 138 of the second nacelle 110 is defined by a rotational axis of an engine housed by the second nacelle 110.

The first chine 112 of FIG. 1 has a substantially planar shape that extends and/or is oriented along an example fore-aft direction 142. In some examples, the fore-aft direction 142 is defined by an outer mold line of the first chine 112. In some examples, the fore-aft direction 142 is substantially parallel to the central axis 134 of the first nacelle 108, and/or substantially parallel to the longitudinal axis 116 of the fuselage 102. In other examples, the orientation of the fore-aft direction 142 can exceed the above-described substantially parallel relationship(s) relative to the central axis 134 of the first nacelle 108 and/or the longitudinal axis 116 of the fuselage 102. In the illustrated example of FIG. 1, the first chine 112 is movably coupled to the first nacelle 108. For example, the first chine 112 can be movably coupled to the first nacelle 108 in a manner that enables movement (e.g., translation and/or rotation) of the first chine 112 relative to the first nacelle 108 along the fore-aft direction 142. The first chine 112 can be moved in a controlled manner to any number of positions over a possible range of positions of the first chine 112, as further described below. In the illustrated example of FIG. 1, the first chine 112 is coupled to the first nacelle 108 inboard of the central axis 134 of the first nacelle 108. In other examples, the first chine 112 can alternatively be coupled to the first nacelle 108 outboard of the central axis 134 of the first nacelle 108. Furthermore, multiple chines can be coupled to the first nacelle 108 in any arrangement (e.g., an arrangement whereby two or more chines are coupled inboard of the central axis 134, an arrangement whereby two or more chines are coupled outboard of the central axis 134, an arrangement whereby at least one chine is coupled inboard of the central axis 134 and at least one chine is coupled outboard of the central axis 134, etc.).

The second chine 114 of FIG. 1 has a substantially planar shape that extends and/or is oriented along an example fore-aft direction 144. In some examples, the fore-aft direction 144 is defined by an outer mold line of the second chine 114. In some examples, the fore-aft direction 144 is substantially parallel to the central axis 138 of the second nacelle 110, and/or substantially parallel to the longitudinal axis 116 of the fuselage 102. In other examples, the orientation of the fore-aft direction 144 can exceed the above-described substantially parallel relationship(s) relative to the central axis 138 of the second nacelle 110 and/or the longitudinal axis 116 of the fuselage 102. In the illustrated example of FIG. 1, the second chine 114 is movably coupled to the second nacelle 110. For example, the second chine 114 can be movably coupled to the second nacelle 110 in a manner that enables movement (e.g., translation and/or rotation) of the second chine 114 relative to the second nacelle 110 along the fore-aft direction 144. The second chine 114 can be moved in a controlled manner to any number of positions over a possible range of positions of the second chine 114, as further described below. In the illustrated example of FIG. 1, the second chine 114 is coupled to the second nacelle 110 inboard of the central axis 138 of the second nacelle 110. In other examples, the second chine 114 can alternatively be coupled to the second nacelle 110 outboard of the central axis 138 of the second nacelle 110. Furthermore, multiple chines can be coupled to the first nacelle 108 in any arrangement (e.g., an arrangement whereby two or more chines are coupled inboard of the central axis 134, an arrangement whereby two or more chines are coupled outboard of the central axis 134, an arrangement whereby at least one chine is coupled inboard of the central axis 134 and at least one chine is coupled outboard of the central axis 134, etc.).

The aircraft 100 of FIG. 1 further includes one or more control system(s) configured to control the respective movements of the first chine 112 and the second chine 114. The control system(s) can respectively and/or collectively include, for example, one or more actuation mechanism(s), one or more controller(s), one or more angle of attack sensor(s), one or more leading edge device sensor(s), and one or more trailing edge device sensor(s). In some examples, the control system(s) can additionally or alternatively include one or more other sensor(s) for detecting one or more other parameter(s) including, for example, aircraft attitude, altitude, airspeed, Mach number, icing conditions, etc. The actuation mechanism(s) of the control system can be located (e.g., partially or fully located) within and/or on the first nacelle 108 and/or the second nacelle 110 of the aircraft 100 of FIG. 1, and may include portions and/or components located within and/or on the first wing 104, the second wing 106, and/or the fuselage 102 of the aircraft 100. The controller(s) of the control system can be located within and/or on any of the first nacelle 108, the second nacelle 110, the first wing 104, the second wing 106, and/or the fuselage 102 of the aircraft 100. The angle of attack sensor(s) of the control system can be located within and/or on any of the first nacelle 108, the second nacelle 110, the first wing 104, the second wing 106, and/or the fuselage 102 of the aircraft 100. The leading edge device sensor(s) of the control system can be located within and/or on the leading edge device(s) 122 of the first wing 104 and/or the leading edge device(s) 130 of the second wing 106 of the aircraft 100, within and/or on the first wing 104 and/or the second wing 106 of the aircraft 100, and/or within and/or on the fuselage 102 of the aircraft 100. The trailing edge device sensor(s) of the control system can be located within and/or on the trailing edge device(s) 124 of the first wing 104 and/or the trailing edge device(s) of the second wing 106 of the aircraft 100, within and/or on the first wing 104 and/or the second wing 106 of the aircraft 100, and/or within and/or on the fuselage 102 of the aircraft 100. The other sensor(s) (e.g., for detecting aircraft attitude, altitude, airspeed, Mach number, etc.) of the control system can be located within and/or on any of the first nacelle 108, the second nacelle 110, the first wing 104, the second wing 106, and/or the fuselage 102 of the aircraft 100.

The actuation mechanism(s) of the control system can be implemented by and/or as any type of actuation mechanism that is capable of being configured to fit partially and/or fully within and/or on the first nacelle 108 and/or the second nacelle 110 of the aircraft 100 of FIG. 1, and which is capable of being configured to move (e.g., translate and/or rotate) the first chine 112 and/or the second chine 114 of the aircraft 100 over a desired and/or specified range of positions. In some examples, the actuation mechanism(s) can be implemented by and/or as an electro-mechanical actuation system that includes one or more electronic component(s). In other examples, the actuation mechanism(s) can be implemented by and/or as a hydro-mechanical actuation system that includes one or more hydraulic component(s). In still other examples, the actuation mechanism(s) can be implemented by and/or as a pneumatic-mechanical actuation system that includes one or more pneumatic component(s). The actuation mechanism(s) can include any number of mechanical components including, for example, any number of motors, valves, latches, pistons, rods, shafts, links, pulleys, chains, belts, hinges, pins, biasing elements, shape memory alloys, etc.

The controller(s) of the control system can be implemented by and/or as any type of hardware element capable of being configured to control the actuation mechanism(s) of the control system, and/or capable of being configured to receive and/or process data sensed, measured and/or detected by the angle of attack sensor(s), the leading edge device sensor(s), the trailing edge device sensor(s), and/or any other sensor(s) used by the control system. The controller(s) can be implemented by one or more controller(s), processor(s), microcontroller(s), microprocessor(s), and/or circuit(s).

The angle of attack sensor(s) of the control system is/are configured to sense, measure and/or detect the angle of attack of the first wing 104 and/or the angle of attack of the second wing 106 of the aircraft 100 of FIG. 1 (e.g., the angle between the chord line of the aircraft wing and the relative direction of airflow against the aircraft wing), or the angle of attack relative to the fuselage 102 of the aircraft 100 (e.g., the angle between the fuselage centerline and the relative direction of airflow against the fuselage). The leading edge device sensor(s) of the control system is/are configured to sense, measure and/or detect the position(s) and/or angle(s) of the leading edge device(s) 122 of the first wing 104 and/or the position(s) and/or angle(s) of the leading edge device(s) 130 of the second wing 106 of the aircraft 100 of FIG. 1 (e.g., the position and/or angle of the leading edge device relative to a reference location and/or orientation of the aircraft wing). The trailing edge device sensor(s) of the control system is/are configured to sense, measure and/or detect the position(s) and/or angle(s) of the trailing edge device(s) 124 of the first wing 104 and/or the position(s) and/or angle(s) of the trailing edge device(s) 132 of the second wing 106 of the aircraft 100 of FIG. 1 (e.g., the position and/or angle of the trailing edge device relative to a reference location and/or orientation of the aircraft wing). The other sensor(s) (e.g., for detecting aircraft attitude, altitude, airspeed, Mach number, etc.) of the control system is/are configured to sense, measure and/or detect one or more other parameter(s) including, for example, an attitude of the aircraft 100, an altitude of the aircraft 100, an airspeed of the aircraft 100, a Mach number of the aircraft 100, etc.

The first chine 112 and/or the second chine 114 can be moved (e.g., translated and/or rotated, depending upon the implementation of the first chine 112 and/or the second chine 114) in a controlled manner to any number of positions over a possible range of positions of the first chine 112 and/or the second chine 114. The controlled movement(s) (e.g., translation(s) and/or rotation(s)) of the first chine 112 and/or the second chine 114 occur(s) via the actuation mechanism(s) of the control system, with the actuation mechanism(s) being managed and/or controlled via the controller(s) of the control system. The controller(s) generate(s) and/or transmit(s) one or more command(s) that cause(s) the actuation mechanism(s) to move (e.g., translate and/or rotate) the first chine 112 and/or the second chine 114 to one or more position(s) (e.g., a forward position, a rearward position, an upward position, a downward position, a stowed position, a deployed position, an upward-pitched position, a downward-pitched position, any number of intermediate positions over a possible range of positions, etc.) specified by, indicated by, and/or derived from the command(s).

In some examples, the controller(s) is/are configured to generate one or more command(s) that cause(s) the actuation mechanism(s) to move the first chine 112 and/or the second chine 114 to a specified position in response to the controller(s) determining and/or detecting that a threshold parameter associated with an angle of attack (or other suitable aircraft attitude parameters) has been sensed, measured and/or detected by one or more of the angle of attack sensor(s). In some examples, the controller(s) is/are configured to generate one or more command(s) that cause(s) the actuation mechanism(s) to move the first chine 112 and/or the second chine 114 to a specified position in response to the controller(s) determining and/or detecting that a threshold parameter associated with a position and/or an angle of one or more of the leading edge device(s) 122 of the first wing 104 and/or a position of one or more of the leading edge device(s) 130 of the second wing 106 has/have been sensed, measured and/or detected by the leading edge device sensor(s). In some examples, the controller(s) is/are configured to generate one or more command(s) that cause(s) the actuation mechanism(s) to move the first chine 112 and/or the second chine 114 to a specified position in response to the controller(s) determining and/or detecting that a threshold parameter associated with a position and/or an angle of one or more of the trailing edge device(s) 124 of the first wing 104 and/or a position of one or more of the trailing edge device(s) 132 of the second wing 106 has/have been sensed, measured and/or detected by the trailing edge device sensor(s). In some examples, the controller(s) is/are configured to generate one or more command(s) that cause(s) the actuation mechanism(s) to move the first chine 112 and/or the second chine 114 to a specified position in response to the controller(s) determining and/or detecting that one or more threshold parameter(s) associated with an attitude of the aircraft 100, an altitude of the aircraft 100, an airspeed of the aircraft 100, a Mach number of the aircraft 100, etc. has/have been sensed, measured and/or detected by one or more of the other sensor(s).

Figure 2:
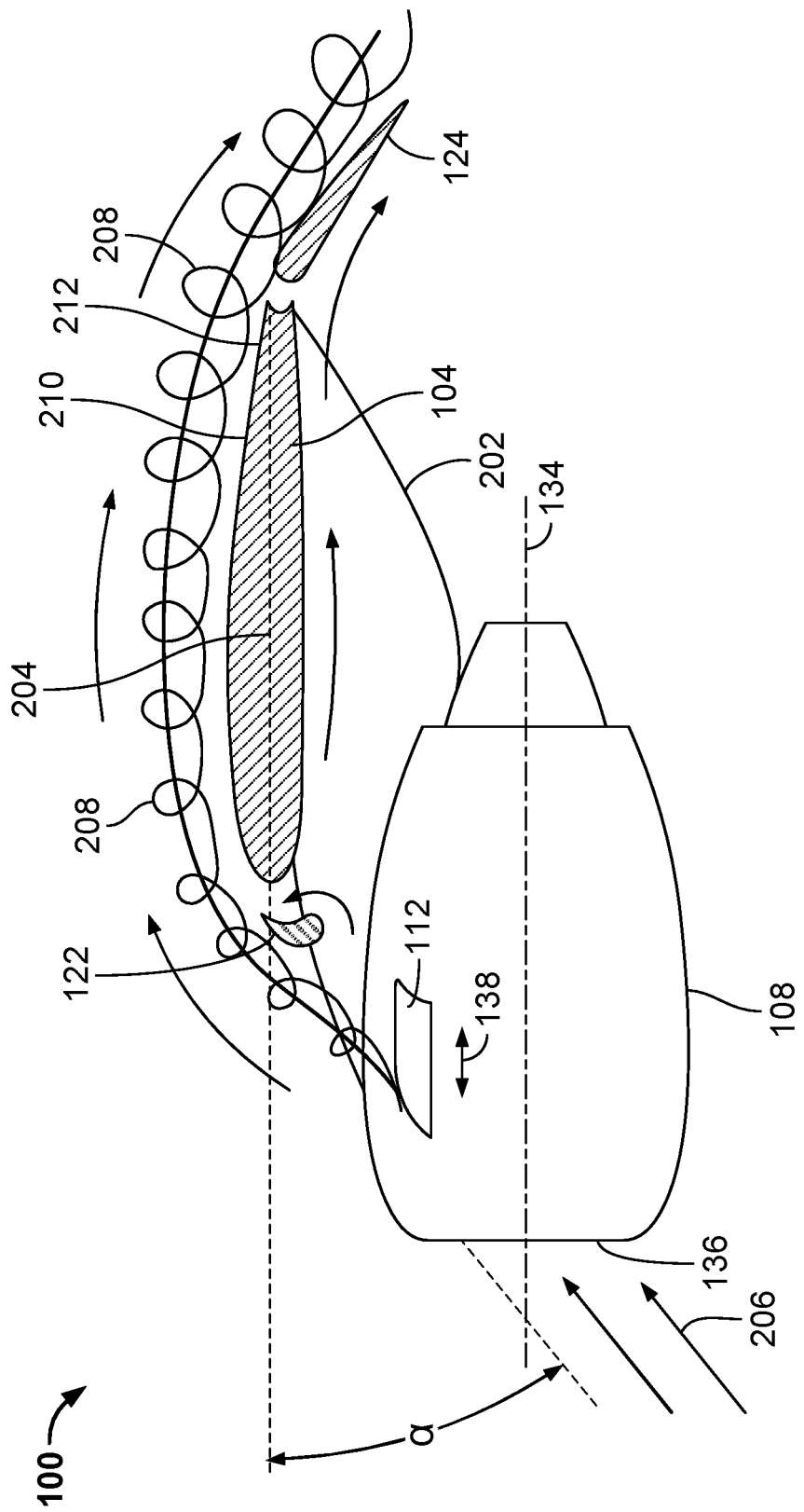
FIG. 2 is an outboard-looking side view of the aircraft of FIG. 1 taken along section A-A of FIG. 1.
Figure 3:
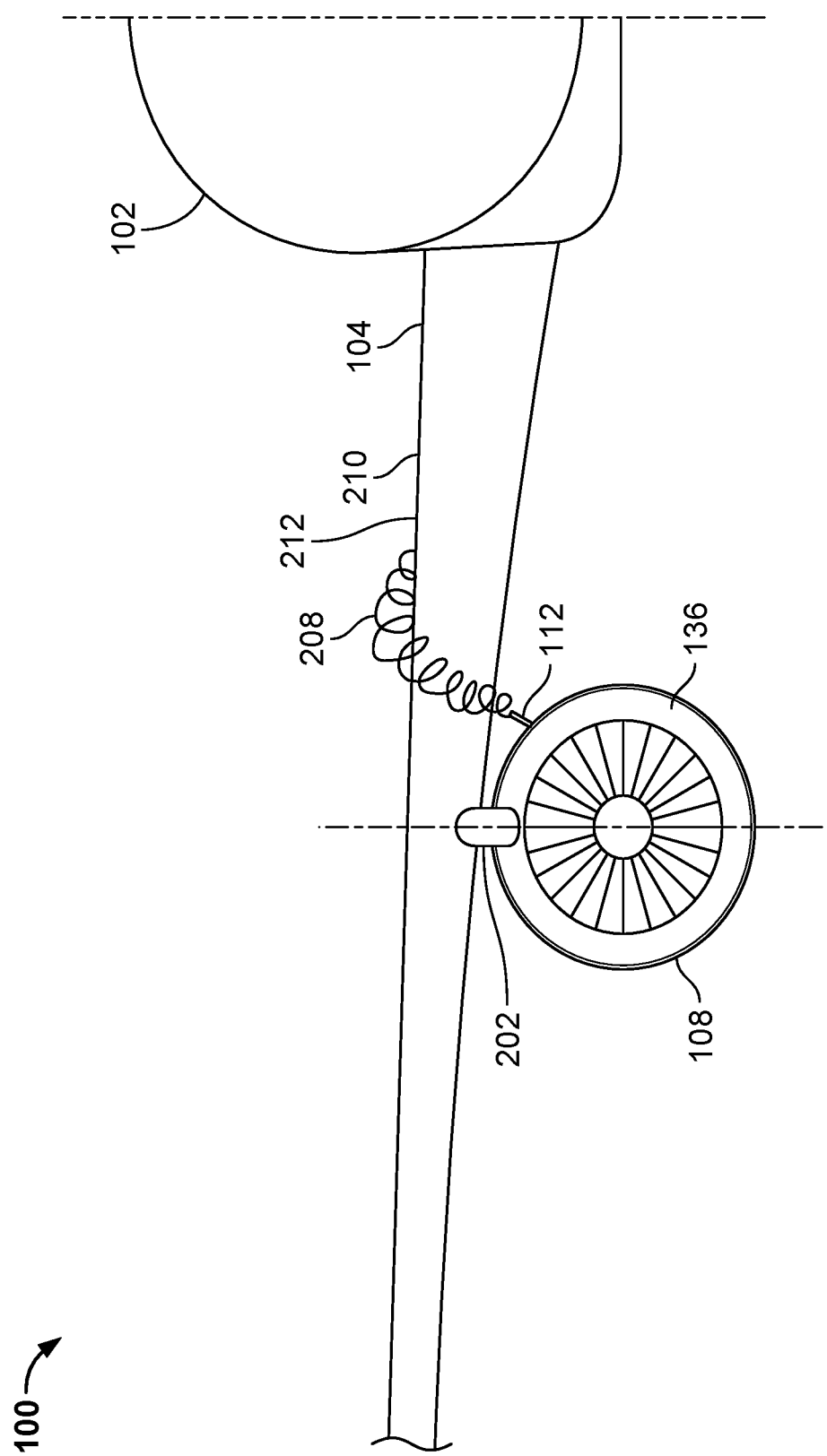
FIG. 3 is a rearward-looking front view of the aircraft of FIGS. 1 and 2 taken along section B-B of FIG. 1.

FIG. 2 is an outboard-looking side view of the aircraft 100 of FIG. 1 taken along section A-A of FIG. 1. FIG. 3 is a rearward-looking front view of the aircraft 100 of FIGS. 1 and 2 taken along section B-B of FIG. 1. As shown in FIGS. 2 and 3, the first nacelle 108 of the aircraft 100 is coupled to the first wing 104 of the aircraft 100 via an example pylon 202 that extends downward and forward from an underside of the first wing 104. The leading edge 136 of the first nacelle 108 is located forward of the leading edge 118 of the first wing 104. The first wing 104 has an example chord line 204. An angle of attack (α) of the first wing 104 is defined as the angle between the chord line 204 of the first wing 104 and the relative direction of an example airflow 206 against the first wing 104.

In the illustrated example of FIGS. 2 and 3, the first chine 112 is configured (e.g., sized, shaped, and oriented on the first nacelle 108) to generate an example vortex 208 that passes over an example upper surface 210 of the first wing 104 to interact with the wing upper surface flow field. The vortex 208 generated by the first chine 112 is configured to delay flow separation and/or stall, and thereby improves the maximum lift capability of the first wing 104 by interacting with an example boundary layer 212 of the upper surface 210 of the first wing 104.

The vortex 208 generated by the first chine 112 changes (e.g., changes its position and/or its strength) as the first chine 112 is moved (e.g., translated and/or rotated) in a controlled manner relative to the first nacelle 108 between a first position (e.g., a forward position, an upward position, a deployed position, etc.) and a second position (e.g., a rearward position, a downward position, a stowed position, etc.). For example, when the first chine 112 is positioned in a first position (e.g., a forward position, an upward position, a deployed position, etc.), the first chine 112 is configured to generate a first vortex. When the first chine 112 is positioned in a second position (e.g., a rearward position, a downward position, a stowed position, etc.) that differs from the first position, the first chine 112 is configured to generate a second vortex that differs from the first vortex. In some examples, the first vortex has a first associated vortex position, and the second vortex has a second associated vortex position that differs from the first associated vortex position. In some examples, the first vortex has a first associated vortex strength, and the second vortex has a second associated vortex strength that differs from the first associated vortex strength. The first chine 112 is capable of actively adjusting and/or tuning (e.g., granularly adjusting and/or tuning) the position and/or the strength of the vortex 208 generated by the first chine 112 during flight, thereby improving near-stall and post-stall pitch control of the aircraft 100 and increasing the maximum coefficient of lift associated with the first wing 104 of the aircraft 100.

Figure 4:
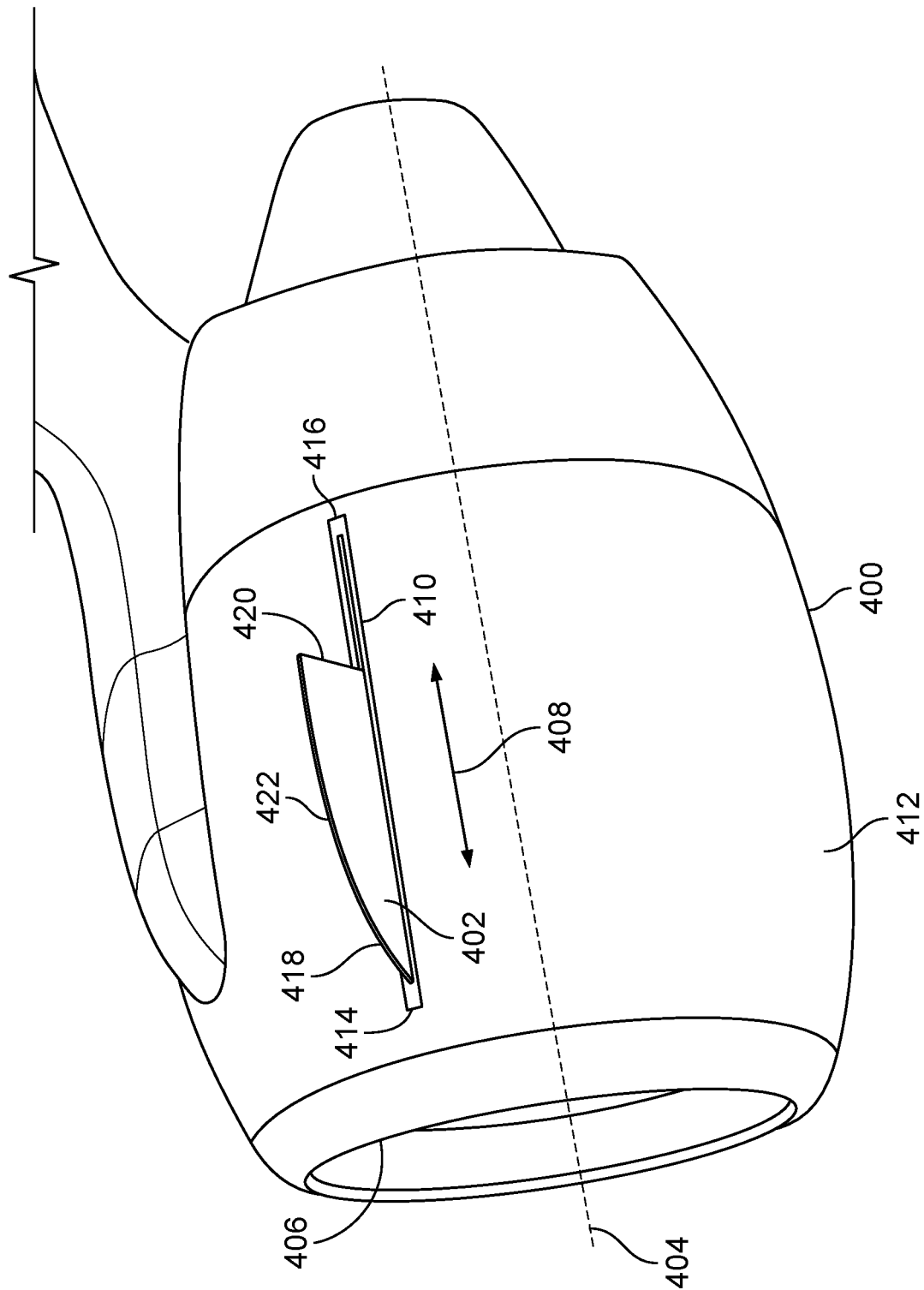
FIG. 4 is a perspective view of an example nacelle having an example chine positioned in a first example position.
Figure 5:
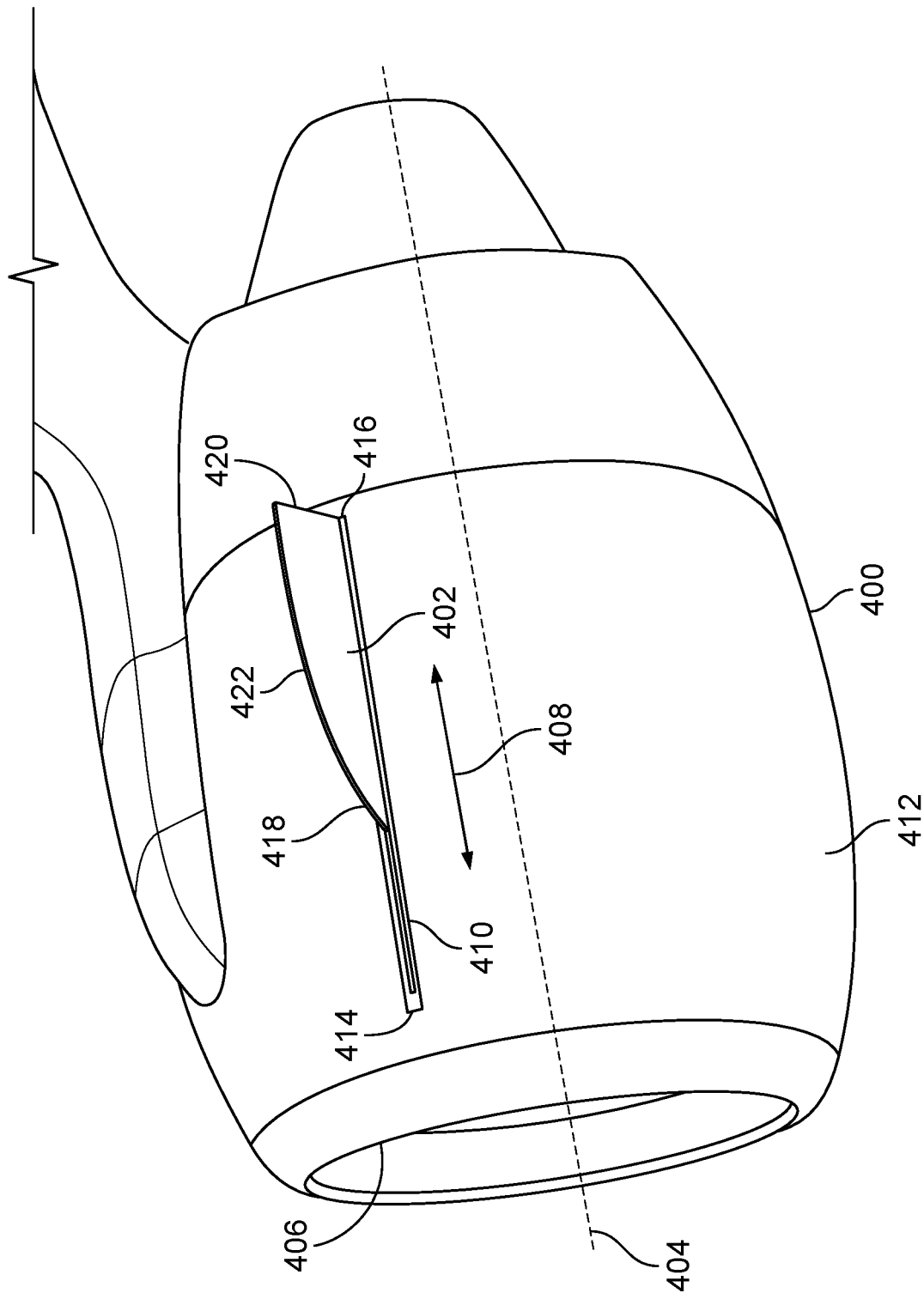
FIG. 5 is a perspective view of the nacelle of FIG. 4 having the chine of FIG. 4 positioned in a second example position.

FIG. 4 is a perspective view of an example nacelle 400 having an example chine 402 positioned in a first example position. FIG. 5 is a perspective view of the nacelle 400 of FIG. 4 having the chine 402 of FIG. 4 positioned in a second example position. The nacelle 400 of FIGS. 4 and 5 can be coupled to a wing of an aircraft (e.g., the first wing 104 of the aircraft 100 of FIGS. 1-3). The chine 402 of the nacelle 400 of FIGS. 4 and 5 can be controlled and/or adjusted by a control system of an aircraft (e.g., the control system 3400 of FIG. 34 described below, which may be implemented in the aircraft 100 of FIGS. 1-3).

The nacelle 400 of FIGS. 4 and 5 includes an example central axis 404 and an example leading edge 406. The chine 402 of FIGS. 4 and 5 is oriented along an example fore-aft direction 408 relative to the nacelle 400. In the illustrated example of FIGS. 4 and 5, the fore-aft direction 408 is defined by an outer mold line of the chine 402, as further described below. In some examples, the fore-aft direction 408 is substantially parallel to the central axis 404 of the nacelle 400, with the central axis 404 of the nacelle 400 being defined by a rotational axis of an engine housed by the nacelle 400. In other examples, the fore-aft direction 408 can additionally or alternatively be substantially parallel to a longitudinal axis of a fuselage of an aircraft (e.g., the longitudinal axis 116 of the fuselage 102 of the aircraft 100 of FIGS. 1-3) that includes the nacelle 400. In still other examples, the orientation of the fore-aft direction 408 can exceed the above-described substantially parallel relationship(s) relative to the central axis 404 of the nacelle 400 and/or the longitudinal axis of the fuselage of the aircraft. The nacelle 400 of FIGS. 4 and 5 further includes an example slot 410 formed in and/or extending through an example outer surface 412 of the nacelle 400. The slot 410 of the nacelle 400 includes an example front end 414 and an example rear end 416 located opposite and/or rearward of the front end 414. In the illustrated example of FIGS. 4 and 5, the slot 410 is oriented along the fore-aft direction 408.

The chine 402 of FIGS. 4 and 5 is coupled to the nacelle 400. For example, the chine 402 can include a root portion located inwardly (e.g., radially inwardly) relative to the outer surface 412 of the nacelle 400. The root portion of the chine 402 can be coupled (e.g., operatively coupled) to an actuation mechanism located within the nacelle 400. An exposed portion of the chine 402 extends outwardly (e.g., radially outwardly) relative to the outer surface 412 of the nacelle 400 through the slot 410. In the illustrated example of FIGS. 4 and 5, the chine 402 is coupled to the nacelle 400 at a location that is inboard relative to the central axis 404 of the nacelle 400. In other examples, the chine 402 can alternatively be coupled to the nacelle 400 at a location that is outboard relative to the central axis 404 of the nacelle 400.

The chine 402 of FIGS. 4 and 5 includes an example leading edge 418, an example trailing edge 420 located opposite and/or rearward of the leading edge 418 of the chine 402, and an example outer mold line 422 defined by the leading edge 418 and the trailing edge 420 of the chine 402. The chine 402 of FIGS. 4 and 5 has a substantially planar shape (e.g., as defined by the outer mold line 422) that extends and/or is oriented along the fore-aft direction 408. The chine 402 of FIGS. 4 and 5 is movable and/or adjustable relative to the slot 410 and/or, more generally, relative to the nacelle 400 of FIGS. 4 and 5 along the fore-aft direction 408. More specifically, the chine 402 of FIGS. 4 and 5 is translatable relative to the slot 410 and/or the nacelle 400 of FIGS. 4 and 5 along the fore-aft direction 408.

In the illustrated example of FIGS. 4 and 5, the chine 402 is movable (e.g., translatable) along the fore-aft direction 408 (e.g., within the slot 410 of the nacelle 400) between the first position (e.g., a forward position) shown in FIG. 4 and the second position (e.g., a rearward position) shown in FIG. 5. When the chine 402 is positioned in the first position shown in FIG. 4, the leading edge 418 of the chine 402 is spaced from the leading edge 406 of the nacelle 400 by a first distance, and the leading edge 418 of the chine 402 is proximate (e.g., adjacent or abutting) the front end 414 of the slot 410 of the nacelle 400. When the chine 402 is positioned in the second position shown in FIG. 5, the leading edge 418 of the chine 402 is spaced from the leading edge 406 of the nacelle 400 by a second distance greater than the first distance, and the trailing edge 420 of the chine 402 is proximate (e.g., adjacent or abutting) the rear end 416 of the slot 410 of the nacelle 400.

The chine 402 of FIGS. 4 and 5 can be moved (e.g., translated along the fore-aft direction 408) in a controlled manner to any number of intermediate positions between the first position shown in FIG. 4 and the second position shown in FIG. 5. The controlled movement (e.g., translation) of the chine 402 occurs via an actuation mechanism and a controller of a control system (e.g., the actuation mechanism 3404 and the controller 3406 of the control system 3400 of FIG. 34), as further described below.

The chine 402 of FIGS. 4 and 5 is configured (e.g., located on and/or oriented relative to the nacelle 400 of FIGS. 4 and 5) to generate a vortex in response to an airflow presented at the chine 402. In some examples, the vortex generated by the chine 402 favorably affects a boundary layer located on an upper surface of an aircraft wing to which the nacelle 400 of FIGS. 4 and 5 is coupled. Thus, the chine 402 provides a positive aerodynamic impact in response to an airflow presented at the chine 402. The vortex generated by the chine 402 of FIGS. 4 and 5 changes (e.g., changes its position and/or its strength) as the chine 402 is moved (e.g., translated along the fore-aft direction 408) between the first position (e.g., the forward position) shown in FIG. 4 and the second position (e.g., the rearward position) shown in FIG. 5.

For example, when the chine 402 is positioned in the first position shown in FIG. 4, the chine 402 is configured to generate a first vortex. When the chine 402 is positioned in the second position shown in FIG. 5, the chine 402 is configured to generate a second vortex that differs from the first vortex. In some examples, the first vortex has a first associated vortex position, and the second vortex has a second associated vortex position that differs from the first associated vortex position. In some examples, the first vortex has a first associated vortex strength, and the second vortex has a second associated vortex strength that differs from the first associated vortex strength.

Figure 6:
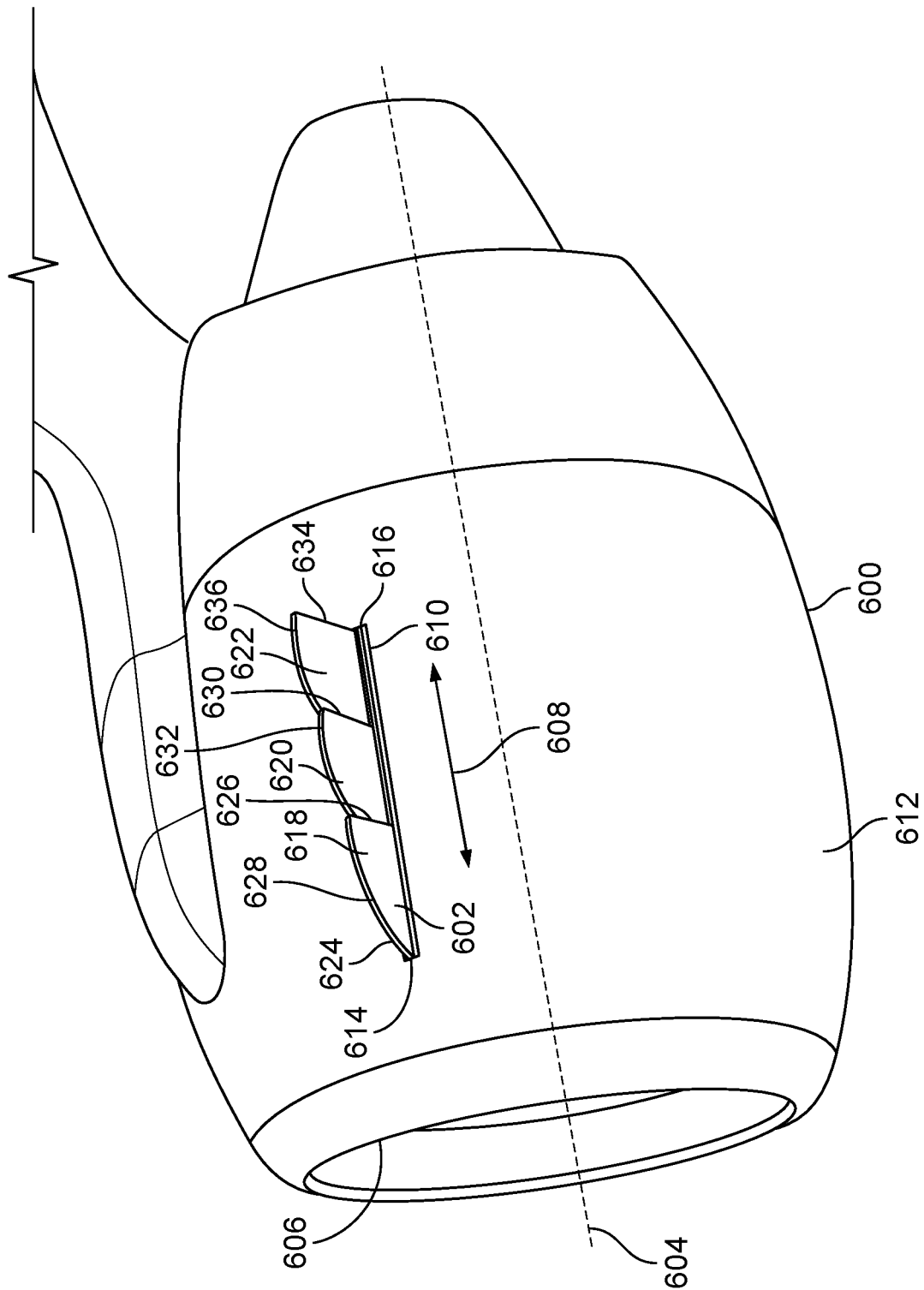
FIG. 6 is a perspective view of an example nacelle having an example multi-segment chine positioned in a first example configuration.
Figure 7:
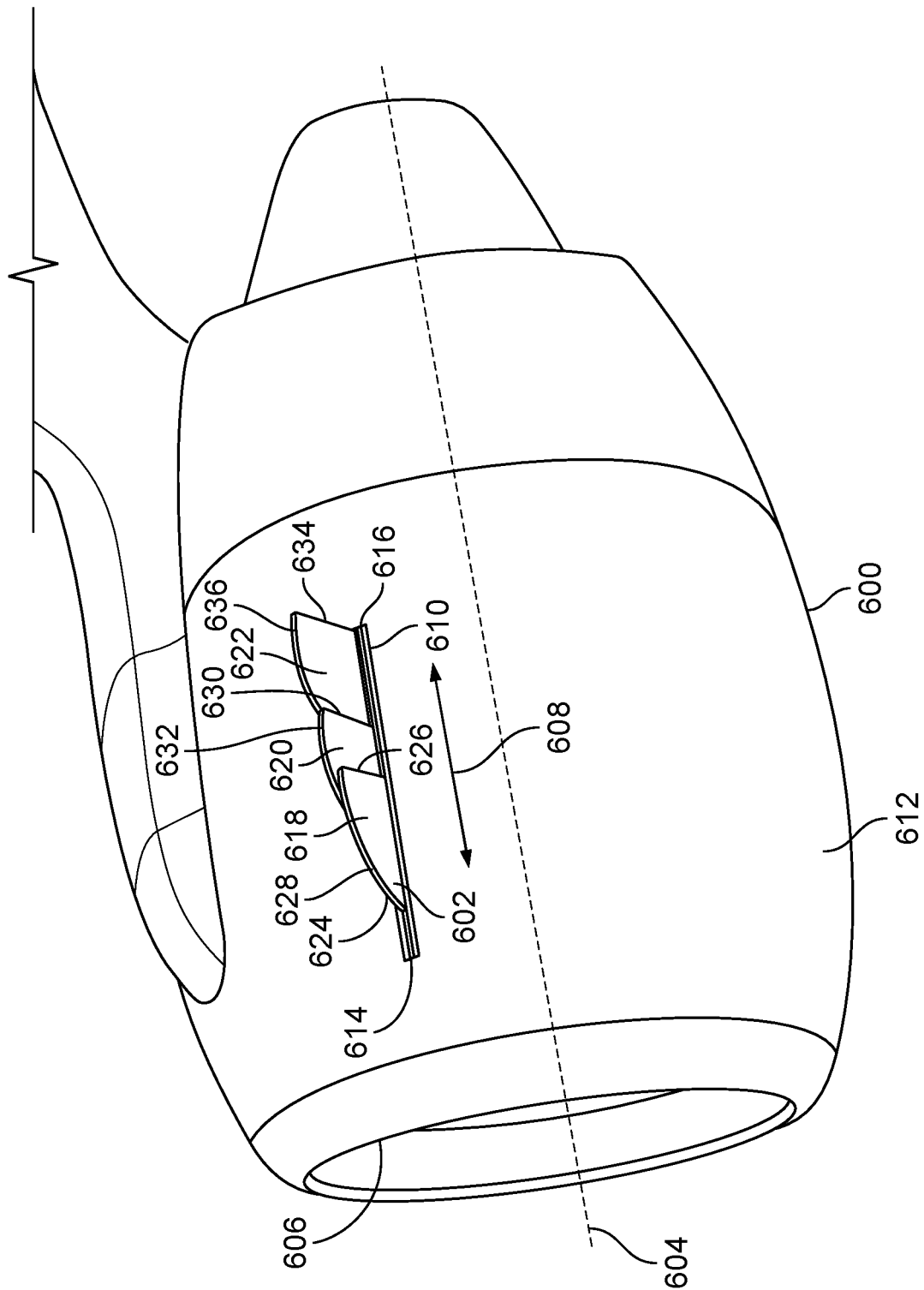
FIG. 7 is a perspective view of the nacelle of FIG. 6 having the multi-segment chine of FIG. 6 positioned in a second example configuration.
Figure 8:
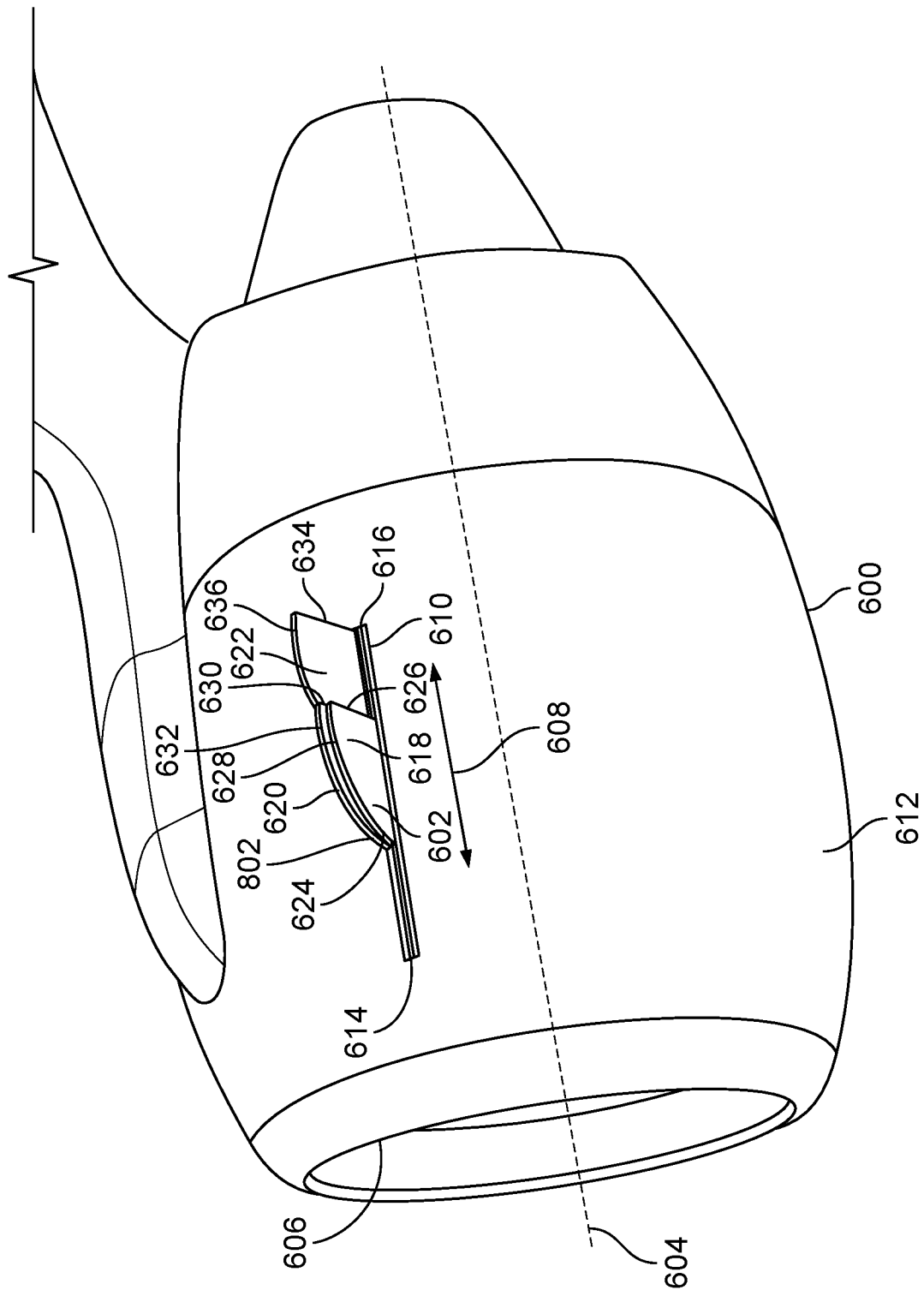
FIG. 8 is a perspective view of the nacelle of FIGS. 6 and 7 having the multi-segment chine of FIGS. 6 and 7 positioned in a third example configuration.
Figure 9:
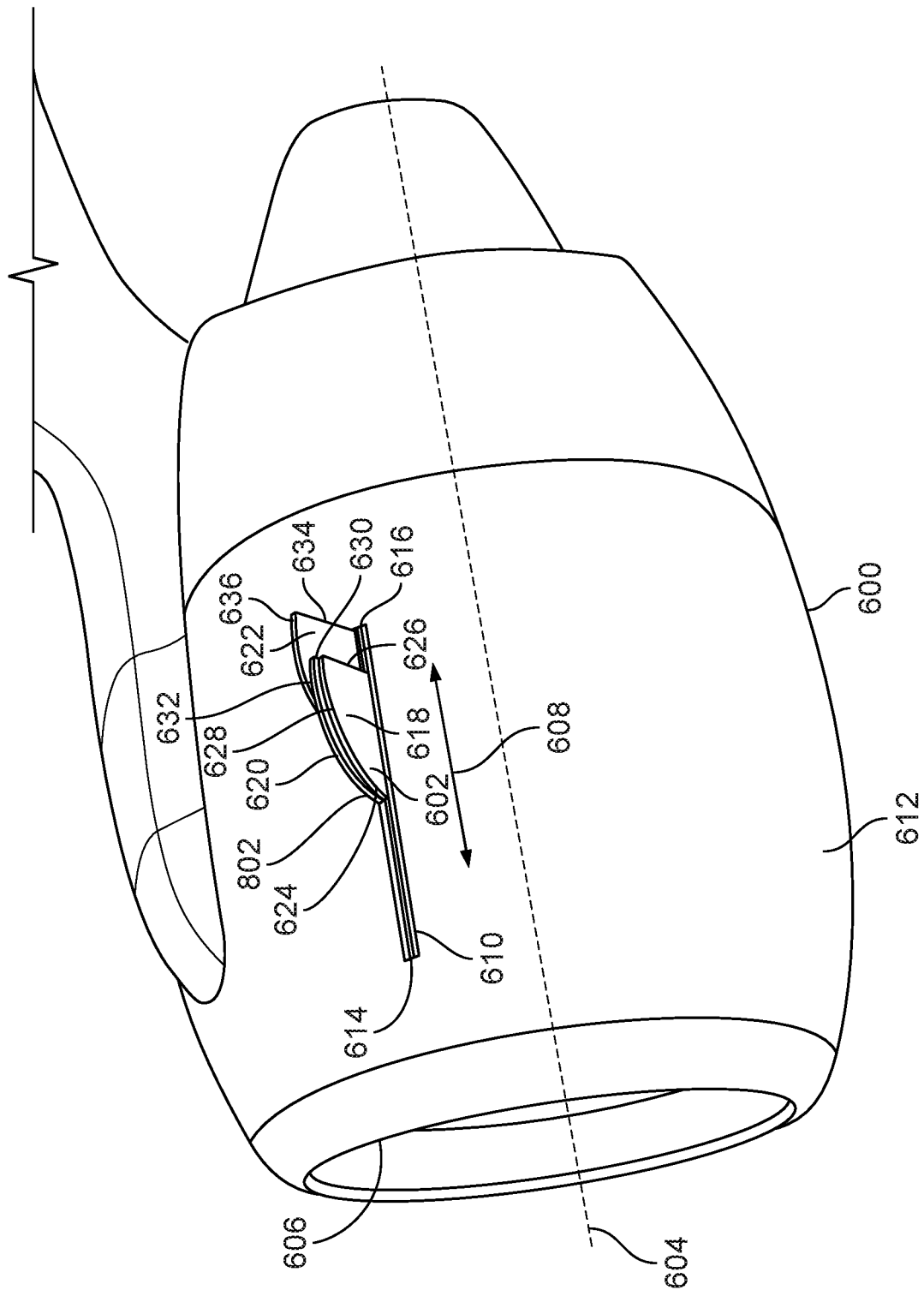
FIG. 9 is a perspective view of the nacelle of FIGS. 6-8 having the multi-segment chine of FIGS. 6-8 positioned in a fourth example configuration.
Figure 10:
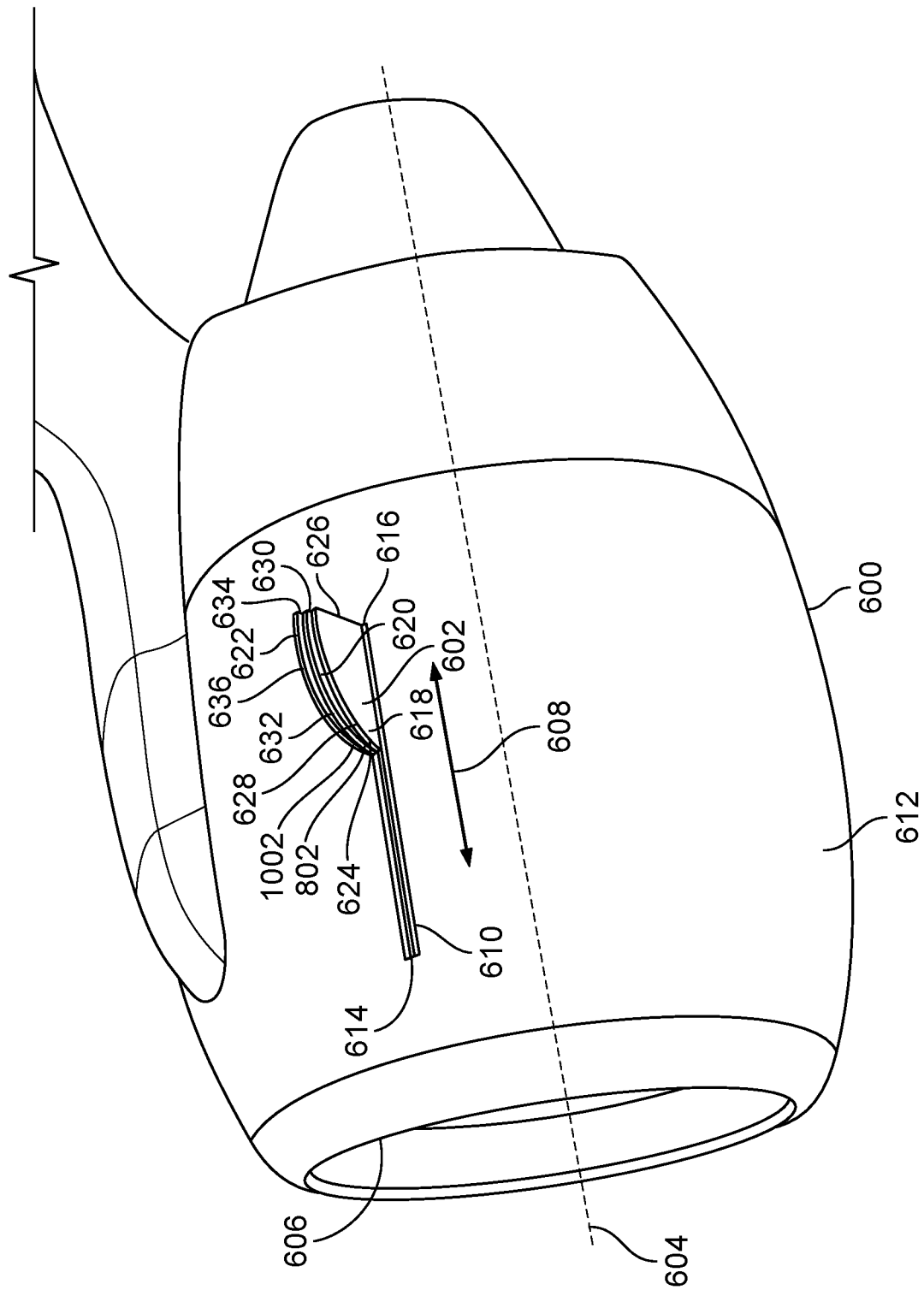
FIG. 10 is a perspective view of the nacelle of FIGS. 6-9 having the multi-segment chine of FIGS. 6-9 positioned in a fifth example configuration.

FIG. 6 is a perspective view of an example nacelle 600 having an example multi-segment chine 602 positioned in a first example configuration. FIG. 7 is a perspective view of the nacelle 600 of FIG. 6 having the multi-segment chine 602 of FIG. 6 positioned in a second example configuration. FIG. 8 is a perspective view of the nacelle 600 of FIGS. 6 and 7 having the multi-segment chine 602 of FIGS. 6 and 7 positioned in a third example configuration. FIG. 9 is a perspective view of the nacelle 600 of FIGS. 6-8 having the multi-segment chine 602 of FIGS. 6-8 positioned in a fourth example configuration. FIG. 10 is a perspective view of the nacelle 600 of FIGS. 6-9 having the multi-segment chine 602 of FIGS. 6-9 positioned in a fifth example configuration. The nacelle 600 of FIGS. 6-10 can be coupled to a wing of an aircraft (e.g., the first wing 104 of the aircraft 100 of FIGS. 1-3). One or more segments of the multi-segment chine 602 of the nacelle 600 of FIGS. 6-10 can be controlled and/or adjusted by a control system of an aircraft (e.g., the control system 3400 of FIG. 34 described below, which may be implemented in the aircraft 100 of FIGS. 1-3).

The nacelle 600 of FIGS. 6-10 includes an example central axis 604 and an example leading edge 606. The segments of the multi-segment chine 602 of FIGS. 6-10 are oriented along an example fore-aft direction 608 relative to the nacelle 600. In the illustrated example of FIGS. 6-10, the fore-aft direction 608 is defined by one or more of the outer mold line(s) of the segments of the multi-segment chine 602, as further described below. In some examples, the fore-aft direction 608 is substantially parallel to the central axis 604 of the nacelle 600, with the central axis 604 of the nacelle 600 being defined by a rotational axis of an engine housed by the nacelle 600. In other examples, the fore-aft direction 608 can additionally or alternatively be substantially parallel to a longitudinal axis of a fuselage of an aircraft (e.g., the longitudinal axis 116 of the fuselage 102 of the aircraft 100 of FIGS. 1-3) that includes the nacelle 600. In still other examples, the orientation of the fore-aft direction 608 can exceed the above-described substantially parallel relationship(s) relative to the central axis 604 of the nacelle 600 and/or the longitudinal axis of the fuselage of the aircraft. The nacelle 600 of FIGS. 6-10 further includes an example slot 610 formed in and/or extending through an example outer surface 612 of the nacelle 600. The slot 610 of the nacelle 600 includes an example front end 614 and an example rear end 616 located opposite and/or rearward of the front end 614. In the illustrated example of FIGS. 6-10, the slot 610 is oriented along the fore-aft direction 608.

The multi-segment chine 602 of FIGS. 6-10 includes an example first segment 618 (e.g., a leading segment), an example second segment 620 (e.g., an intermediate segment) that is substantially coplanar with the first segment 618, and an example third segment 622 (e.g., a trailing segment) that is substantially coplanar with the second segment 620. The first segment 618, the second segment 620, and the third segment 622 are respectively coupled to the nacelle 600. For example, the first segment 618 and the second segment 620 can respectively include a root portion located inwardly (e.g., radially inwardly) relative to the outer surface 612 of the nacelle 600. The root portions of the first segment 618 and the second segment 620 can be coupled (e.g., operatively coupled) to one or more actuation mechanism(s) located within the nacelle 600. Exposed portions of the first segment 618, the second segment 620, and the third segment 622 extend outwardly (e.g., radially outwardly) relative to the outer surface 612 of the nacelle 600 through the slot 610. The third segment 622 can be fixedly coupled to a static (e.g., non-movable) structure located within the nacelle 600.

In the illustrated example of FIGS. 6-10, the first segment 618, the second segment 620, and the third segment 622 of the multi-segment chine 602 are coupled to the nacelle 600 at a location that is inboard relative to the central axis 604 of the nacelle 600. In other examples, the first segment 618, the second segment 620, and the third segment 622 of the multi-segment chine 602 can alternatively be coupled to the nacelle 600 at a location that is outboard relative to the central axis 604 of the nacelle 600. In the illustrated example of FIGS. 6-10, the multi-segment chine 602 includes a total of three segments. In other examples, the multi-segment chine 602 can include a different number (e.g., 2, 4, 5, etc.) of segments implemented in a manner similar to and/or consistent with the three-segment implementation shown and described in connection with FIGS. 6-10. In the illustrated example of FIGS. 6-10, the first segment 618, the second segment 620, and the third segment 622 are of an identical size and/or shape relative to one another. In other examples, one or more of the first segment 618, the second segment 620, and/or the third segment 622 can have a size and/or shape that differs from the size and/or shape of another one of the first segment 618, the second segment 620, and/or the third segment 622.

The first segment 618 of the multi-segment chine 602 FIGS. 6-10 includes an example leading edge 624, an example trailing edge 626 located opposite and/or rearward of the leading edge 624 of the first segment 618, and an example outer mold line 628 defined by the leading edge 624 and the trailing edge 626 of the first segment 618. The first segment 618 of FIGS. 6-10 has a substantially planar shape (e.g., as defined by the outer mold line 628) that extends and/or is oriented along the fore-aft direction 608. The first segment 618 of FIGS. 6-10 is movable and/or adjustable relative to the slot 610 and/or, more generally, relative to the nacelle 600 of FIGS. 6-10 along the fore-aft direction 608. More specifically, the first segment 618 of FIGS. 6-10 is translatable relative to the slot 610 and/or the nacelle 600 of FIGS. 6-10 along the fore-aft direction 608.

The second segment 620 of the multi-segment chine 602 of FIGS. 6-10 includes an example leading edge 802, an example trailing edge 630 located opposite and/or rearward of the leading edge 802 of the second segment 620, and an example outer mold line 632 defined by the leading edge 802 and the trailing edge 630 of the second segment 620. The second segment 620 of FIGS. 6-10 has a substantially planar shape (e.g., as defined by the outer mold line 632) that extends and/or is oriented along the fore-aft direction 608. In the illustrated example of FIGS. 6-10, the second segment 620 is substantially coplanar with the first segment 618 along the fore-aft direction 608. The second segment 620 of FIGS. 6-10 is movable and/or adjustable relative to the slot 610 and/or, more generally, relative to the nacelle 600 of FIGS. 6-10 along the fore-aft direction 608. More specifically, the second segment 620 of FIGS. 6-10 is translatable relative to the slot 610 and/or the nacelle 600 of FIGS. 6-10 along the fore-aft direction 608.

The third segment 622 of the multi-segment chine 602 of FIGS. 6-10 includes an example leading edge 1002, an example trailing edge 634 located opposite and/or rearward of the leading edge 1002 of the third segment 622, and an example outer mold line 636 defined by the leading edge 1002 and the trailing edge 634 of the third segment 622. The third segment 622 of FIGS. 6-10 has a substantially planar shape (e.g., as defined by the outer mold line 636) that extends and/or is oriented along the fore-aft direction 608. In the illustrated example of FIGS. 6-10, the third segment 622 is substantially coplanar with the second segment 620 and/or substantially coplanar with the first segment 618 along the fore-aft direction 608. In the illustrated example of FIGS. 6-10, the third segment 622 is fixed relative to the slot 610 and/or, more generally, relative to the nacelle 600 of FIGS. 6-10 along the fore-aft direction 608. In other examples, the third segment 622 of FIGS. 6-10 can be movable and/or adjustable relative to the slot 610 and/or, more generally, relative to the nacelle 600 of FIGS. 6-10 along the fore-aft direction 608. For example, the third segment 622 of FIGS. 6-10 can be translatable relative to the slot 610 and/or the nacelle 600 of FIGS. 6-10 along the fore-aft direction 608.

The first configuration of the multi-segment chine 602 shown in FIG. 6 corresponds to a forward position of the first segment 618, a forward position of the second segment 620, and a fixed position of the third segment 622. The second configuration of the multi-segment chine 602 shown in FIG. 7 corresponds to a first intermediate position of the first segment 618, a forward position of the second segment 620, and a fixed position of the third segment 622. The third configuration of the multi-segment chine 602 shown in FIG. 8 corresponds to a second intermediate position of the first segment 618, a forward position of the second segment 620, and a fixed position of the third segment 622. The fourth configuration of the multi-segment chine 602 shown in FIG. 9 corresponds to a third intermediate position of the first segment 618, an intermediate position of the second segment 620, and a fixed position of the third segment 622. The fifth configuration of the multi-segment chine 602 shown in FIG. 10 corresponds to a rearward position of the first segment 618, a rearward position of the second segment 620, and a fixed position of the third segment 622.

The first segment 618 of the multi-segment chine 602 of FIGS. 6-10 is movable (e.g., translatable) along the fore-aft direction 608 (e.g., within the slot 610 of the nacelle 600) between the first configuration of the multi-segment chine 602 (e.g., the forward position of the first segment 618) shown in FIG. 6, the second configuration of the multi-segment chine 602 (e.g., the first intermediate position of the first segment 618) shown in FIG. 7, the third configuration of the multi-segment chine 602 (e.g., the second intermediate position of the first segment 618) shown in FIG. 8, the fourth configuration of the multi-segment chine 602 (e.g., the third intermediate position of the first segment 618) shown in FIG. 9, and the fifth configuration of the multi-segment chine 602 (e.g., the rearward position of the first segment 618) shown in FIG. 10.

When the first segment 618 is positioned in the first configuration of the multi-segment chine 602 shown in FIG. 6, the leading edge 624 of the first segment 618 is spaced from the leading edge 606 of the nacelle 600 by a first distance, and the leading edge 624 of the first segment 618 is proximate (e.g., adjacent or abutting) the front end 614 of the slot 610 of the nacelle 600. When the first segment 618 is positioned in the second configuration of the multi-segment chine 602 shown in FIG. 7, the leading edge 624 of the first segment 618 is spaced from the leading edge 606 of the nacelle 600 by a second distance greater than the first distance. When the first segment 618 is positioned in the third configuration of the multi-segment chine 602 shown in FIG. 8, the leading edge 624 of the first segment 618 is spaced from the leading edge 606 of the nacelle 600 by a third distance greater than the second distance. When the first segment 618 is positioned in the fourth configuration of the multi-segment chine 602 shown in FIG. 9, the leading edge 624 of the first segment 618 is spaced from the leading edge 606 of the nacelle 600 by a fourth distance greater than the third distance. When the first segment 618 is positioned in the fifth configuration of the multi-segment chine 602 shown in FIG. 10, the leading edge 624 of the first segment 618 is spaced from the leading edge 606 of the nacelle 600 by a fifth distance greater than the fourth distance, and the trailing edge 626 of the first segment 618 is proximate (e.g., adjacent or abutting) the rear end 616 of the slot 610 of the nacelle 600.

The second segment 620 of the multi-segment chine 602 of FIGS. 6-10 is movable (e.g., translatable) along the fore-aft direction 608 (e.g., within the slot 610 of the nacelle 600) between the third configuration of the multi-segment chine 602 (e.g., the forward position of the second segment 620) shown in FIG. 8, the fourth configuration of the multi-segment chine 602 (e.g., the intermediate position of the second segment 620) shown in FIG. 9, and the fifth configuration of the multi-segment chine 602 (e.g., the rearward position of the second segment 620) shown in FIG. 10.

When the second segment 620 is positioned in the third configuration of the multi-segment chine 602 shown in FIG. 8, the leading edge 802 of the second segment 620 is spaced from the leading edge 606 of the nacelle 600 by a sixth distance (e.g., equal to the third distance associated with the first segment 618). When the second segment 620 is positioned in the fourth configuration of the multi-segment chine 602 shown in FIG. 9, the leading edge 802 of the second segment 620 is spaced from the leading edge 606 of the nacelle 600 by a seventh distance greater than the sixth distance. When the second segment 620 is positioned in the fifth configuration of the multi-segment chine 602 shown in FIG. 10, the leading edge 802 of the second segment 620 is spaced from the leading edge 606 of the nacelle 600 by an eighth distance (e.g., equal to the fifth distance associated with the first segment 618) greater than the seventh distance, and the trailing edge 630 of the second segment 620 is proximate (e.g., adjacent or abutting) the rear end 616 of the slot 610 of the nacelle 600.

In the illustrated example of FIGS. 6-10, the leading edge 624 of the first segment 618 of the multi-segment chine 602 is transversely aligned along the fore-aft direction 608 with the leading edge 802 of the second segment 620 of the multi-segment chine 602 when the multi-segment chine 602 is positioned in any of the third, fourth and/or fifth configurations shown in FIGS. 8-10. More specifically, the outer mold line 628 of the first segment 618 is transversely aligned along the fore-aft direction 608 with the outer mold line 632 of the second segment 620 when the multi-segment chine 602 is positioned in any of the third, fourth and/or fifth configurations shown in FIGS. 8-10. In the illustrated example of FIGS. 6-10, the leading edge 624 of the first segment 618 of the multi-segment chine 602 and/or the leading edge 802 of the second segment 620 of the multi-segment chine 602 is/are transversely aligned along the fore-aft direction 608 with the leading edge 1002 of the third segment 622 of the multi-segment chine 602 when the multi-segment chine 602 is positioned in the fifth configuration shown in FIG. 10. More specifically, the outer mold line 628 of the first segment 618 and/or the outer mold line 632 of the second segment 620 is/are transversely aligned along the fore-aft direction 608 with the outer mold line 636 of the third segment 622 when the multi-segment chine 602 is positioned in the fifth configuration shown in FIG. 10.

In the illustrated example of FIGS. 6-10, the first segment 618 and/or the second segment 620 of the multi-segment chine 602 can be moved (e.g., translated along the fore-aft direction 608) in a controlled manner to any number of intermediate positions between the first position shown in FIG. 6 and the fifth position shown in FIG. 10. The controlled movement(s) (e.g., translation(s)) of the first segment 618 and/or the second segment 620 of the multi-segment chine 602 occur(s) via one or more actuation mechanism(s) and one or more controller(s) of a control system (e.g., the actuation mechanism 3404 and the controller 3406 of the control system 3400 of FIG. 34), as further described below.

The first segment 618, the second segment 620, and the third segment 622 of the multi-segment chine 602 of FIGS. 6-10 are configured (e.g., located on and/or oriented relative to the nacelle 600 of FIGS. 6-10) to collectively generate a vortex in response to an airflow presented at the multi-segment chine 602. In some examples, the vortex generated by the first segment 618, the second segment 620, and the third segment 622 of the multi-segment chine 602 favorably affects a boundary layer located on an upper surface of an aircraft wing to which the nacelle 600 of FIGS. 6-10 is coupled. Thus, the multi-segment chine 602 provide a positive aerodynamic impact in response to an airflow presented at the multi-segment chine 602. The vortex generated by the first segment 618, the second segment 620, and the third segment 622 of the multi-segment chine 602 of FIGS. 6-10 changes (e.g., changes its position and/or its strength) as one or more of the first segment 618, the second segment 620, and/or the third segment 622 of the multi-segment chine 602 is/are moved (e.g., translated along the fore-aft direction 608) between the first configuration shown in FIG. 6, the second configuration shown in FIG. 7, the third configuration shown in FIG. 8, the fourth configuration shown in FIG. 9, and the fifth configuration shown in FIG. 10.

For example, when the multi-segment chine 602 is positioned in the first configuration shown in FIG. 6, the first segment 618, the second segment 620, and the third segment 622 of the multi-segment chine 602 are configured to collectively generate a first vortex. When the multi-segment chine 602 is positioned in the second configuration shown in FIG. 7, the first segment 618, the second segment 620, and the third segment 622 of the multi-segment chine 602 are configured to collectively generate a second vortex that differs from the first vortex. When the multi-segment chine 602 is positioned in the third configuration shown in FIG. 8, the first segment 618, the second segment 620, and the third segment 622 of the multi-segment chine 602 are configured to collectively generate a third vortex that differs from the first vortex and also differs from the second vortex. When the multi-segment chine 602 is positioned in the fourth configuration shown in FIG. 9, the first segment 618, the second segment 620, and the third segment 622 of the multi-segment chine 602 are configured to collectively generate a fourth vortex that differs from the first vortex, differs from the second vortex, and differs from the third vortex. When the multi-segment chine 602 is positioned in the fifth configuration shown in FIG. 10, the first segment 618, the second segment 620, and the third segment 622 of the multi-segment chine 602 are configured to collectively generate a fifth vortex that differs from the first vortex, differs from the second vortex, differs from the third vortex, and differs from the fourth vortex. In some examples, the first vortex has a first associated vortex position, the second vortex has a second associated vortex position that differs from the first associated vortex position, the third vortex has a third associated vortex position that differs from each of the first and second associated vortex positions, the fourth vortex has a fourth associated vortex position that differs from each of the first, second, and third associated vortex positions, and the fifth vortex has a fifth associated vortex position that differs from each of the first, second, third, and fourth associated vortex positions. In some examples, the first vortex has a first associated vortex strength, the second vortex has a second associated vortex strength that differs from the first associated vortex strength, the third vortex has a third associated vortex strength that differs from each of the first and second associated vortex strengths, the fourth vortex has a fourth associated vortex strength that differs from each of the first, second, and third associated vortex strengths, and the fifth vortex has a fifth associated vortex strength that differs from each of the first, second, third, and fourth associated vortex strengths.

Figure 11:
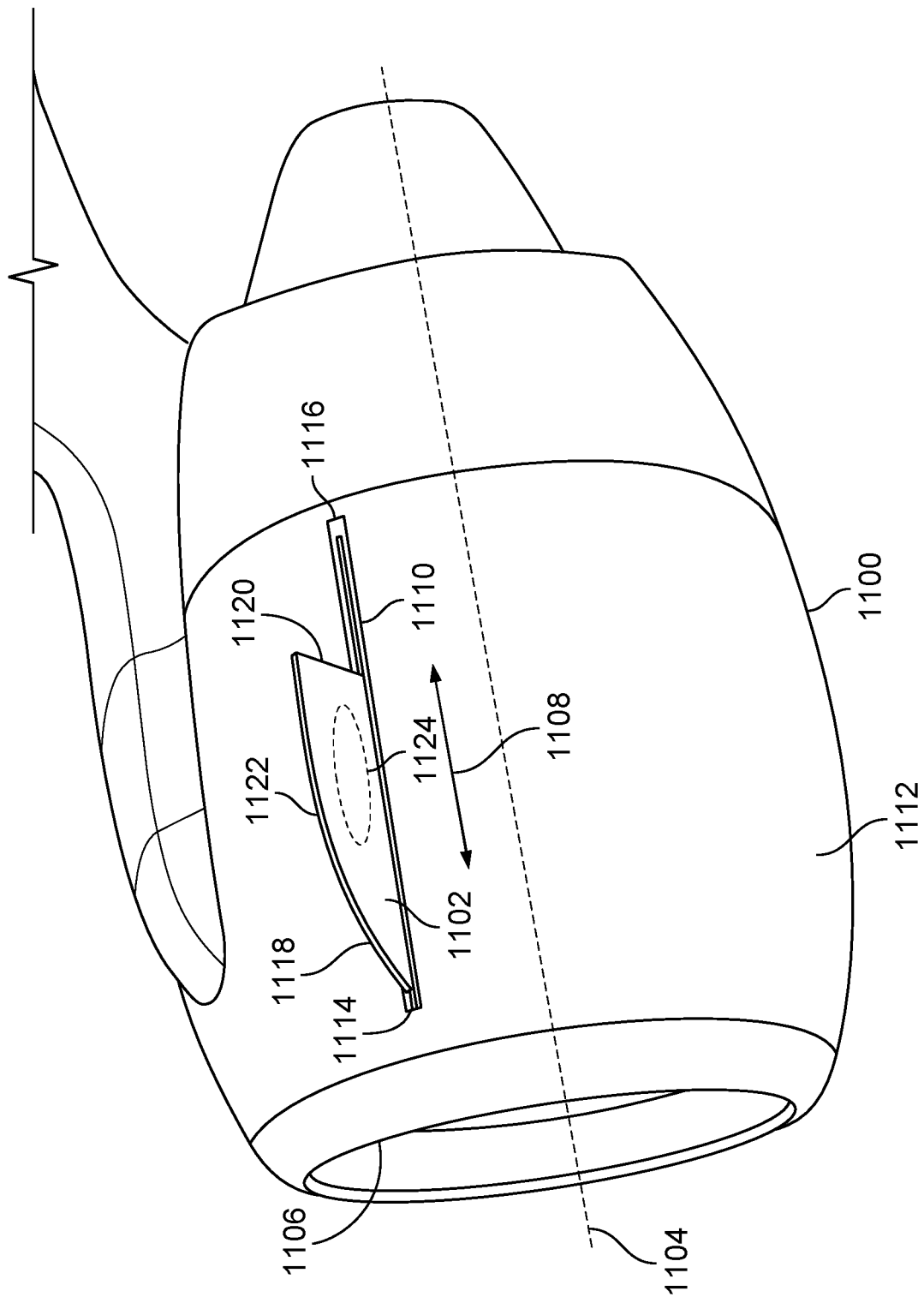
FIG. 11 is a perspective view of an example nacelle having an example chine positioned in a first example position.
Figure 12:
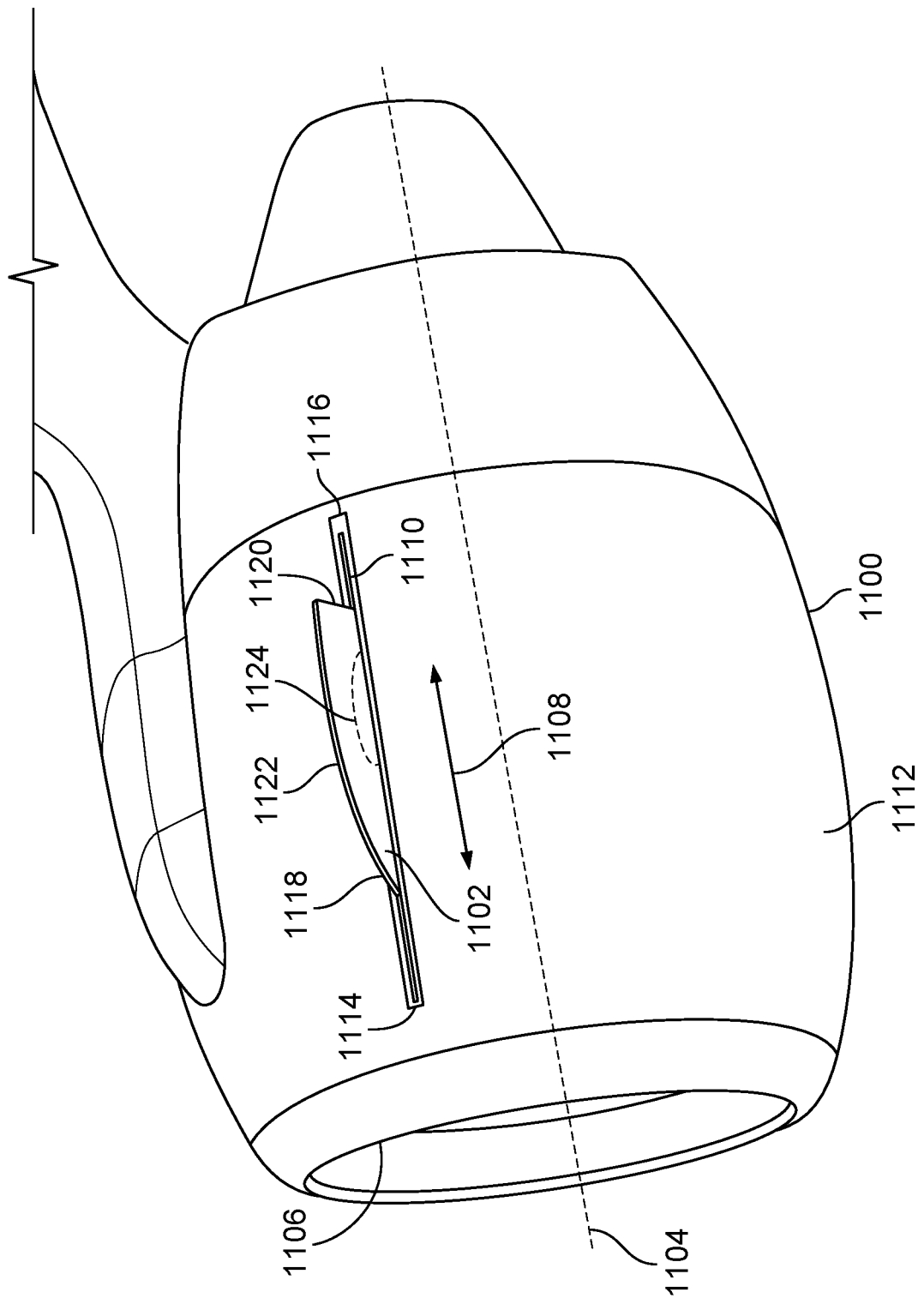
FIG. 12 is a perspective view of the nacelle of FIG. 11 having the chine of FIG. 11 positioned in a second example position.
Figure 13:
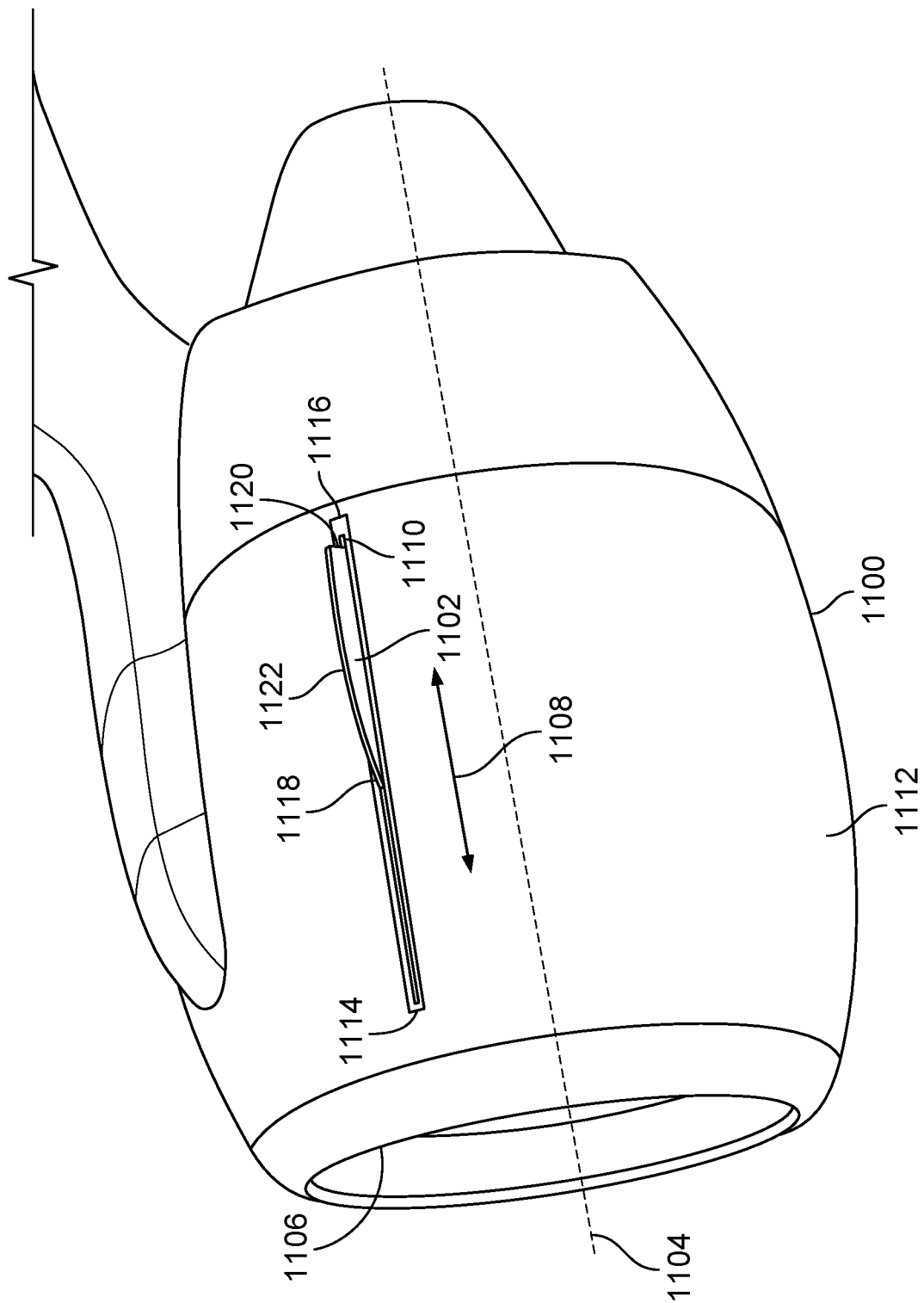
FIG. 13 is a perspective view of the nacelle of FIGS. 11 and 12 having the chine of FIGS. 11 and 12 positioned in a third example position.

FIG. 11 is a perspective view of an example nacelle 1100 having an example chine 1102 positioned in a first example position. FIG. 12 is a perspective view of the nacelle 1100 of FIG. 11 having the chine 1102 of FIG. 11 positioned in a second example position. FIG. 13 is a perspective view of the nacelle 1100 of FIGS. 11 and 12 having the chine 1102 of FIGS. 11 and 12 positioned in a third example position. The nacelle 1100 of FIGS. 11-13 can be coupled to a wing of an aircraft (e.g., the first wing 104 of the aircraft 100 of FIGS. 1-3). The chine 1102 of the nacelle 1100 of FIGS. 11-13 can be controlled and/or adjusted by a control system of an aircraft (e.g., the control system 3400 of FIG. 34 described below, which may be implemented in the aircraft 100 of FIGS. 1-3).

The nacelle 1100 of FIGS. 11-13 includes an example central axis 1104 and an example leading edge 1106. The chine 1102 of FIGS. 11-13 is oriented along an example fore-aft direction 1108 relative to the nacelle 1100. In the illustrated example of FIGS. 11-13, the fore-aft direction 1108 is defined by an outer mold line of the chine 1102, as further described below. In some examples, the fore-aft direction 1108 is substantially parallel to the central axis 1104 of the nacelle 1100, with the central axis 1104 of the nacelle 1100 being defined by a rotational axis of an engine housed by the nacelle 1100. In other examples, the fore-aft direction 1108 can additionally or alternatively be substantially parallel to a longitudinal axis of a fuselage of an aircraft (e.g., the longitudinal axis 116 of the fuselage 102 of the aircraft 100 of FIGS. 1-3) that includes the nacelle 1100. In still other examples, the orientation of the fore-aft direction 1108 can exceed the above-described substantially parallel relationship(s) relative to the central axis 1104 of the nacelle 1100 and/or the longitudinal axis of the fuselage of the aircraft. The nacelle 1100 of FIGS. 11-13 further includes an example slot 1110 formed in and/or extending through an example outer surface 1112 of the nacelle 1100. The slot 1110 of the nacelle 1100 includes an example front end 1114 and an example rear end 1116 located opposite and/or rearward of the front end 1114. In the illustrated example of FIGS. 11-13, the slot 1110 is oriented along the fore-aft direction 1108.

The chine 1102 of FIGS. 11-13 is coupled to the nacelle 1100. For example, the chine 1102 can include a root portion located inwardly (e.g., radially inwardly) relative to the outer surface 1112 of the nacelle 1100. The root portion of the chine 1102 can be coupled (e.g., operatively coupled) to an actuation mechanism located within the nacelle 1100. An exposed portion of the chine 1102 extends outwardly (e.g., radially outwardly) relative to the outer surface 1112 of the nacelle 1100 through the slot 1110. In the illustrated example of FIGS. 11-13, the chine 1102 is coupled to the nacelle 1100 at a location that is inboard relative to the central axis 1104 of the nacelle 1100. In other examples, the chine 1102 can alternatively be coupled to the nacelle 1100 at a location that is outboard relative to the central axis 1104 of the nacelle 1100.

The chine 1102 of FIGS. 11-13 includes an example leading edge 1118, an example trailing edge 1120 located opposite and/or rearward of the leading edge 1118 of the chine 1102, and an example outer mold line 1122 defined by the leading edge 1118 and the trailing edge 1120 of the chine 1102. The chine 1102 of FIGS. 11-13 has a substantially planar shape (e.g., as defined by the outer mold line 1122) that extends and/or is oriented along the fore-aft direction 1108. The chine 1102 of FIGS. 11-13 is movable and/or adjustable relative to the slot 1110 and/or, more generally, relative to the nacelle 1100 of FIGS. 11-13 along the fore-aft direction 1108. More specifically, the chine 1102 of FIGS. 11-13 is translatable relative to the slot 1110 and/or the nacelle 1100 of FIGS. 11-13 along the fore-aft direction 1108.

In the illustrated example of FIGS. 11-13, the chine 1102 is movable (e.g., translatable) along the fore-aft direction 1108 (e.g., within the slot 1110 of the nacelle 1100) between the first position (e.g., a forward position) shown in FIG. 11, the second position (e.g., an intermediate position) shown in FIG. 12, and the third position (e.g., a rearward position) shown in FIG. 13. When the chine 1102 is positioned in the first position shown in FIG. 11, the leading edge 1118 of the chine 1102 is spaced from the leading edge 1106 of the nacelle 1100 by a first distance, and the leading edge 1118 of the chine 1102 is proximate (e.g., adjacent or abutting) the front end 1114 of the slot 1110 of the nacelle 1100. When the chine 1102 is positioned in the second position shown in FIG. 12, the leading edge 1118 of the chine 1102 is spaced from the leading edge 1106 of the nacelle 1100 by a second distance greater than the first distance. When the chine 1102 is positioned in the third position shown in FIG. 13, the leading edge 1118 of the chine 1102 is spaced from the leading edge 1106 of the nacelle 1100 by a third distance greater than the second distance, and the trailing edge 1120 of the chine 1102 is proximate (e.g., adjacent or abutting) the rear end 1116 of the slot 1110 of the nacelle 1100.

In the illustrated example of FIGS. 11-13, the first position of the chine 1102 shown in FIG. 11 corresponds to a deployed position of the chine 1102, the second position of the chine 1102 shown in FIG. 12 corresponds to a partially-deployed and/or a partially-stowed position of the chine 1102, and the third position of the chine 1102 shown in FIG. 13 corresponds to a stowed position of the chine 1102. The chine 1102 becomes increasingly submerged and/or retracted relative to the slot 1110 and/or the outer surface 1112 of the nacelle 1100 as the chine 1102 moves (e.g., translates) from the first position shown in FIG. 11 to the third position shown in FIG. 13. For example, when the chine 1102 is positioned in the first position shown in FIG. 11, an example portion 1124 of the chine 1102 is exposed and/or extends outwardly (e.g., radially outwardly) relative to the outer surface 1112 of the nacelle 1100 through the slot 1110. As the chine 1102 moves (e.g., translates) from the first position shown in FIG. 11 to the second position shown in FIG. 12, the portion 1124 of the chine 1102 becomes partially submerged and/or partially retracted relative to the outer surface 1112 of the nacelle 1100 through the slot 1110. As the chine 1102 moves (e.g., translates) from the second position shown in FIG. 12 to the third position shown in FIG. 13, the portion 1124 of the chine 1102 becomes fully submerged and/or fully retracted relative to the outer surface 1112 of the nacelle 1100 through the slot 1110. In some examples, the chine 1102 is movable (e.g., translatable) to a position (e.g., a fully-rearward position) in which the outer mold line 1122 of the chine 1102 becomes fully submerged and/or fully retracted relative to the outer surface 1112 of the nacelle 1100 through the slot 1110.

The chine 1102 of FIGS. 11-13 can be moved (e.g., translated along the fore-aft direction 1108) in a controlled manner to any number of intermediate positions between the first position shown in FIG. 11 and the third position shown in FIG. 13. The controlled movement (e.g., translation) of the chine 1102 occurs via an actuation mechanism and a controller of a control system (e.g., the actuation mechanism 3404 and the controller 3406 of the control system 3400 of FIG. 34), as further described below.

The chine 1102 of FIGS. 11-13 is configured (e.g., located on and/or oriented relative to the nacelle 1100 of FIGS. 11-13) to generate a vortex in response to an airflow presented at the chine 1102. In some examples, the vortex generated by the chine 1102 favorably affects a boundary layer located on an upper surface of an aircraft wing to which the nacelle 1100 of FIGS. 11-13 is coupled. Thus, the chine 1102 provides a positive aerodynamic impact in response to an airflow presented at the chine 1102. The vortex generated by the chine 1102 of FIGS. 11-13 changes (e.g., changes its position and/or its strength) as the chine 1102 is moved (e.g., translated along the fore-aft direction 1108) between the first position (e.g., a forward position) shown in FIG. 11, the second position (e.g., an intermediate position) shown in FIG. 12, and the third position (e.g., a rearward position) shown in FIG. 13.

For example, when the chine 1102 is positioned in the first position shown in FIG. 11, the chine 1102 is configured to generate a first vortex. When the chine 1102 is positioned in the second position shown in FIG. 12, the chine 1102 is configured to generate a second vortex that differs from the first vortex. When the chine 1102 is positioned in the third position shown in FIG. 13, the chine 1102 is configured to generate a third vortex that differs from the first vortex and also differs from the second vortex. In some examples, the first vortex has a first associated vortex position, the second vortex has a second associated vortex position that differs from the first associated vortex position, and the third vortex has a third associated vortex position that differs from the first associated vortex position and also differs from the second associated vortex position. In some examples, the first vortex has a first associated vortex strength, the second vortex has a second associated vortex strength that differs from the first associated vortex strength, and the third vortex has a third associated vortex strength that differs from the first associated vortex strength and also differs from the second associated vortex strength.

Figure 14:
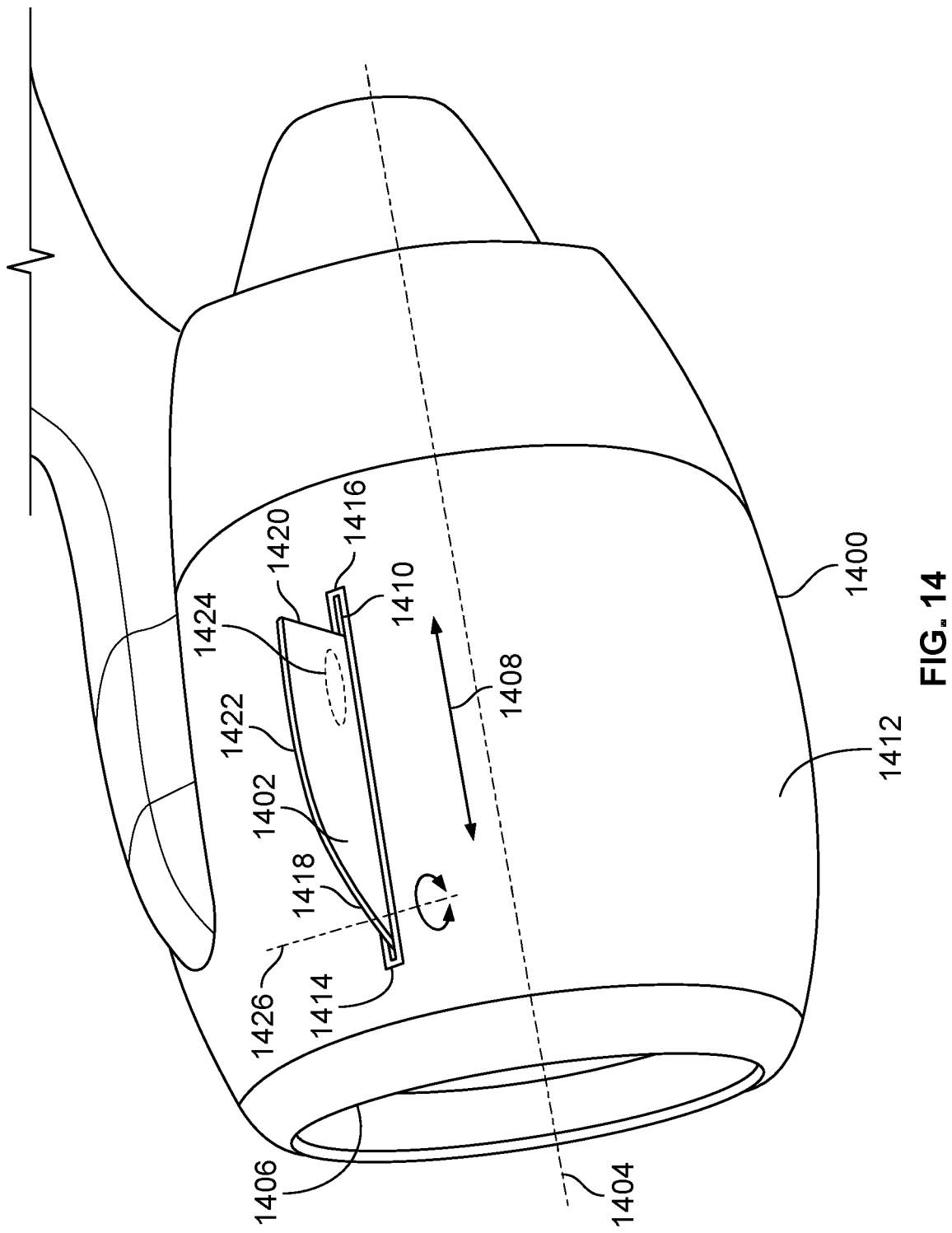
FIG. 14 is a perspective view of an example nacelle having an example chine positioned in a first example position.
Figure 15:
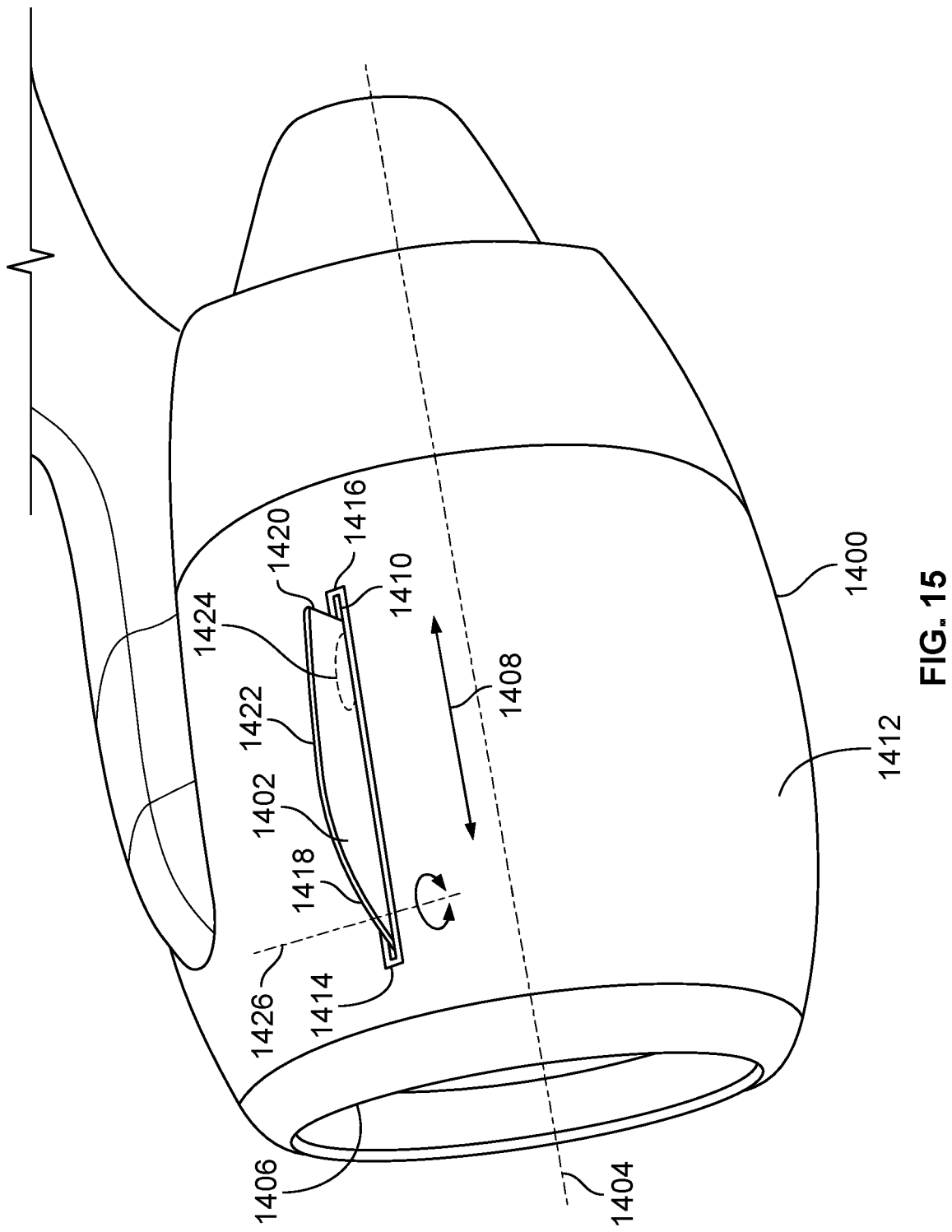
FIG. 15 is a perspective view of the nacelle of FIG. 14 having the chine of FIG. 14 positioned in a second example position.
Figure 16:
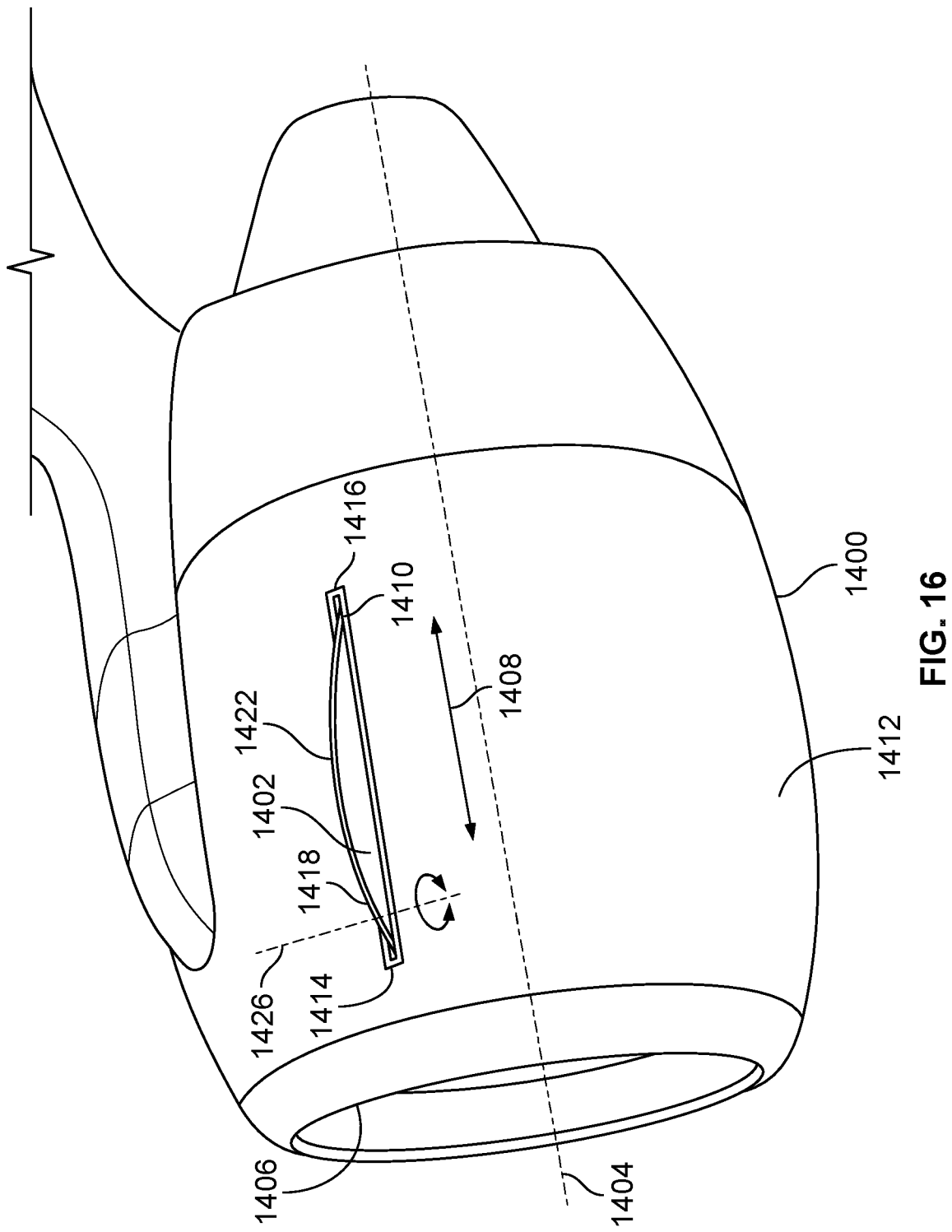
FIG. 16 is a perspective view of the nacelle of FIGS. 14 and 15 having the chine of FIGS. 14 and 15 positioned in a third example position.

FIG. 14 is a perspective view of an example nacelle 1400 having an example chine 1402 positioned in a first example position. FIG. 15 is a perspective view of the nacelle 1400 of FIG. 14 having the chine 1402 of FIG. 14 positioned in a second example position. FIG. 16 is a perspective view of the nacelle 1400 of FIGS. 14 and 15 having the chine 1402 of FIGS. 14 and 15 positioned in a third example position. The nacelle 1400 of FIGS. 14-16 can be coupled to a wing of an aircraft (e.g., the first wing 104 of the aircraft 100 of FIGS. 1-3). The chine 1402 of the nacelle 1400 of FIGS. 14-16 can be controlled and/or adjusted by a control system of an aircraft (e.g., the control system 3400 of FIG. 34 described below, which may be implemented in the aircraft 100 of FIGS. 1-3).

The nacelle 1400 of FIGS. 14-16 includes an example central axis 1404 and an example leading edge 1406. The chine 1402 of FIGS. 14-16 is oriented along an example fore-aft direction 1408 relative to the nacelle 400. In the illustrated example of FIGS. 14-16, the fore-aft direction 1408 is defined by an outer mold line of the chine 1402, as further described below. In some examples, the fore-aft direction 1408 is substantially parallel to the central axis 1404 of the nacelle 1400, with the central axis 1404 of the nacelle 1400 being defined by a rotational axis of an engine housed by the nacelle 1400. In other examples, the fore-aft direction 1408 can additionally or alternatively be substantially parallel to a longitudinal axis of a fuselage of an aircraft (e.g., the longitudinal axis 116 of the fuselage 102 of the aircraft 100 of FIGS. 1-3) that includes the nacelle 1400. In still other examples, the orientation of the fore-aft direction 1408 can exceed the above-described substantially parallel relationship(s) relative to the central axis 1404 of the nacelle 1400 and/or the longitudinal axis of the fuselage of the aircraft. The nacelle 1400 of FIGS. 14-16 further includes an example slot 1410 formed in and/or extending through an example outer surface 1412 of the nacelle 1400. The slot 1410 of the nacelle 1400 includes an example front end 1414 and an example rear end 1416 located opposite and/or rearward of the front end 1414. In the illustrated example of FIGS. 14-16, the slot 1410 is oriented along the fore-aft direction 1408.

The chine 1402 of FIGS. 14-16 is coupled to the nacelle 1400. For example, the chine 1402 can include a root portion located inwardly (e.g., radially inwardly) relative to the outer surface 1412 of the nacelle 1400. The root portion of the chine 1402 can be coupled (e.g., operatively coupled) to an actuation mechanism located within the nacelle 1400. An exposed portion of the chine 1402 extends outwardly (e.g., radially outwardly) relative to the outer surface 1412 of the nacelle 1400 through the slot 1410. In the illustrated example of FIGS. 14-16, the chine 1402 is coupled to the nacelle 1400 at a location that is inboard relative to the central axis 1404 of the nacelle 1400. In other examples, the chine 1402 can alternatively be coupled to the nacelle 1400 at a location that is outboard relative to the central axis 1404 of the nacelle 1400.

The chine 1402 of FIGS. 14-16 includes an example leading edge 1418, an example trailing edge 1420 located opposite and/or rearward of the leading edge 1418 of the chine 1402, and an example outer mold line 1422 defined by the leading edge 1418 and the trailing edge 1420 of the chine 1402. The chine 1402 of FIGS. 14-16 has a substantially planar shape (e.g., as defined by the outer mold line 1422) that extends and/or is oriented along the fore-aft direction 1408. The chine 1402 of FIGS. 14-16 is movable and/or adjustable relative to the slot 1410 and/or, more generally, relative to the nacelle 1400 of FIGS. 14-16. More specifically, the chine 1402 of FIGS. 14-16 is rotatable relative to the slot 1410 and/or the nacelle 1400 of FIGS. 14-16. Rotation of the chine 1402 occurs about an example axis of rotation 1426. In the illustrated example of FIGS. 14-16, the axis of rotation 1426 of the chine 1402 is substantially perpendicular to a plane of the chine 1402 defined by the outer mold line 1422 of the chine 1402.

In the illustrated example of FIGS. 14-16, the chine 1402 is movable (e.g., rotatable about the axis of rotation 1426) within the slot 1410 of the nacelle 1400 between the first position (e.g., an upward position) shown in FIG. 14, the second position (e.g., an intermediate position) shown in FIG. 15, and the third position (e.g., a downward position) shown in FIG. 16. The second position of the chine 1402 shown in FIG. 15 is angularly displaced from the first position of the chine 1402 shown in FIG. 14, and the third position of the chine 1402 shown in FIG. 16 is angularly displaced from the second position of the chine 1402 shown in FIG. 15. The first position of the chine 1402 shown in FIG. 14 corresponds to a deployed position of the chine 1402, the second position of the chine 1402 shown in FIG. 15 corresponds to a partially-deployed and/or a partially-stowed position of the chine 1402, and the third position of the chine 1402 shown in FIG. 16 corresponds to a stowed position of the chine 1402. The chine 1402 becomes increasingly submerged and/or retracted relative to the slot 1410 and/or the outer surface 1412 of the nacelle 1400 as the chine 1402 moves (e.g., rotates) from the first position shown in FIG. 14 to the third position shown in FIG. 16.

For example, when the chine 1402 is positioned in the first position shown in FIG. 14, an example portion 1424 of the chine 1402 is exposed and/or extends outwardly (e.g., radially outwardly) relative to the outer surface 1412 of the nacelle 1400 through the slot 1410. As the chine 1402 moves (e.g., rotates) from the first position shown in FIG. 14 to the second position shown in FIG. 15, the portion 1424 of the chine 1402 becomes partially submerged and/or partially retracted relative to the outer surface 1412 of the nacelle 1400 through the slot 1410. As the chine 1402 moves (e.g., rotates) from the second position shown in FIG. 15 to the third position shown in FIG. 16, the portion 1424 of the chine 1402 becomes fully submerged and/or fully retracted relative to the outer surface 1412 of the nacelle 1400 through the slot 1410. In some examples, the chine 1402 is movable (e.g., rotatable) to a position (e.g., a fully-downward position) in which the outer mold line 1422 of the chine 1402 becomes fully submerged and/or fully retracted relative to the outer surface 1412 of the nacelle 1400 through the slot 1410.

The chine 1402 of FIGS. 14-16 can be moved (e.g., rotated about the axis of rotation 1426) in a controlled manner to any number of intermediate positions between the first position shown in FIG. 14 and the third position shown in FIG. 16. The controlled movement (e.g., rotation) of the chine 1402 occurs via an actuation mechanism and a controller of a control system (e.g., the actuation mechanism 3404 and the controller 3406 of the control system 3400 of FIG. 34), as further described below.

The chine 1402 of FIGS. 14-16 is configured (e.g., located on and/or oriented relative to the nacelle 1400 of FIGS. 14-16) to generate a vortex in response to an airflow presented at the chine 1402. In some examples, the vortex generated by the chine 1402 favorably affects a boundary layer located on an upper surface of an aircraft wing to which the nacelle 1400 of FIGS. 14-16 is coupled. Thus, the chine 1402 provides a positive aerodynamic impact in response to an airflow presented at the chine 1402. The vortex generated by the chine 1402 of FIGS. 14-16 changes (e.g., changes its position and/or its strength) as the chine 1402 is moved (e.g., rotated about the axis of rotation 1426) between the first position (e.g., an upward position) shown in FIG. 14, the second position (e.g., an intermediate position) shown in FIG. 15, and the third position (e.g., a downward position) shown in FIG. 16.

For example, when the chine 1402 is positioned in the first position shown in FIG. 14, the chine 1402 is configured to generate a first vortex. When the chine 1402 is positioned in the second position shown in FIG. 15, the chine 1402 is configured to generate a second vortex that differs from the first vortex. When the chine 1402 is positioned in the third position shown in FIG. 16, the chine 1402 is configured to generate a third vortex that differs from the first vortex and also differs from the second vortex. In some examples, the first vortex has a first associated vortex position, the second vortex has a second associated vortex position that differs from the first associated vortex position, and the third vortex has a third associated vortex position that differs from the first associated vortex position and also differs from the second associated vortex position. In some examples, the first vortex has a first associated vortex strength, the second vortex has a second associated vortex strength that differs from the first associated vortex strength, and the third vortex has a third associated vortex strength that differs from the first associated vortex strength and also differs from the second associated vortex strength.

Figure 17:
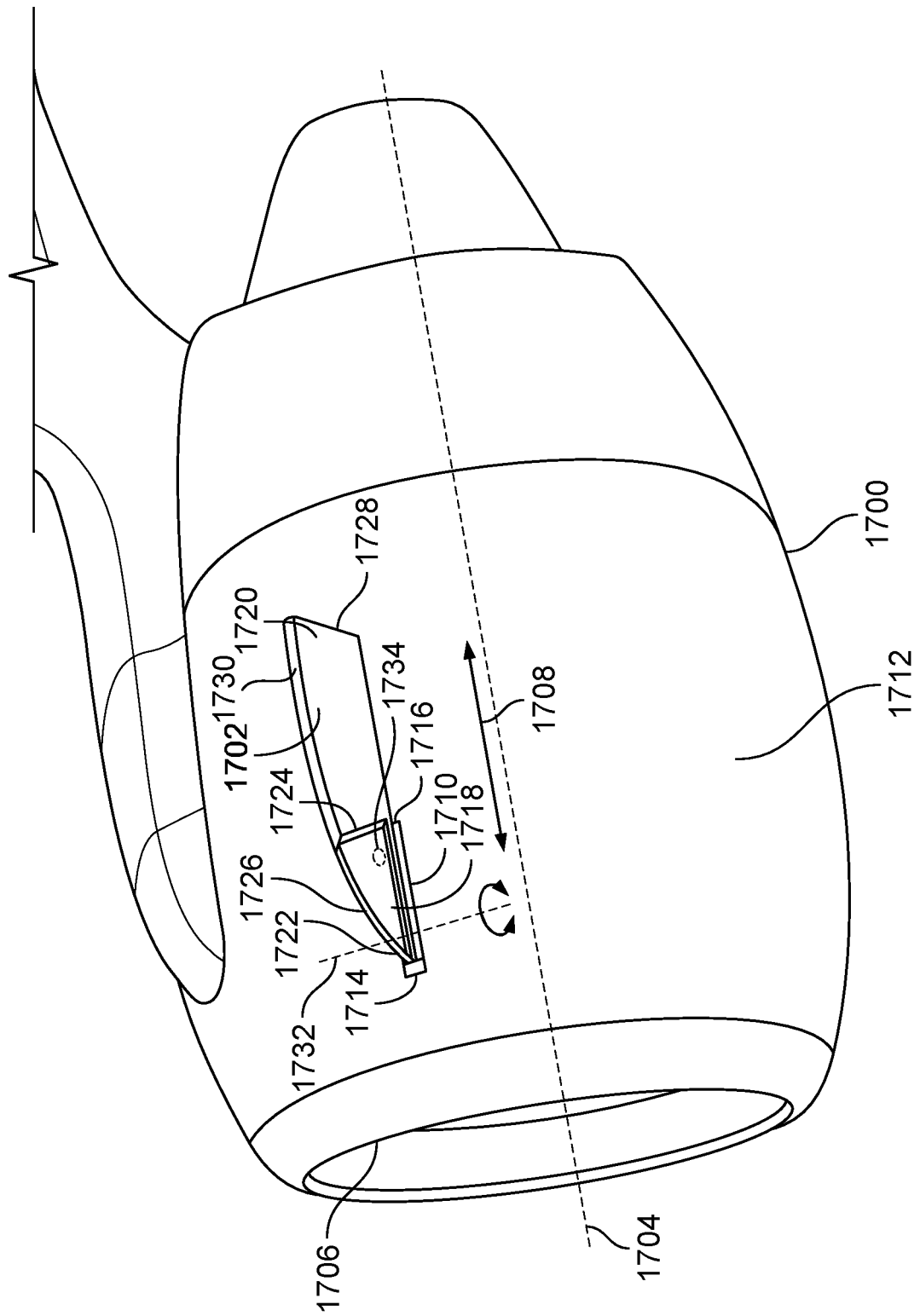
FIG. 17 is a perspective view of an example nacelle having an example multi-segment chine positioned in a first example configuration.
Figure 18:
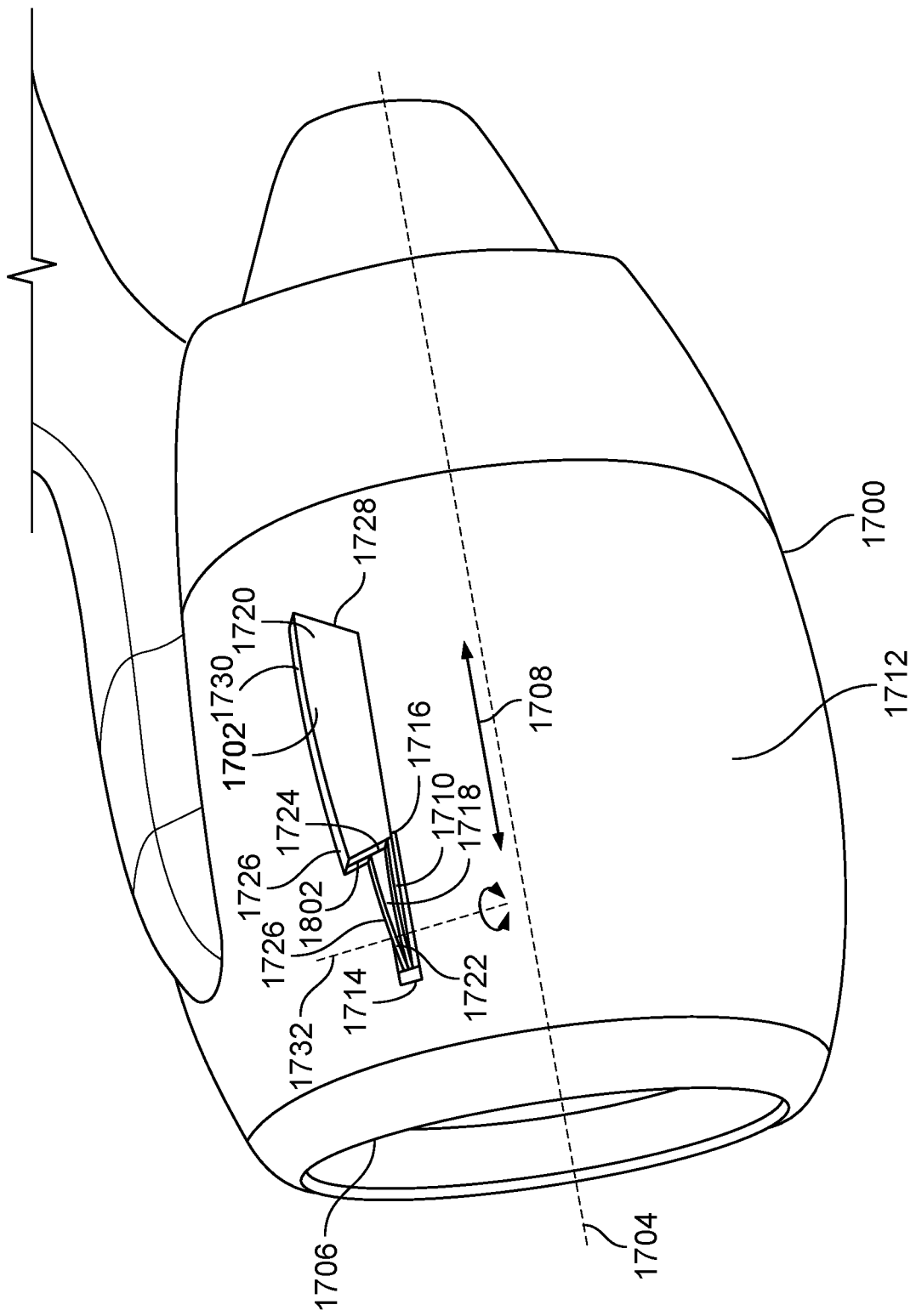
FIG. 18 is a perspective view of the nacelle of FIG. 17 having the multi-segment chine of FIG. 17 positioned in a second example configuration.

FIG. 17 is a perspective view of an example nacelle 1700 having an example multi-segment chine 1702 positioned in a first example configuration. FIG. 18 is a perspective view of the nacelle 1700 of FIG. 17 having the multi-segment chine 1702 of FIG. 17 positioned in a second example configuration. The nacelle 1700 of FIGS. 17 and 18 can be coupled to a wing of an aircraft (e.g., the first wing 104 of the aircraft 100 of FIGS. 1-3). A segment (e.g., a forward and/or leading segment) of the multi-segment chine 1702 of the nacelle 1700 of FIGS. 17 and 18 can be controlled and/or adjusted by a control system of an aircraft (e.g., the control system 3400 of FIG. 34 described below, which may be implemented in the aircraft 100 of FIGS. 1-3).

The nacelle 1700 of FIGS. 17 and 18 includes an example central axis 1704 and an example leading edge 1706. The multi-segment chine 1702 of FIGS. 17 and 18 is oriented along an example fore-aft direction 1708 relative to the nacelle 1700. In the illustrated example of FIGS. 17 and 18, the fore-aft direction 1708 is defined by an outer mold line of the multi-segment chine 1702, as further described below. In some examples, the fore-aft direction 1708 is substantially parallel to the central axis 1704 of the nacelle 1700, with the central axis 1704 of the nacelle 1700 being defined by a rotational axis of an engine housed by the nacelle 1700. In other examples, the fore-aft direction 1708 can additionally or alternatively be substantially parallel to a longitudinal axis of a fuselage of an aircraft (e.g., the longitudinal axis 116 of the fuselage 102 of the aircraft 100 of FIGS. 1-3) that includes the nacelle 1700. In still other examples, the orientation of the fore-aft direction 1708 can exceed the above-described substantially parallel relationship(s) relative to the central axis 1704 of the nacelle 1700 and/or the longitudinal axis of the fuselage of the aircraft. The nacelle 1700 of FIGS. 17 and 18 further includes an example slot 1710 formed in and/or extending through an example outer surface 1712 of the nacelle 1700. The slot 1710 of the nacelle 1700 includes an example front end 1714 and an example rear end 1716 located opposite and/or rearward of the front end 1714. In the illustrated example of FIGS. 17 and 18, the slot 1710 is oriented along the fore-aft direction 1708.

The multi-segment chine 1702 of FIGS. 17 and 18 includes an example first segment 1718 (e.g., a leading segment) and an example second segment 1720 (e.g., a trailing segment) that is substantially coplanar with the first segment 1718. The first segment 1718 and the second segment 1720 are respectively coupled to the nacelle 1700. For example, the first segment 1718 of the multi-segment chine 1702 can include a root portion located inwardly (e.g., radially inwardly) relative to the outer surface 1712 of the nacelle 1700. The root portion of the first segment 1718 of the multi-segment chine 1702 can be coupled (e.g., operatively coupled) to an actuation mechanism located within the nacelle 1700. An exposed portion of the first segment 1718 of the multi-segment chine 1702 extends outwardly (e.g., radially outwardly) relative to the outer surface 1712 of the nacelle 1700 through the slot 1710. The second segment 1720 of the multi-segment chine 1702 can be fixedly coupled to a static (e.g., non-movable) structure located on and/or within the nacelle 1700. In the illustrated example of FIGS. 17 and 18, the multi-segment chine 1702 is coupled to the nacelle 1700 at a location that is inboard relative to the central axis 1704 of the nacelle 1700. In other examples, the multi-segment chine 1702 can alternatively be coupled to the nacelle 1700 at a location that is outboard relative to the central axis 1704 of the nacelle 1700.

The first segment 1718 of the multi-segment chine 1702 of FIGS. 17 and 18 includes an example leading edge 1722, an example trailing edge 1724 located opposite and/or rearward of the leading edge 1722 of the first segment 1718, and an example outer mold line 1726 defined by the leading edge 1722 and the trailing edge 1724 of the first segment 1718. The first segment 1718 of the multi-segment chine 1702 of FIGS. 17 and 18 has a substantially planar shape (e.g., as defined by the outer mold line 1726) that extends and/or is oriented along the fore-aft direction 1708. The first segment 1718 of the multi-segment chine 1702 of FIGS. 17 and 18 is movable and/or adjustable relative to the slot 1710 and/or, more generally, relative to the nacelle 1700 of FIGS. 17 and 18 along the fore-aft direction 1708. More specifically, the first segment 1718 of the multi-segment chine 1702 of FIGS. 17 and 18 is rotatable relative to the slot 1710 and/or the nacelle 1700 of FIGS. 17 and 18. Rotation of the first segment 1718 of the multi-segment chine 1702 occurs about an example axis of rotation 1732. In the illustrated example of FIGS. 17 and 18, the axis of rotation 1732 of the first segment 1718 of the multi-segment chine 1702 is substantially perpendicular to a plane of the first segment 1718 defined by the outer mold line 1726 of the first segment 1718.

The second segment 1720 of the multi-segment chine 1702 of FIGS. 17 and 18 includes an example leading edge 1802, an example trailing edge 1728 located opposite and/or rearward of the leading edge 1802 of the second segment 1720, and an example outer mold line 1730 defined by the leading edge 1802 and the trailing edge 1728 of the second segment 1720. The second segment 1720 of the multi-segment chine 1702 of FIGS. 17 and 18 has a substantially planar shape (e.g., as defined by the outer mold line 1730) that extends and/or is oriented along the fore-aft direction 1708. In the illustrated example of FIGS. 17 and 18, the second segment 1720 of the multi-segment chine 1702 is substantially coplanar with first segment 1718 of the multi-segment chine 1702 along the fore-aft direction 1708. In the illustrated example of FIGS. 17 and 18, the leading edge 1802 of the second segment 1720 of the multi-segment chine 1702 has a curved shape that is complementary to a curved shape of the trailing edge 1724 of the first segment 1718 of the multi-segment chine 1702. In other examples, the leading edge 1802 of the second segment 1720 of the multi-segment chine 1702 can alternatively have a shape that is not complementary to a shape of the trailing edge 1724 of the first segment 1718 of the multi-segment chine 1702. The second segment 1720 of the multi-segment chine 1702 of FIGS. 17 and 18 is fixed relative to the slot 1710 and/or, more generally, relative to the nacelle 1700 of FIGS. 17 and 18 along the fore-aft direction 1708. Thus, the first segment 1718 of the multi-segment chine 1702 is movable (e.g., rotatable) relative to the second segment 1720 of the multi-segment chine 1702.

In the illustrated example of FIGS. 17 and 18, the first segment 1718 of the multi-segment chine 1702 is movable (e.g., rotatable about the axis of rotation 1732) within the slot 1710 of the nacelle 1700 between the first position (e.g., an upward position) shown in FIG. 17 and the second position (e.g., a downward position) shown in FIG. 18. The second position of the first segment 1718 of the multi-segment chine 1702 shown in FIG. 18 is angularly displaced from the first position of the first segment 1718 of the multi-segment chine 1702 shown in FIG. 17. In the illustrated example of FIGS. 17 and 18, the first position of the first segment 1718 of the multi-segment chine 1702 shown in FIG. 17 corresponds to a deployed position of the first segment 1718, and the second position of the first segment 1718 of the multi-segment chine 1702 shown in FIG. 18 corresponds to a stowed position of the first segment 1718. The first segment 1718 of the multi-segment chine 1702 becomes increasingly submerged and/or retracted relative to the slot 1710 and/or the outer surface 1712 of the nacelle 1700 as the first segment 1718 moves (e.g., rotates) from the first position shown in FIG. 17 to the second position shown in FIG. 18.

For example, when the first segment 1718 of the multi-segment chine 1702 is positioned in the first position shown in FIG. 17, an example portion 1734 of the first segment 1718 of the multi-segment chine 1702 is exposed and/or extends outwardly (e.g., radially outwardly) relative to the outer surface 1712 of the nacelle 1700 through the slot 1710. As the first segment 1718 of the multi-segment chine 1702 moves (e.g., rotates) from the first position shown in FIG. 17 to the second position shown in FIG. 18, the portion 1734 of the first segment 1718 of the multi-segment chine 1702 becomes fully submerged and/or fully retracted relative to the outer surface 1712 of the nacelle 1700 through the slot 1710. In some examples, the first segment 1718 of the multi-segment chine 1702 is movable (e.g., rotatable) to a position (e.g., a fully-downward position) in which the outer mold line 1726 of the first segment 1718 of the multi-segment chine 1702 becomes fully submerged and/or fully retracted relative to the outer surface 1712 of the nacelle 1700 through the slot 1710.

The first segment 1718 of the multi-segment chine 1702 of FIGS. 17 and 18 can be moved (e.g., rotated about the axis of rotation 1732) in a controlled manner to any number of intermediate positions between the first position shown in FIG. 17 and the second position shown in FIG. 18. The controlled movement (e.g., rotation) of the first segment 1718 of the multi-segment chine 1702 occurs via an actuation mechanism and a controller of a control system (e.g., the actuation mechanism 3404 and the controller 3406 of the control system 3400 of FIG. 34), as further described below.

The multi-segment chine 1702 of FIGS. 17 and 18 is configured (e.g., located on and/or oriented relative to the nacelle 1700 of FIGS. 17 and 18) to generate a vortex in response to an airflow presented at the multi-segment chine 1702. In some examples, the vortex generated by the multi-segment chine 1702 favorably affects a boundary layer located on an upper surface of an aircraft wing to which the nacelle 1700 of FIGS. 17 and 18 is coupled. Thus, the multi-segment chine 1702 provides a positive aerodynamic impact in response to an airflow presented at the multi-segment chine 1702. The vortex generated by the multi-segment chine 1702 of FIGS. 17 and 18 changes (e.g., changes its position and/or its strength) as the first segment 1718 of the multi-segment chine 1702 is moved (e.g., rotated about the axis of rotation 1732) between the first position (e.g., an upward position) shown in FIG. 17 and the second position (e.g., a downward position) shown in FIG. 18.

For example, when the first segment 1718 of the multi-segment chine 1702 is positioned in the first position shown in FIG. 17, the multi-segment chine 1702 is configured to generate a first vortex. When the first segment 1718 of the multi-segment chine 1702 is positioned in the second position shown in FIG. 18, the multi-segment chine 1702 is configured to generate a second vortex that differs from the first vortex. In some examples, the first vortex has a first associated vortex position, and the second vortex has a second associated vortex position that differs from the first associated vortex position. In some examples, the first vortex has a first associated vortex strength, and the second vortex has a second associated vortex strength that differs from the first associated vortex strength.

As described above in connection with FIGS. 17 and 18, the first (e.g., leading) segment 1718 of the multi-segment chine 1702 is rotatable, and the second (e.g., trailing) segment 1720 of the multi-segment chine 1702 is fixed. In other examples, the first (e.g., leading) segment 1718 of the multi-segment chine 1702 can alternatively be fixed, and the second (e.g., trailing) segment 1720 of the multi-segment chine 1702 can alternatively be rotatable. Furthermore, the respective sizes and/or dimensions (e.g., lengths) of the first segment 1718 and the second segment 1720 of the multi-segment chine 1702 may differ relative to the configuration shown in FIGS. 17 and 18. For example, the first (e.g., leading) segment 1718 of the multi-segment chine 1702 can have a length that exceeds a length of the second (e.g., trailing) segment 1720 of the multi-segment chine 1702.

Figure 19:
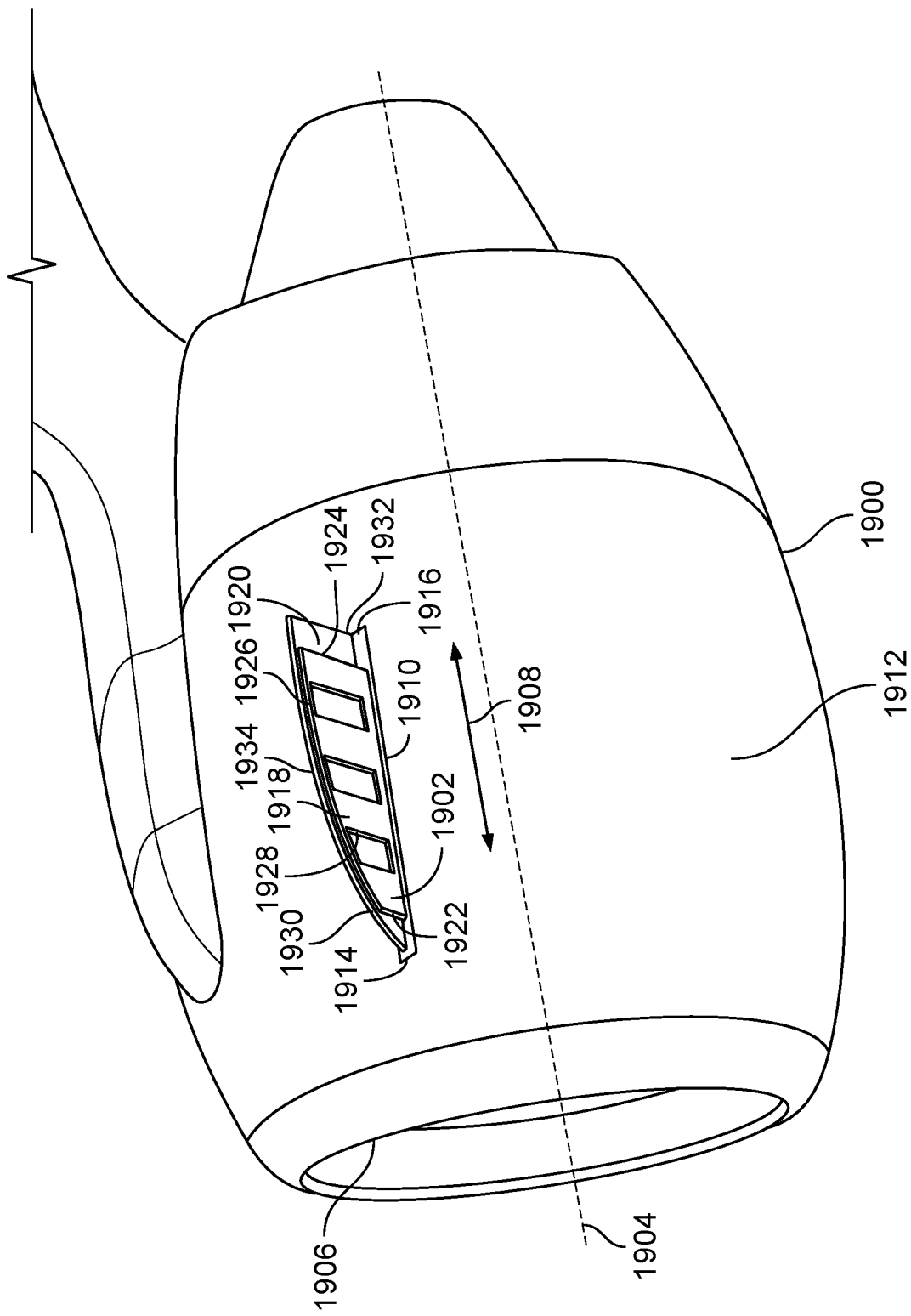
FIG. 19 is a perspective view of an example nacelle having an example multi-segment chine positioned in a first example configuration.
Figure 20:
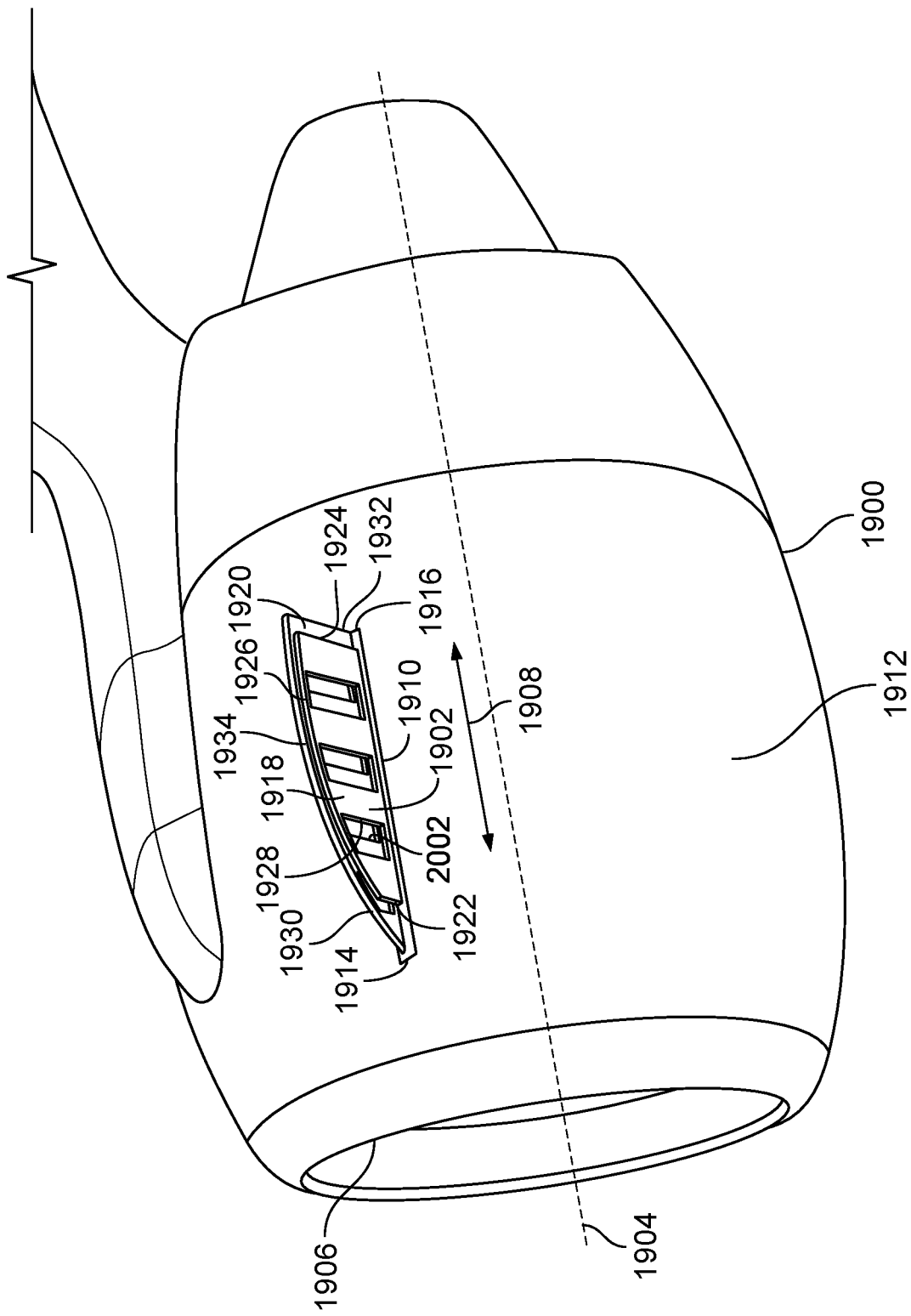
FIG. 20 is a perspective view of the nacelle of FIG. 19 having the multi-segment chine of FIG. 19 positioned in a second example configuration.
Figure 21:
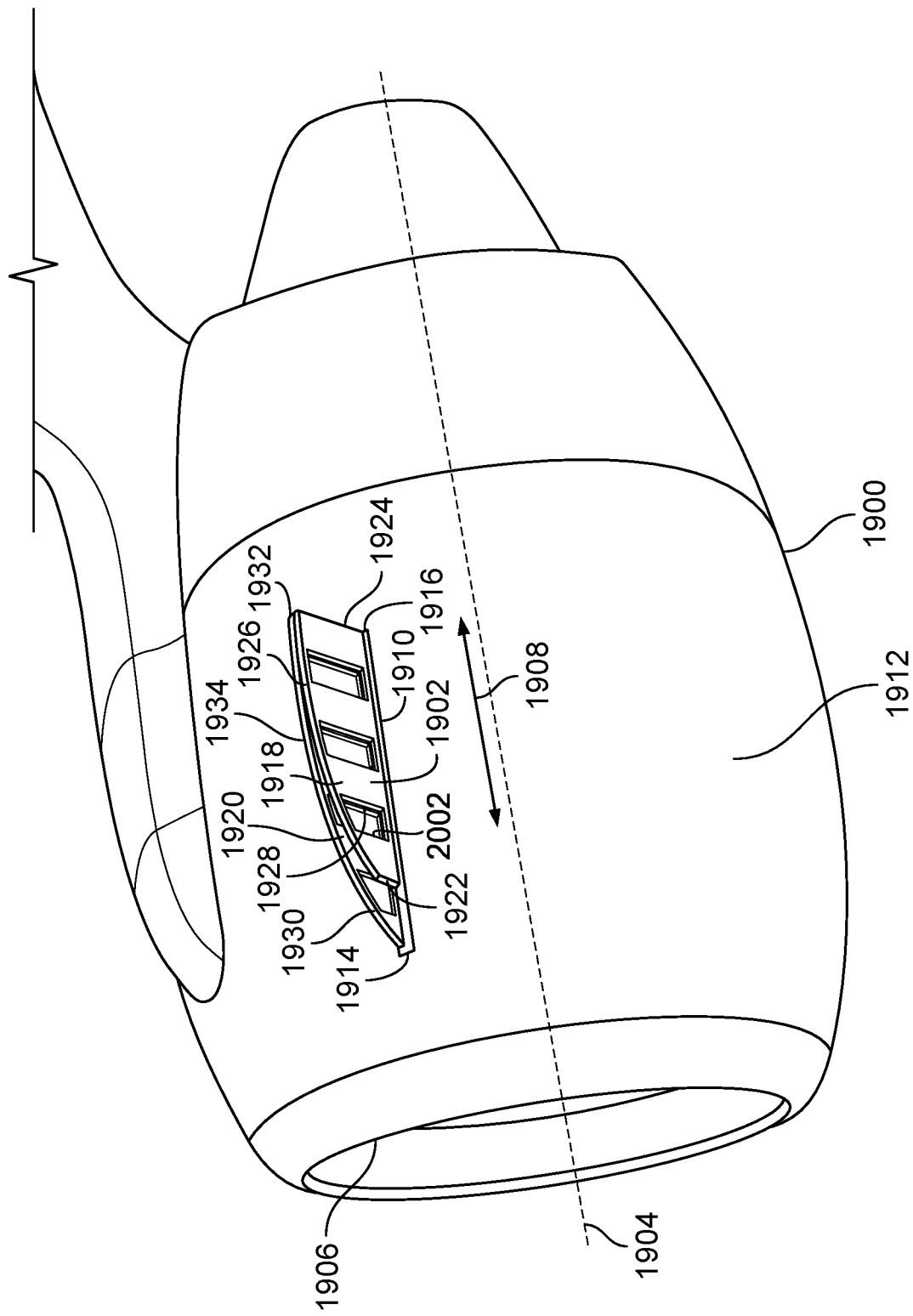
FIG. 21 is a perspective view of the nacelle of FIGS. 19 and 20 having the multi-segment chine of FIGS. 19 and 20 positioned in a third example configuration.

FIG. 19 is a perspective view of an example nacelle 1900 having an example multi-segment chine 1902 positioned in a first example configuration. FIG. 20 is a perspective view of the nacelle 1900 of FIG. 19 having the multi-segment chine 1902 of FIG. 19 positioned in a second example configuration. FIG. 21 is a perspective view of the nacelle 1900 of FIGS. 19 and 20 having the multi-segment chine 1902 of FIGS. 19 and 20 positioned in a third example configuration. The nacelle 1900 of FIGS. 19-21 can be coupled to a wing of an aircraft (e.g., the first wing 104 of the aircraft 100 of FIGS. 1-3). The multi-segment chine 1902 of the nacelle 1900 of FIGS. 19-21 can be controlled and/or adjusted by a control system of an aircraft (e.g., the control system 3400 of FIG. 34 described below, which may be implemented in the aircraft 100 of FIGS. 1-3).

The nacelle 1900 of FIGS. 19-21 includes an example central axis 1904 and an example leading edge 1906. The multi-segment chine 1902 of FIGS. 19-21 is oriented along an example fore-aft direction 1908 relative to the nacelle 1900. In the illustrated example of FIGS. 19-21, the fore-aft direction 1908 is defined by an outer mold line of the multi-segment chine 1902, as further described below. In some examples, the fore-aft direction 1908 is substantially parallel to the central axis 1904 of the nacelle 1900, with the central axis 1904 of the nacelle 1900 being defined by a rotational axis of an engine housed by the nacelle 1900. In other examples, the fore-aft direction 1908 can additionally or alternatively be substantially parallel to a longitudinal axis of a fuselage of an aircraft (e.g., the longitudinal axis 116 of the fuselage 102 of the aircraft 100 of FIGS. 1-3) that includes the nacelle 1900. In still other examples, the orientation of the fore-aft direction 1908 can exceed the above-described substantially parallel relationship(s) relative to the central axis 1904 of the nacelle 1900 and/or the longitudinal axis of the fuselage of the aircraft. In the illustrated example of FIGS. 19-21, the nacelle 1900 further includes an example slot 1910 formed in and/or extending through an example outer surface 1912 of the nacelle 1900. The slot 1910 of the nacelle 1900 includes an example front end 1914 and an example rear end 1916 located opposite and/or rearward of the front end 1914. In the illustrated example of FIGS. 19-21, the slot 1910 is oriented along the fore-aft direction 1908. In other examples, the slot 1910 of FIGS. 19-21 can be omitted from the nacelle 1900.

The multi-segment chine 1902 of FIGS. 19-21 includes an example first segment 1918 and an example second segment 1920 that is substantially coplanar with the first segment 1918 of the multi-segment chine 1902. The first segment 1918 and the second segment 1920 of the multi-segment chine 1902 are respectively coupled to the nacelle 1900. For example, the first segment 1918 of the multi-segment chine 1902 can respectively include a root portion located inwardly (e.g., radially inwardly) relative to the outer surface 1912 of the nacelle 1900. The root portion of the first segment 1918 can be coupled (e.g., operatively coupled) to an actuation mechanism located within the nacelle 1900. An exposed portion of the first segment 1918 extends outwardly (e.g., radially outwardly) relative to the outer surface 1912 of the nacelle 1900 through the slot 1910. The second segment 1920 of the multi-segment chine 1902 can be fixedly coupled to a static (e.g., non-movable) structure located on and/or within the nacelle 1900. In the illustrated example of FIGS. 19-21, the multi-segment chine 1902 (including the first segment 1918 and the second segment 1920 thereof) is coupled to the nacelle 1900 at a location that is inboard relative to the central axis 1904 of the nacelle 1900. In other examples, the multi-segment chine 1902 can alternatively be coupled to the nacelle 1900 at a location that is outboard relative to the central axis 1904 of the nacelle 1900.

The first segment 1918 of the multi-segment chine 1902 of FIGS. 19-21 includes an example leading edge 1922, an example trailing edge 1924 located opposite and/or rearward of the leading edge 1922 of the first segment 1918, an example outer mold line 1926 defined by the leading edge 1922 and the trailing edge 1924 of the first segment 1918, and one or more example airflow opening(s) 1928 (e.g., one or more through hole(s)) extending transversely through the first segment 1918 of the multi-segment chine 1902. The first segment 1918 of the multi-segment chine 1902 of FIGS. 19-21 has a substantially planar shape (e.g., as defined by the outer mold line 1926) that extends and/or is oriented along the fore-aft direction 1908. The first segment 1918 of the multi-segment chine 1902 of FIGS. 19-21 is movable and/or adjustable relative to the nacelle 1900 of FIGS. 19-21 along the fore-aft direction 1908. More specifically, the first segment 1918 of the multi-segment chine 1902 of FIGS. 19-21 is translatable relative to the nacelle 1900 of FIGS. 19-21 along the fore-aft direction 1908.

The second segment 1920 of the multi-segment chine 1902 of FIGS. 19-21 includes an example leading edge 1930, an example trailing edge 1932 located opposite and/or rearward of the leading edge 1930 of the second segment 1920, an example outer mold line 1934 defined by the leading edge 1930 and the trailing edge 1932 of the second segment 1920, and one or more example airflow opening(s) 2002 (e.g., one or more through hole(s)) extending transversely through the second segment 1920 of the multi-segment chine 1902. The second segment 1920 of the multi-segment chine 1902 of FIGS. 19-21 has a substantially planar shape (e.g., as defined by the outer mold line 1934 that extends and/or is oriented along the fore-aft direction 1908. In the illustrated example of FIGS. 19-21, the second segment 1920 of the multi-segment chine 1902 is substantially coplanar with the first segment 1918 of the multi-segment chine 1902 along the fore-aft direction 1908. In some examples, the second segment 1920 of the multi-segment chine 1902 can be formed as a frame that substantially houses and/or surrounds the exposed portion of the first segment 1918 that extends outwardly (e.g., radially outwardly) relative to the outer surface 1912 of the nacelle 1900 through the slot 1910.

In the illustrated example of FIGS. 19-21, the second segment 1920 of the multi-segment chine 1902 is fixed relative to the nacelle 1900 of FIGS. 19-21 along the fore-aft direction 1908. Thus, the first segment 1918 of the multi-segment chine 1902 is movable (e.g., translatable) relative to the second segment 1920 of the multi-segment chine 1902. In other examples, the second segment 1920 of the multi-segment chine 1902 of FIGS. 19-21 can be movable and/or adjustable relative to the nacelle 1900 of FIGS. 19-21 along the fore-aft direction 1908. For example, the second segment 1920 of the multi-segment chine 1902 of FIGS. 19-21 can be translatable relative to the nacelle 1900 of FIGS. 19-21 along the fore-aft direction 1908 of the nacelle 1900. In such examples, the first segment 1918 of the multi-segment chine 1902 remains movable (e.g., translatable) relative to the second segment 1920 of the multi-segment chine 1902.

Respective ones of the airflow opening(s) 1928 of the first segment 1918 of the multi-segment chine 1902 are sized, shaped and/or configured to be selectively transversely aligned (e.g., transversely misaligned, partially transversely aligned and/or fully transversely aligned) with corresponding respective ones of the airflow opening(s) 2002 of the second segment 1920 of the multi-segment chine 1902 along the fore-aft direction 1908. In the illustrated example of FIGS. 19-21, respective ones of the airflow opening(s) 1928 of the first segment and corresponding respective ones of the airflow opening(s) 2002 of the second segment 1920 have generally rectangular shapes that extend in a first direction. In other examples, respective ones of the airflow opening(s) 1928 of the first segment and/or corresponding respective ones of the airflow opening(s) 2002 of the second segment 1920 can alternatively have generally rectangular shapes that extend in a second direction differing from the first direction shown in FIGS. 19-21. In still other examples, respective ones of the airflow opening(s) 1928 of the first segment and/or corresponding respective ones of the airflow opening(s) 2002 of the second segment 1920 can alternatively have non-rectangular shapes (e.g., triangular shapes, circular shapes, ovular shapes, irregular shapes, etc.) differing from the rectangular shapes shown in FIGS. 19-21. The airflow opening(s) 1928 of the first segment 1918 and/or the airflow opening(s) 2002 of the second segment 1920 can be of any quantity and/or number, can be of any size and/or shape, and can be arranged and/or oriented according to any regular or irregular pattern and/or configuration that enables respective ones of the airflow opening(s) 1928 of the first segment 1918 to be selectively transversely aligned (e.g., transversely misaligned, partially transversely aligned and/ or fully transversely aligned) with corresponding respective ones of the airflow opening(s) 2002 of the second segment 1920 along the fore-aft direction 1908.

The first configuration of the multi-segment chine 1902 shown in FIG. 19 corresponds to a forward position of the first segment 1918 of the multi-segment chine 1902 and a fixed position of the second segment 1920 of the multi-segment chine 1902. The second configuration of the multi-segment chine 1902 shown in FIG. 20 corresponds to an intermediate position of the first segment 1918 of the multi-segment chine 1902 and a fixed position of the second segment 1920 of the multi-segment chine 1902. The third configuration of the multi-segment chine 1902 shown in FIG. 21 corresponds to a rearward position of the first segment 1918 of the multi-segment chine 1902 and a fixed position of the second segment 1920 of the multi-segment chine 1902. The first segment 1918 of the multi-segment chine 1902 of FIGS. 19-21 is movable (e.g., translatable) along the fore-aft direction 1908 (e.g., within the slot 1910 of the nacelle 1900) between the first configuration of the multi-segment chine 1902 (e.g., the forward position of the first segment 1918) shown in FIG. 19, the second configuration of the multi-segment chine 1902 (e.g., the intermediate position of the first segment 1918) shown in FIG. 20, and the third configuration of the multi-segment chine 1902 (e.g., the rearward position of the first segment 1918) shown in FIG. 21.

When the first segment 1918 of the multi-segment chine 1902 is positioned in the first configuration of the multi-segment chine 1902 shown in FIG. 19, the leading edge 1922 of the first segment 1918 is spaced from the leading edge 1906 of the nacelle 1900 by a first distance. When the first segment 1918 of the multi-segment chine 1902 is positioned in the second configuration of the multi-segment chine 1902 shown in FIG. 20, the leading edge 1922 of the first segment 1918 is spaced from the leading edge 1906 of the nacelle 1900 by a second distance greater than the first distance. When the first segment 1918 of the multi-segment chine 1902 is positioned in the third configuration of the multi-segment chine 1902 shown in FIG. 21, the leading edge 1922 of the first segment 1918 is spaced from the leading edge 1906 of the nacelle 1900 by a third distance greater than the second distance.

When the first segment 1918 of the multi-segment chine 1902 is positioned (e.g., relative to the second segment 1920 of the multi-segment chine 1902) in the first configuration shown in FIG. 19, the first segment 1918 covers the airflow opening(s) 2002 of the second segment 1920, and the second segment 1920 covers the airflow opening(s) 1928 of the first segment 1918. In other words, respective ones of the airflow opening(s) 1928 of the first segment 1918 are not transversely aligned with corresponding respective ones of the airflow opening(s) 2002 of the second segment 1920 along the fore-aft direction 1908. Thus, air is unable to flow transversely through the multi-segment chine 1902 of FIGS. 19-21 when the multi-segment chine 1902 is positioned in the first configuration shown in FIG. 19.

When the first segment 1918 of the multi-segment chine 1902 is positioned (e.g., relative to the second segment 1920 of the multi-segment chine 1902) in the second configuration shown in FIG. 20, the first segment 1918 only partially covers the airflow opening(s) 2002 of the second segment 1920, and the second segment 1920 only partially covers the airflow opening(s) 1928 of the first segment 1918. In other words, respective ones of the airflow opening(s) 1928 of the first segment 1918 are partially transversely aligned with corresponding respective ones of the airflow opening(s) 2002 of the second segment 1920 along the fore-aft direction 1908. Thus, a first volume of air is able to flow transversely through the multi-segment chine 1902 of FIGS. 19-21 when the multi-segment chine 1902 is positioned in the second configuration shown in FIG. 20.

When the first segment 1918 of the multi-segment chine 1902 is positioned (e.g., relative to the second segment 1920 of the multi-segment chine 1902) in the third configuration shown in FIG. 21, the first segment 1918 does not cover the airflow opening(s) 2002 of the second segment 1920, and the second segment 1920 does not cover the airflow opening(s) 1928 of the first segment 1918. In other words, respective ones of the airflow opening(s) 1928 of the first segment 1918 are transversely aligned with corresponding respective ones of the airflow opening(s) 2002 of the second segment 1920 along the fore-aft direction 1908. Thus, a second volume of air greater than the first volume of air is able to flow transversely through the multi-segment chine 1902 of FIGS. 19-21 when the multi-segment chine 1902 is positioned in the third configuration shown in FIG. 21.

In the illustrated example of FIGS. 19-21, the first segment 1918 of the multi-segment chine 1902 can be moved (e.g., translated along the fore-aft direction 1908) in a controlled manner to any number of intermediate positions between the first position shown in FIG. 19 and the third position shown in FIG. 21. The controlled movement (e.g., translation) of the first segment 1918 of the multi-segment chine 1902 occurs via an actuation mechanism and a controller of a control system (e.g., the actuation mechanism 3404 and the controller 3406 of the control system 3400 of FIG. 34), as further described below.

The multi-segment chine 1902 of FIGS. 19-21 is configured (e.g., located on and/or oriented relative to the nacelle 1900 of FIGS. 19-21) to generate a vortex in response to an airflow presented at the multi-segment chine 1902. In some examples, the vortex generated by the multi-segment chine 1902 favorably affects a boundary layer located on an upper surface of an aircraft wing to which the nacelle 1900 of FIGS. 19-21 is coupled. Thus, the multi-segment chine 1902 provides a positive aerodynamic impact in response to an airflow presented at the multi-segment chine 1902. The vortex generated by the multi-segment chine 1902 of FIGS. 19-21 changes (e.g., changes its position and/or its strength) as the first segment 1918 of the multi-segment chine 1902 is moved (e.g., translated along the fore-aft direction 1908) between the first position (e.g., a forward position of the first segment 1918) shown in FIG. 19, the second position (e.g., an intermediate position of the first segment 1918) shown in FIG. 20, and the third position (e.g., a rearward position of the first segment 1918) shown in FIG. 21.

For example, when the first segment 1918 of the multi-segment chine 1902 is positioned in the first position shown in FIG. 19, the multi-segment chine 1902 is configured to generate a first vortex. When the first segment 1918 of the multi-segment chine 1902 is positioned in the second position shown in FIG. 20, the multi-segment chine 1902 is configured to generate a second vortex that differs from the first vortex. When the first segment 1918 of the multi-segment chine 1902 is positioned in the third position shown in FIG. 21, the multi-segment chine 1902 is configured to generate a third vortex that differs from the first vortex and also differs from the second vortex. In some examples, the first vortex has a first associated vortex position, the second vortex has a second associated vortex position that differs from the first associated vortex position, and the third vortex has a third associated vortex position that differs from the first associated vortex position and also differs from the second associated vortex position. In some examples, the first vortex has a first associated vortex strength, the second vortex has a second associated vortex strength that differs from the first associated vortex strength, and the third vortex has a third associated vortex strength that differs from the first associated vortex strength and also differs from the second associated vortex strength.

Figure 22:
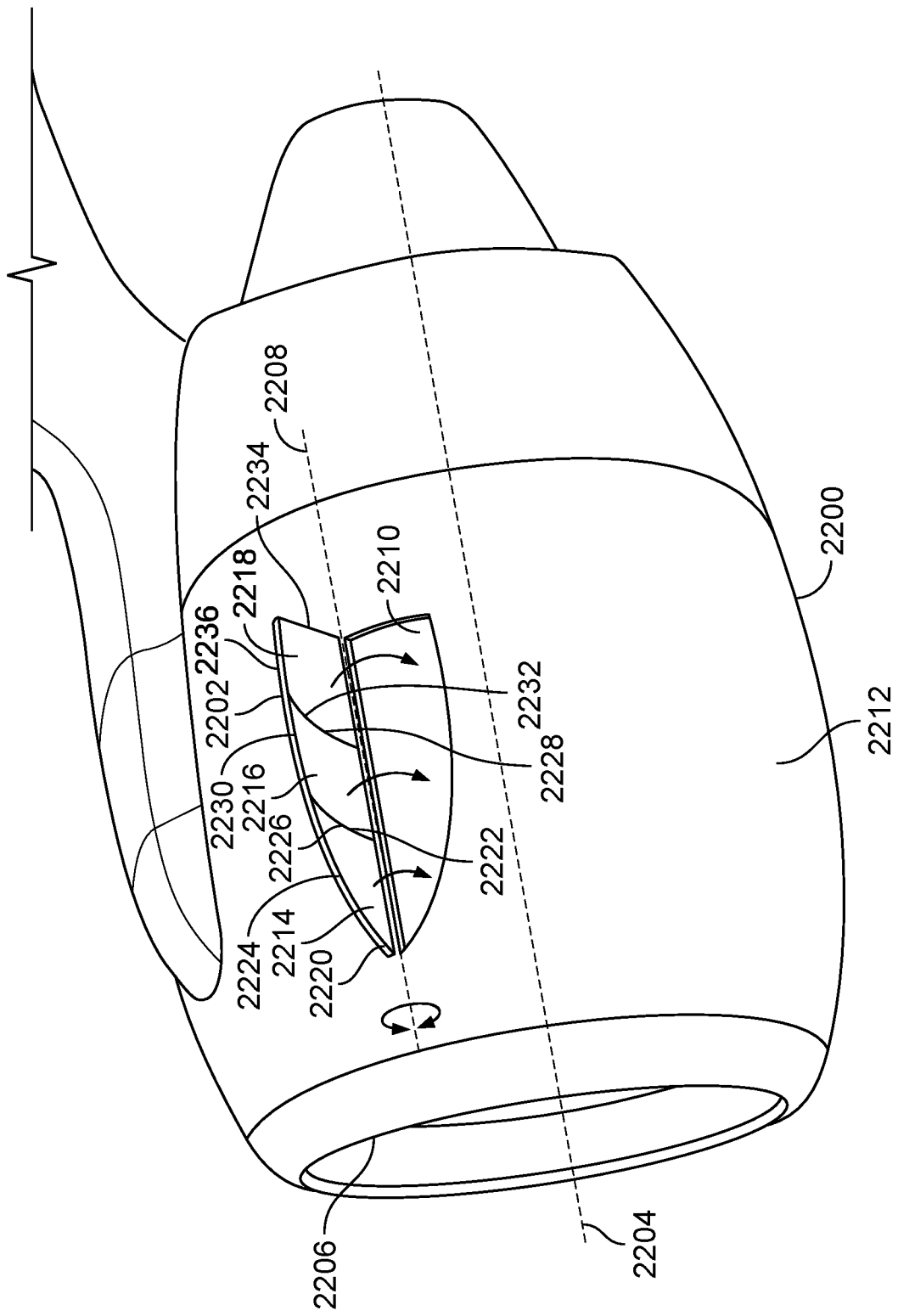
FIG. 22 is a perspective view of an example nacelle having an example multi-segment chine positioned in a first example configuration.
Figure 23:
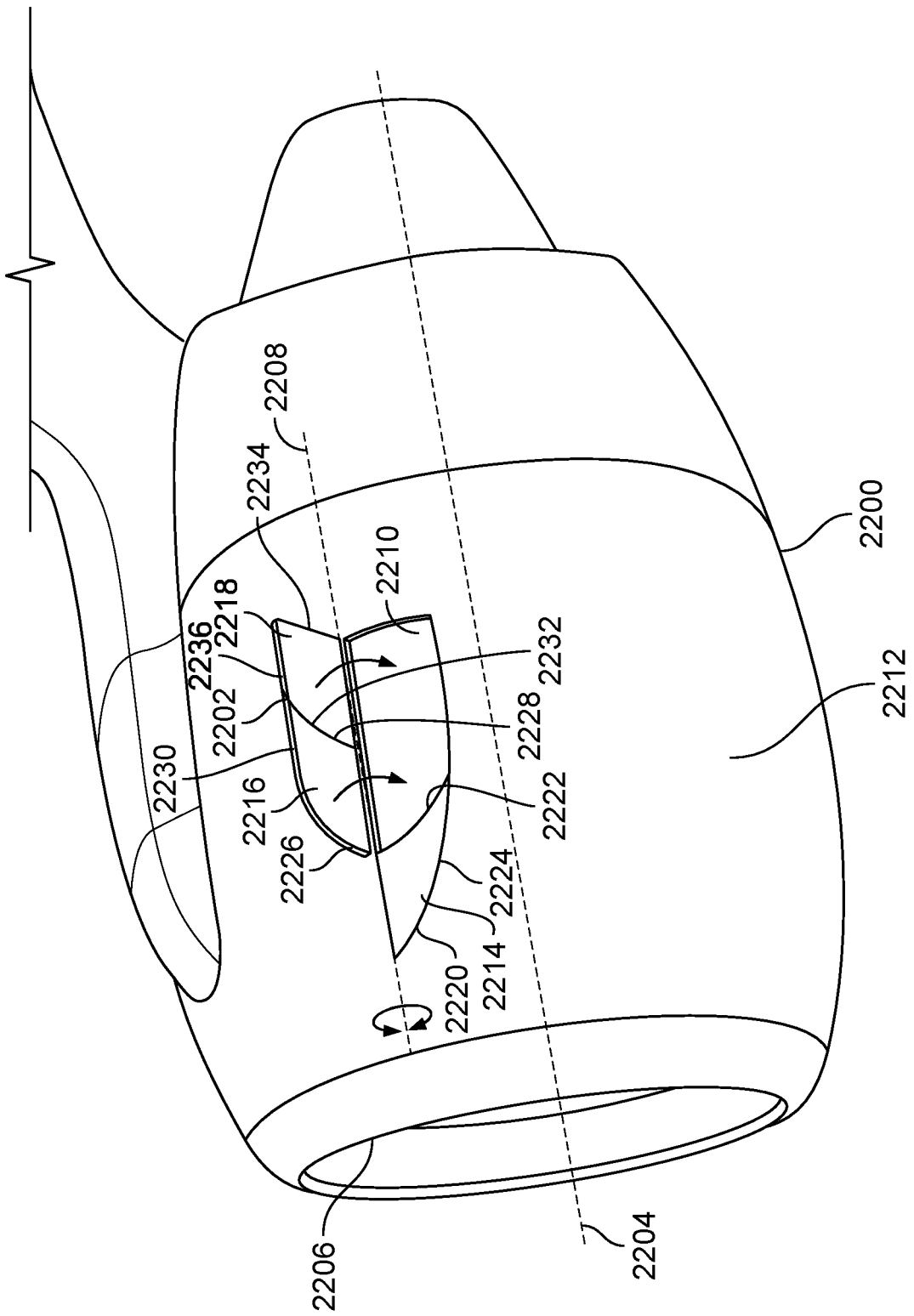
FIG. 23 is a perspective view of the nacelle of FIG. 22 having the multi-segment chine of FIG. 22 positioned in a second example configuration.
Figure 24:
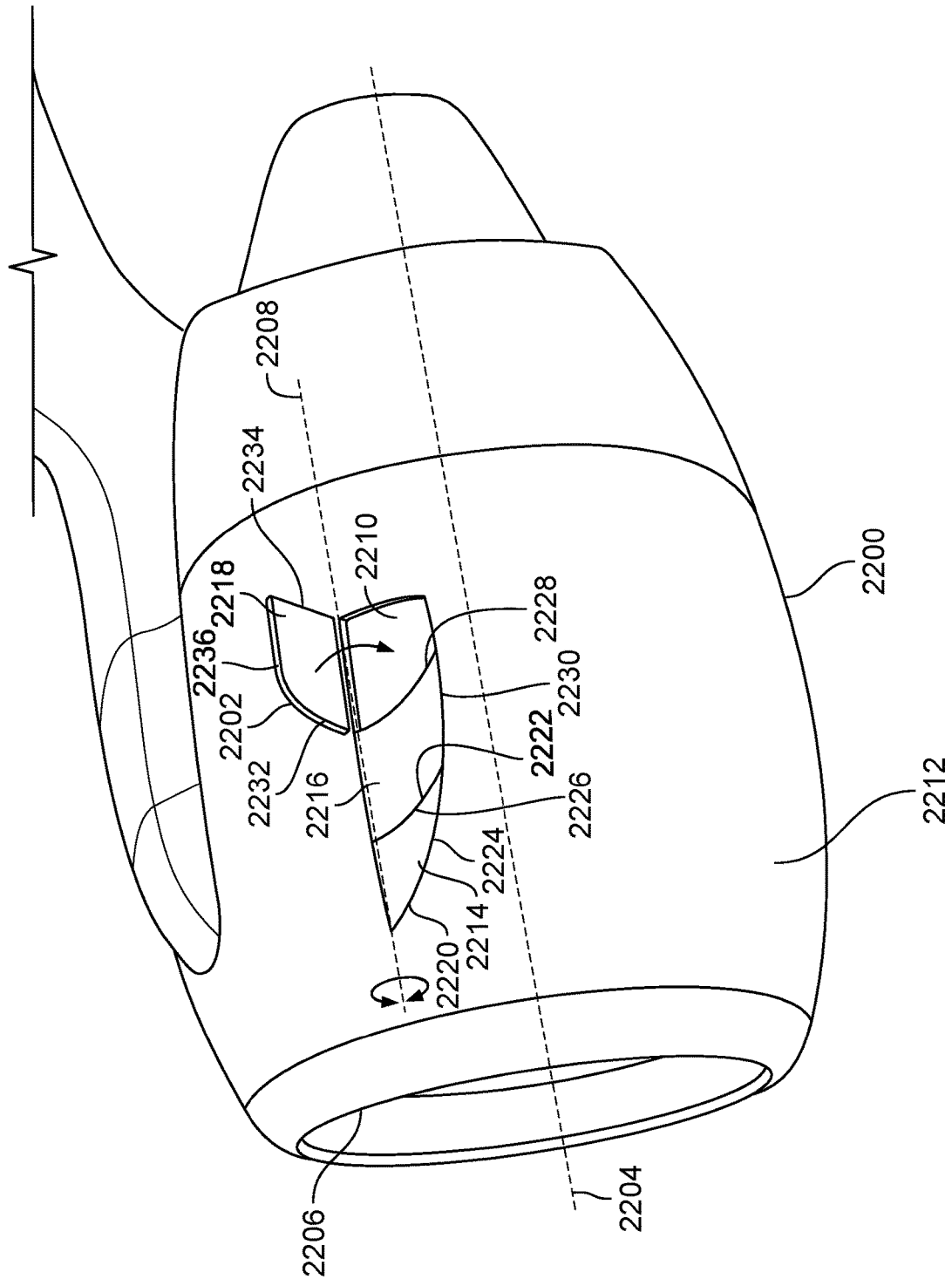
FIG. 24 is a perspective view of the nacelle of FIGS. 22 and 23 having the multi-segment chine of FIGS. 22 and 23 positioned in a third example configuration.
Figure 25:
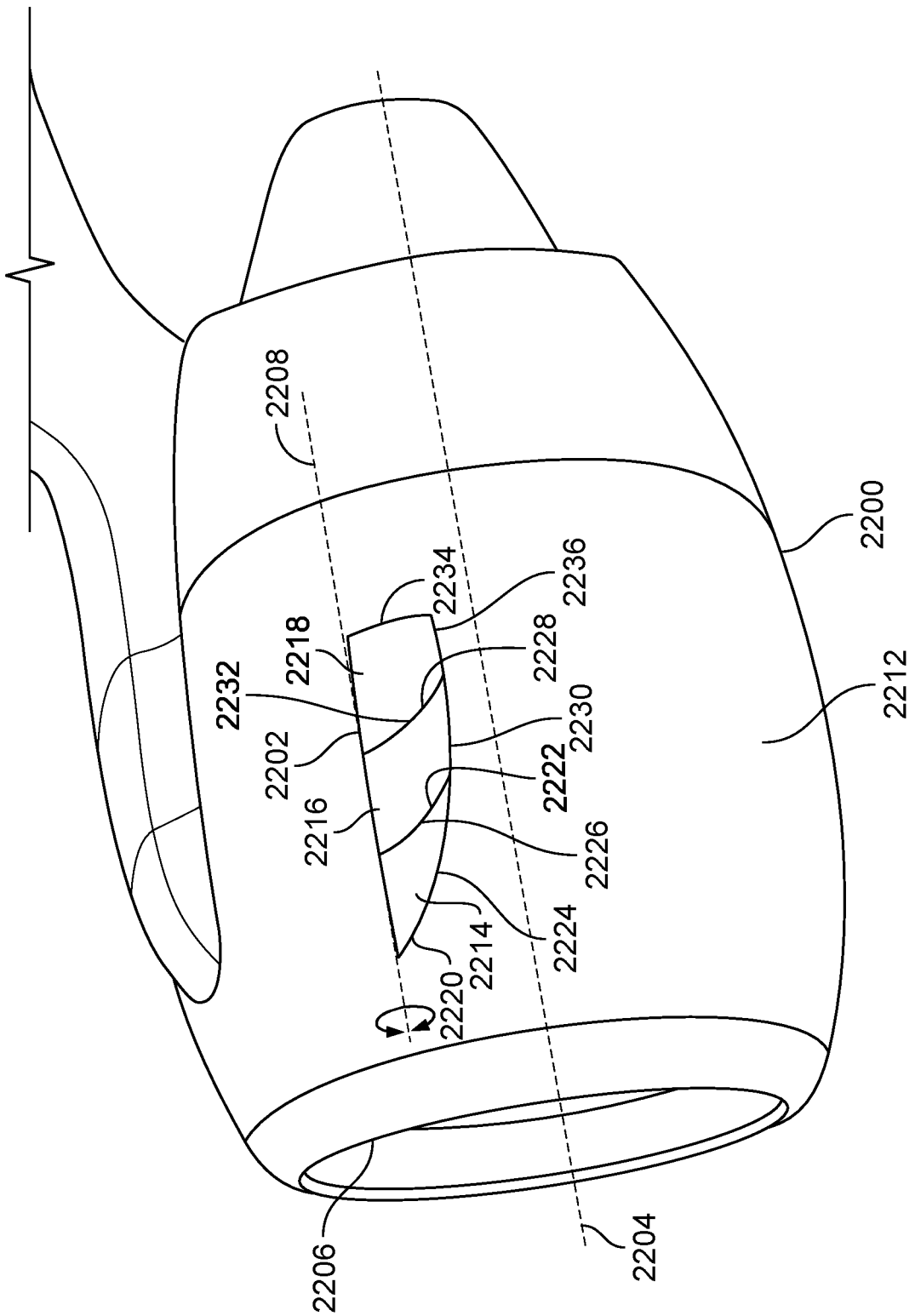
FIG. 25 is a perspective view of the nacelle of FIGS. 22-24 having the multi-segment chine of FIGS. 22-24 positioned in a fourth example configuration.

FIG. 22 is a perspective view of an example nacelle 2200 having an example multi-segment chine 2202 positioned in a first example configuration. FIG. 23 is a perspective view of the nacelle 2200 of FIG. 22 having the multi-segment chine 2202 of FIG. 22 positioned in a second example configuration. FIG. 24 is a perspective view of the nacelle 2200 of FIGS. 22 and 23 having the multi-segment chine 2202 of FIGS. 22 and 23 positioned in a third example configuration. FIG. 25 is a perspective view of the nacelle 2200 of FIGS. 22-24 having the multi-segment chine 2202 of FIGS. 22-24 positioned in a fourth example configuration. The nacelle 2200 of FIGS. 22-25 can be coupled to a wing of an aircraft (e.g., the first wing 104 of the aircraft 100 of FIGS. 1-3). The multi-segment chine 2202 of the nacelle 2200 of FIGS. 22-25 can be controlled and/or adjusted by a control system of an aircraft (e.g., the control system 3400 of FIG. 34 described below, which may be implemented in the aircraft 100 of FIGS. 1-3).

The nacelle 2200 of FIGS. 22-25 includes an example central axis 2204 and an example leading edge 2206. The multi-segment chine 2202 of FIGS. 22-25 is rotatably coupled to the nacelle 2200, and is rotatable relative to the nacelle 2200 about an example axis of rotation 2208. In some examples, the axis of rotation 2208 of the multi-segment chine 2202 is substantially parallel to the central axis 2204 of the nacelle 2200, with the central axis 2204 of the nacelle 2200 being defined by a rotational axis of an engine housed by the nacelle 2200. In other examples, the axis of rotation 2208 of the multi-segment chine 2202 can be oriented at an angle beyond substantially parallel relative to the central axis 2204 of the nacelle 2200. The nacelle 2200 of FIGS. 22-25 further includes an example recess 2210 formed in and/or extending into an example outer surface 2212 of the nacelle 2200. The recess 2210 is sized, shaped and/or configured to receive the multi-segment chine 2202 of FIGS. 22-25 and/or respective segments thereof, as further described below.

The multi-segment chine 2202 of FIGS. 22-25 includes an example first segment 2214 (e.g., a leading segment), an example second segment 2216 (e.g., an intermediate segment), and an example third segment 2218 (e.g., a trailing segment). The first segment 2214, the second segment 2216, and the third segment 2218 are respectively rotatably coupled to the nacelle 2200, and are independently rotatable relative to the nacelle 2200 about the axis of rotation 2208. For example, the first segment 2214 of the multi-segment chine 2202 is rotatable about the axis of rotation 2208 independently of any rotation of the second segment 2216 and/or the third segment 2218 of the multi-segment chine 2202 about the axis of rotation 2208, the second segment 2216 of the multi-segment chine 2202 is rotatable about the axis of rotation 2208 independently of any rotation of the first segment 2214 and/or the third segment 2218 of the multi-segment chine 2202 about the axis of rotation 2208, and the third segment 2218 of the multi-segment chine 2202 is rotatable about the axis of rotation 2208 independently of any rotation of the first segment 2214 and/or the second segment 2216 of the multi-segment chine 2202 about the axis of rotation 2208.

In the illustrated example of FIGS. 22-25, the multi-segment chine 2202 is coupled to the nacelle 2200 at a location that is inboard relative to the central axis 2204 of the nacelle 2200. In other examples, the multi-segment chine 2202 can alternatively be coupled to the nacelle 2200 at a location that is outboard relative to the central axis 2204 of the nacelle 2200. In the illustrated example of FIGS. 22-25, the multi-segment chine 2202 includes a total of three segments. In other examples, the multi-segment chine 2202 can include a different number (e.g., 2, 4, 5, etc.) of segments implemented in a manner similar to and/or consistent with the three-segment implementation shown and described in connection with FIGS. 22-25.

The first segment 2214 of the multi-segment chine 2202 of FIGS. 22-25 includes an example leading edge 2220, an example trailing edge 2222 located opposite and/or rearward of the leading edge 2220 of the first segment 2214, and an outer mold line 2224 defined by the leading edge 2220 and the trailing edge 2222 of the first segment 2214. The first segment 2214 of the multi-segment chine 2202 has a substantially planar shape (e.g., as defined by the outer mold line 2224). In some examples, the substantially planar shape of the first segment 2214 can be contoured to match a contour of the recess 2210 and/or a contour of a local area of the outer surface 2212 of the nacelle 2200.

The second segment 2216 of the multi-segment chine 2202 of FIGS. 22-25 includes an example leading edge 2226, an example trailing edge 2228 located opposite and/or rearward of the leading edge 2226 of the second segment 2216, and an outer mold line 2230 defined by the leading edge 2226 and the trailing edge 2228 of the second segment 2216. The leading edge 2226 of the second segment 2216 of the multi-segment chine 2202 has a curved shape that is complementary to a curved shape of the trailing edge 2222 of the first segment 2214 of the multi-segment chine 2202. The second segment 2216 of the multi-segment chine 2202 has a substantially planar shape (e.g., as defined by the outer mold line 2230). In some examples, the substantially planar shape of the second segment 2216 can be contoured to match a contour of the recess 2210 and/or a contour of a local area of the outer surface 2212 of the nacelle 2200.

The third segment 2218 of the multi-segment chine 2202 of FIGS. 22-25 includes an example leading edge 2232, an example trailing edge 2234 located opposite and/or rearward of the leading edge 2232 of the third segment 2218, and an outer mold line 2236 defined by the leading edge 2232 and the trailing edge 2234 of the third segment 2218. The leading edge 2232 of the third segment 2218 of the multi-segment chine 2202 has a curved shape that is complementary to a curved shape of the trailing edge 2228 of the second segment 2216 of the multi-segment chine 2202. The third segment 2218 of the multi-segment chine 2202 has a substantially planar shape (e.g., as defined by the outer mold line 2236). In some examples, the substantially planar shape of the third segment 2218 can be contoured to match a contour of the recess 2210 and/or a contour of a local area of the outer surface 2212 of the nacelle 2200.

The first configuration of the multi-segment chine 2202 shown in FIG. 22 corresponds to a deployed position of the first segment 2214, a deployed position of the second segment 2216, and a deployed position of the third segment 2218. The second configuration of the multi-segment chine 2202 shown in FIG. 23 corresponds to a stowed position of the first segment 2214, a deployed position of the second segment 2216, and a deployed position of the third segment 2218. The third configuration of the multi-segment chine 2202 shown in FIG. 24 corresponds to a stowed position of the first segment 2214, a stowed position of the second segment 2216, and a deployed position of the third segment 2218. The fourth configuration of the multi-segment chine 2202 shown in FIG. 25 corresponds to a stowed position of the first segment 2214, a stowed position of the second segment 2216, and a stowed position of the third segment 2218.

The first segment 2214 of the multi-segment chine 2202 of FIGS. 22-25 is rotatable about the axis of rotation 2208 between the deployed position of the first segment 2214 shown in FIG. 22 and the stowed position of the first segment 2214 shown in FIGS. 23-25. The outer mold line 2224 of the first segment 2214 extends along the outer surface 2212 of the nacelle 2200 when the first segment 2214 is positioned in its stowed position. As shown in FIGS. 23-25, the outer mold line 2224 of the first segment 2214 is received in the recess 2210 of the nacelle 2200 when the first segment 2214 is positioned in its stowed position. The outer mold line 2224 of the first segment 2214 extends outwardly (e.g., radially outwardly) from the outer surface 2212 of the nacelle 2200 when the first segment 2214 is positioned in its deployed position.

The second segment 2216 of the multi-segment chine 2202 of FIGS. 22-25 is rotatable about the axis of rotation 2208 between the deployed position of the second segment 2216 shown in FIGS. 22 and 23 and the stowed position of the second segment 2216 shown in FIGS. 24 and 25. The outer mold line 2230 of the second segment 2216 extends along the outer surface 2212 of the nacelle 2200 when the second segment 2216 is positioned in its stowed position. As shown in FIGS. 24 and 25, the outer mold line 2230 of the second segment 2216 is received in the recess 2210 of the nacelle 2200 when the second segment 2216 is positioned in its stowed position. The outer mold line 2230 of the second segment 2216 extends outwardly (e.g., radially outwardly) from the outer surface 2212 of the nacelle 2200 when the second segment 2216 is positioned in its deployed position.

The third segment 2218 of the multi-segment chine 2202 of FIGS. 22-25 is rotatable about the axis of rotation 2208 between the deployed position of the third segment 2218 shown in FIGS. 22-24 and the stowed position of the third segment 2218 shown in FIG. 25. The outer mold line 2236 of the third segment 2218 extends along the outer surface 2212 of the nacelle 2200 when the third segment 2218 is positioned in its stowed position. As shown in FIG. 25, the outer mold line 2236 of the third segment 2218 is received in the recess 2210 of the nacelle 2200 when the third segment 2218 is positioned in its stowed position. The outer mold line 2236 of the third segment 2218 extends outwardly (e.g., radially outwardly) from the outer surface 2212 of the nacelle 2200 when the third segment 2218 is positioned in its deployed position.

When the multi-segment chine 2202 of FIGS. 22-25 is positioned in the first configuration shown in FIG. 22, the first segment 2214, the second segment 2216, and the third segment 2218 of the multi-segment chine 2202 are positioned in their respective deployed positions and are substantially coplanar with one another. When the multi-segment chine 2202 of FIGS. 22-25 is positioned in the second configuration shown in FIG. 23, the first segment 2214 of the multi-segment chine 2202 is positioned in its stowed position, the second segment 2216 and the third segment 2218 of the multi-segment chine 2202 are positioned in their respective deployed positions, and the second segment 2216 and the third segment 2218 of the multi-segment chine 2202 are substantially coplanar with one another, but not with the first segment 2214 of the multi-segment chine 2202. When the multi-segment chine 2202 of FIGS. 22-25 is positioned in the third configuration shown in FIG. 24, the first segment 2214 and the second segment 2216 of the multi-segment chine 2202 are positioned in their respective stowed positions, the third segment 2218 of the multi-segment chine 2202 is positioned in its deployed position, and the first segment 2214 and the second segment 2216 of the multi-segment chine 2202 are substantially coplanar with one another, but not with the third segment 2218 of the multi-segment chine 2202. When the multi-segment chine 2202 of FIGS. 22-25 is positioned in the fourth configuration shown in FIG. 25, the first segment 2214, the second segment 2216, and the third segment 2218 of the multi-segment chine 2202 are positioned in their respective stowed positions and are substantially coplanar with one another.

In the illustrated example of FIGS. 22-25, the first segment 2214, the second segment 2216 and/or the third segment 2218 of the multi-segment chine 2202 can be rotated in a controlled manner to any number of intermediate positions between the respective deployed positions and the respective stowed positions described above. The controlled rotation(s) of the first segment 2214, the second segment 2216 and/or the third segment 2218 of the multi-segment chine 2202 occur(s) via one or more actuation mechanism(s) and one or more controller(s) of a control system (e.g., the actuation mechanism 3404 and the controller 3406 of the control system 3400 of FIG. 34), as further described below.

The multi-segment chine 2202 of FIGS. 22-25 is configured (e.g., located on and/or oriented relative to the nacelle 2200 of FIGS. 22-25) to generate a vortex in response to an airflow presented at the multi-segment chine 2202. In some examples, the vortex generated by the multi-segment chine 2202 favorably affects a boundary layer located on an upper surface of an aircraft wing to which the nacelle 2200 of FIGS. 22-25 is coupled. Thus, the multi-segment chine 2202 provides a positive aerodynamic impact in response to an airflow presented at the multi-segment chine 2202. The vortex generated by the multi-segment chine 2202 of FIGS. 22-25 changes (e.g., changes its position and/or its strength) as the first segment 2214, the second segment 2216 and/or the third segment 2218 of the multi-segment chine 2202 are respectively moved (e.g., rotated about the axis of rotation 2208) between the first configuration shown in FIG. 22, the second configuration shown in FIG. 23, the third configuration shown in FIG. 24, and the fourth configuration shown in FIG. 25.

For example, when the first segment 2214, the second segment 2216, and the third segment 2218 of the multi-segment chine 2202 are positioned in the first configuration shown in FIG. 22, the multi-segment chine 2202 is configured to generate a first vortex. When the first segment 2214, the second segment 2216, and the third segment 2218 of the multi-segment chine 2202 are positioned in the second configuration shown in FIG. 23, the multi-segment chine 2202 is configured to generate a second vortex that differs from the first vortex. When the first segment 2214, the second segment 2216, and the third segment 2218 of the multi-segment chine 2202 are positioned in the third configuration shown in FIG. 24, the multi-segment chine 2202 is configured to generate a third vortex that differs from the first vortex and also differs from the second vortex. When the first segment 2214, the second segment 2216, and the third segment 2218 of the multi-segment chine 2202 are positioned in the fourth configuration shown in FIG. 24, the multi-segment chine 2202 does not generate a vortex. In some examples, the first vortex has a first associated vortex position, the second vortex has a second associated vortex position that differs from the first associated vortex position, and the third vortex has a third associated vortex position that differs from each of the first and second associated vortex positions. In some examples, the first vortex has a first associated vortex strength, the second vortex has a second associated vortex strength that differs from the first associated vortex strength, and the third vortex has a third associated vortex strength that differs from each of the first and second associated vortex strengths.

Figure 26:
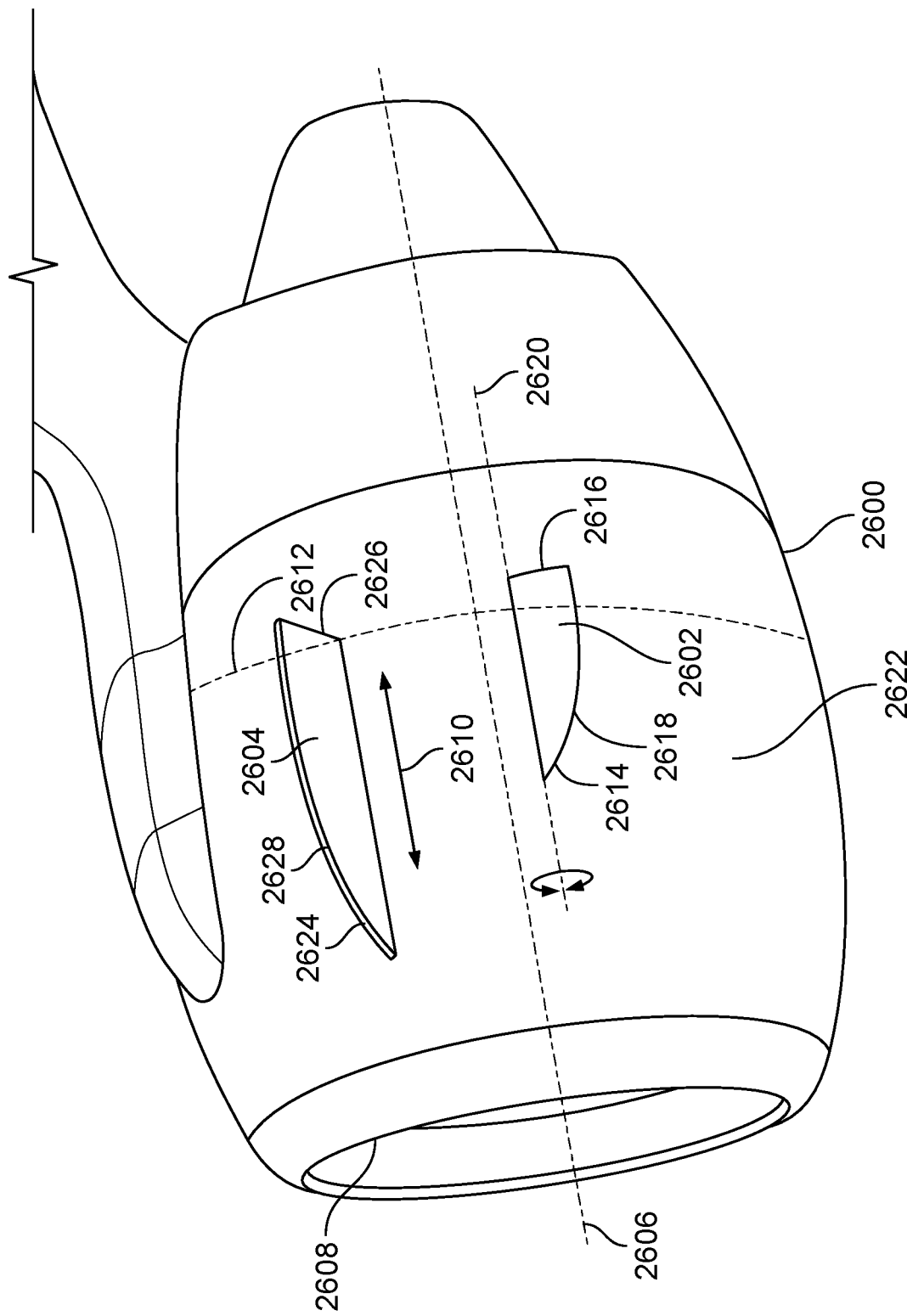
FIG. 26 is a perspective view of an example nacelle having example chines positioned in a first example configuration.
Figure 27:
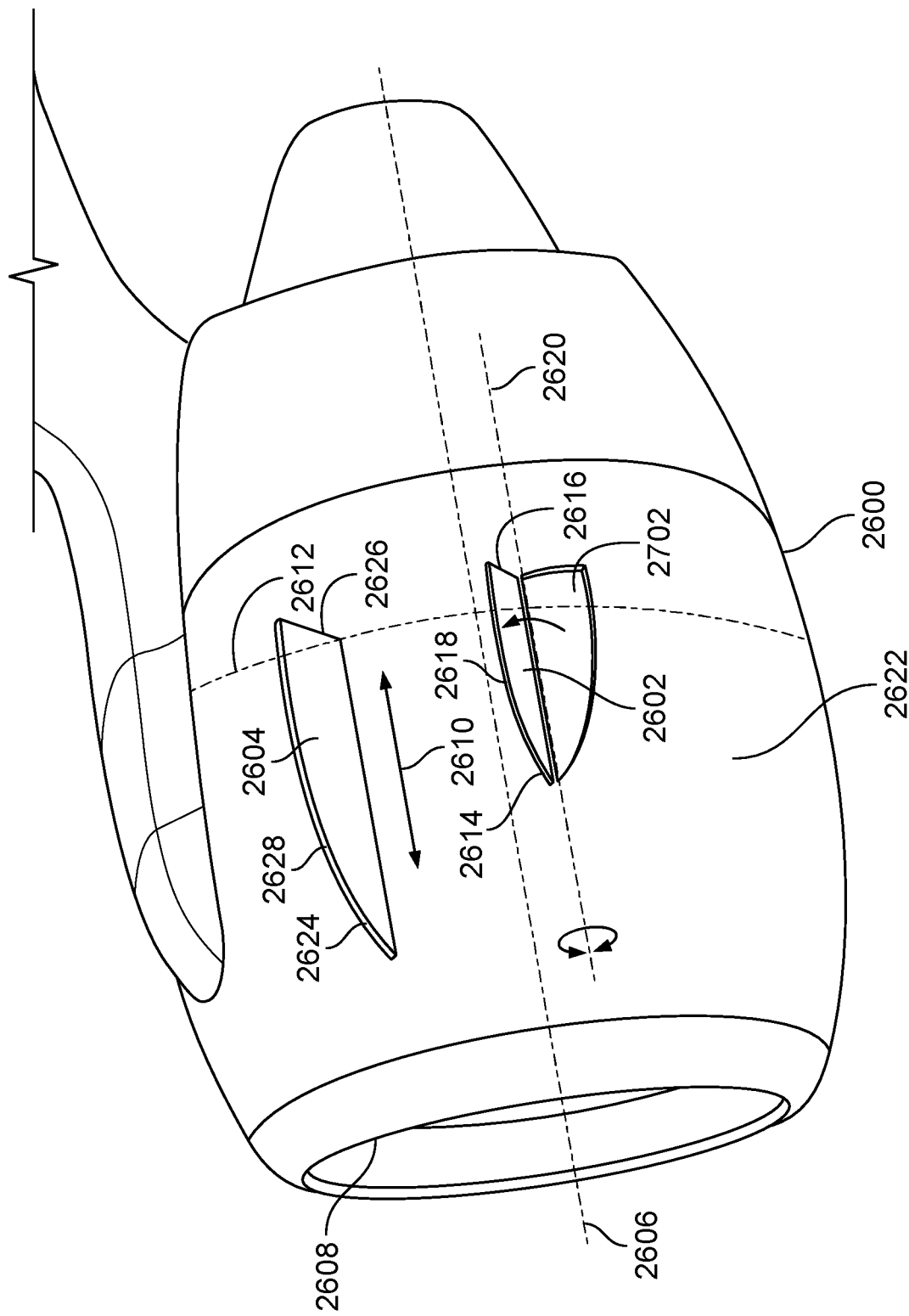
FIG. 27 is a perspective view of the nacelle of FIG. 26 having the chines of FIG. 26 positioned in a second example configuration.

FIG. 26 is a perspective view of an example nacelle 2600 having example chines (e.g., a first example chine 2602 and a second example chine 2604) positioned in a first example configuration. FIG. 27 is a perspective view of the nacelle 2600 of FIG. 26 having the chines of FIG. 26 positioned in a second example configuration. The nacelle 2600 of FIGS. 26 and 27 can be coupled to a wing of an aircraft (e.g., the first wing 104 of the aircraft 100 of FIGS. 1-3). The first chine 2602 of the nacelle 2600 of FIGS. 26 and 27 can be controlled and/or adjusted by a control system of an aircraft (e.g., the control system 3400 of FIG. 34 described below, which may be implemented in the aircraft 100 of FIGS. 1-3).

The nacelle 2600 of FIGS. 26 and 27 includes an example central axis 2606 and an example leading edge 2608. The first chine 2602 and/or the second chine 2604 of FIGS. 26 and 27 is/are oriented along an example fore-aft direction 2610 relative to the nacelle 2600. In the illustrated example of FIGS. 26 and 27, the fore-aft direction 2610 is defined by an outer mold line of the first chine 2602 and/or an outer mold line of the second chine 2604, as further described below. In some examples, the fore-aft direction 2610 is substantially parallel to the central axis 2606 of the nacelle 2600, with the central axis 2606 of the nacelle 2600 being defined by a rotational axis of an engine housed by the nacelle 2600. In other examples, the fore-aft direction 2610 can additionally or alternatively be substantially parallel to a longitudinal axis of a fuselage of an aircraft (e.g., the longitudinal axis 116 of the fuselage 102 of the aircraft 100 of FIGS. 1-3) that includes the nacelle 2600. In still other examples, the orientation of the fore-aft direction 2610 can exceed the above-described substantially parallel relationship(s) relative to the central axis 2606 of the nacelle 2600 and/or the longitudinal axis of the fuselage of the aircraft. The nacelle 2600 of FIGS. 26 and 27 further includes an example outer circumference 2612.

The first chine 2602 (e.g., a spoiler chine) of FIGS. 26 and 27 includes an example leading edge 2614, an example trailing edge 2616 located opposite and/or rearward of the leading edge 2614 of the first chine 2602, and an outer mold line 2618 defined by the leading edge 2614 and the trailing edge 2616 of the first chine 2602. The first chine 2602 of FIGS. 26 and 27 has a substantially planar shape (e.g., as defined by the outer mold line 2618) that extends and/or is oriented along the fore-aft direction 2610. In some examples, the substantially planar shape of the first chine 2602 can be contoured to match a contour of the recess 2702 and/or a contour of a local area of the outer surface 2622 of the nacelle 2600.

The first chine 2602 of FIGS. 26 and 27 is rotatably coupled to the nacelle 2600 at a first location about the outer circumference 2612 of the nacelle 2600, and is rotatable relative to the nacelle 2600 about an example axis of rotation 2620. In the illustrated example of FIGS. 26 and 27, the axis of rotation 2620 of the first chine 2602 is substantially parallel to the fore-aft direction 2610. In other examples, the axis of rotation 2620 can additionally or alternatively be substantially parallel to the central axis 2606 of the nacelle 2600. In still other examples, the orientation of the axis of rotation 2620 of the first chine 2602 can exceed the above-described substantially parallel relationship relative to the central axis 2606 of the nacelle 2600. The nacelle 2600 of FIGS. 26 and 27 further includes an example recess 2702 formed in and/or extending into an example outer surface 2622 of the nacelle 2600. The recess 2702 is sized, shaped and/or configured to receive the first chine 2602 of FIGS. 26 and 27, as further described below.

The second chine 2604 (e.g., a fixed chine) of FIGS. 26 and 27 includes an example leading edge 2624, an example trailing edge 2626 located opposite and/or rearward of the leading edge 2624 of the second chine 2604, and an outer mold line 2628 defined by the leading edge 2624 and the trailing edge 2626 of the second chine 2604. The second chine 2604 of FIGS. 26 and 27 has a substantially planar shape (e.g., as defined by the outer mold line 2628) that extends and/or is oriented along the fore-aft direction 2610. The second chine 2604 of FIGS. 26 and 27 is fixedly coupled to the nacelle 2600 at a second location about the outer circumference 2612 of the nacelle 2600 that is circumferentially offset from the first location about the outer circumference 2612 of the nacelle 2600 at which the first chine 2602 is coupled to the nacelle 2600.

In the illustrated example of FIGS. 26 and 27, the first location at which the first chine 2602 is coupled to the nacelle 2600 is below the second position at which the second chine 2604 is coupled to the nacelle 2600. In other examples, the first location at which the first chine 2602 is coupled to the nacelle 2600 can alternatively be above the second position at which the second chine 2604 is coupled to the nacelle 2600. As shown in FIGS. 26 and 27, the leading edge 2614 of the first chine 2602 is spaced from the leading edge 2608 of the nacelle 2600 by a first distance, and the leading edge 2624 of the second chine 2604 is spaced from the leading edge 2608 of the nacelle 2600 by a second distance less than the first distance. In other examples, the leading edge 2624 of the second chine 2604 can alternatively be spaced from the leading edge 2608 of the nacelle 2600 by a second distance that is greater than a first distance by which the leading edge 2614 of the first chine 2602 is spaced from the leading edge 2608 of the nacelle 2600. In the illustrated example of FIGS. 26 and 27, the first chine 2602 and the second chine 2604 are respectively coupled to the nacelle 2600 at locations that are inboard relative to the central axis 2606 of the nacelle 2600. In other examples, the first chine 2602 and the second chine 2604 can alternatively be respectively coupled to the nacelle 2600 at locations that are outboard relative to the central axis 2606 of the nacelle 2600.

The first configuration of the chines shown in FIG. 26 corresponds to a stowed position of the first chine 2602 and a deployed position of the second chine 2604. The second configuration of the chines shown in FIG. 27 corresponds to a deployed position of the first chine 2602 and a deployed position of the second chine 2604. The first chine 2602 of FIGS. 26 and 27 is rotatable about the axis of rotation 2620 between the stowed position of the first chine 2602 shown in FIG. 26 and the deployed position of the first chine 2602 shown in FIG. 27. The outer mold line 2618 of the first chine 2602 extends along the outer surface 2622 of the nacelle 2600 when the first chine 2602 is positioned in its stowed position. As shown in FIG. 26, the outer mold line 2618 of the first chine 2602 is received in the recess 2702 of the nacelle 2600 when the first chine 2602 is positioned in its stowed position. The outer mold line 2618 of the first chine 2602 extends outwardly (e.g., radially outwardly) from the outer surface 2622 of the nacelle 2600 when the first chine 2602 is positioned in its deployed position.

In the illustrated example of FIGS. 26 and 27, the first chine 2602 can be moved (e.g., rotated about the axis of rotation 2620) in a controlled manner to any number of intermediate positions between the first position (e.g., the stowed position) shown in FIG. 26 and the second position (e.g., the deployed position) shown in FIG. 27. The controlled movement (e.g., rotation) of the first chine 2602 occurs via an actuation mechanism and a controller of a control system (e.g., the actuation mechanism 3404 and the controller 3406 of the control system 3400 of FIG. 34), as further described below.

The second chine 2604 of FIGS. 26 and 27 is configured (e.g., located on and/or oriented relative to the nacelle 2600 of FIGS. 26 and 27) to generate a vortex in response to an airflow presented at the second chine 2604. In some examples, the vortex generated by the second chine 2604 favorably affects a boundary layer located on an upper surface of an aircraft wing to which the nacelle 2600 of FIGS. 26 and 27 is coupled. Thus, the second chine 2604 provides a positive aerodynamic impact in response to an airflow presented at the second chine 2604. A vortex (e.g., a combined set of vortices) generated by the first chine 2602 and the second chine 2604 of FIGS. 26 and 27 changes (e.g., changes its position and/or its strength) as the first chine 2602 of FIGS. 26 and 27 is moved (e.g., rotated about the axis of rotation 2620) between the first position (e.g., the stowed position) shown in FIG. 26 and the second position (e.g., the deployed position) shown in FIG. 27.

For example, when the first chine 2602 and the second chine 2604 are positioned in the first configuration shown in FIG. 26, the second chine 2604 generates a vortex, but the first chine 2602 does not generate a vortex. The first chine 2602 and the second chine 2604 accordingly produce a first vortex (e.g., a first combined set of vortices that includes the vortex generated by the second chine 2604, with no vortex being generated by the first chine 2602). When the first chine 2602 and the second chine 2604 are positioned in the second configuration shown in FIG. 27, the first chine 2602 generates a vortex that interacts (e.g., combines) with the vortex generated by the second chine 2604 to produce a second vortex (e.g., a second combined set of vortices that includes the vortex generated by the second chine 2604, as well as the vortex generated by the first chine 2602) that differs from the first vortex. In some examples, positioning the first chine 2602 in the deployed position shown in FIG. 27 causes the first chine 2602 to produce a vortex that reduces, limits and/or spoils the vortex generated by the second chine 2604, or that combines with the vortex generated by the second chine 2604 to alter the effect it has on the wing aerodynamics.

Figure 28:
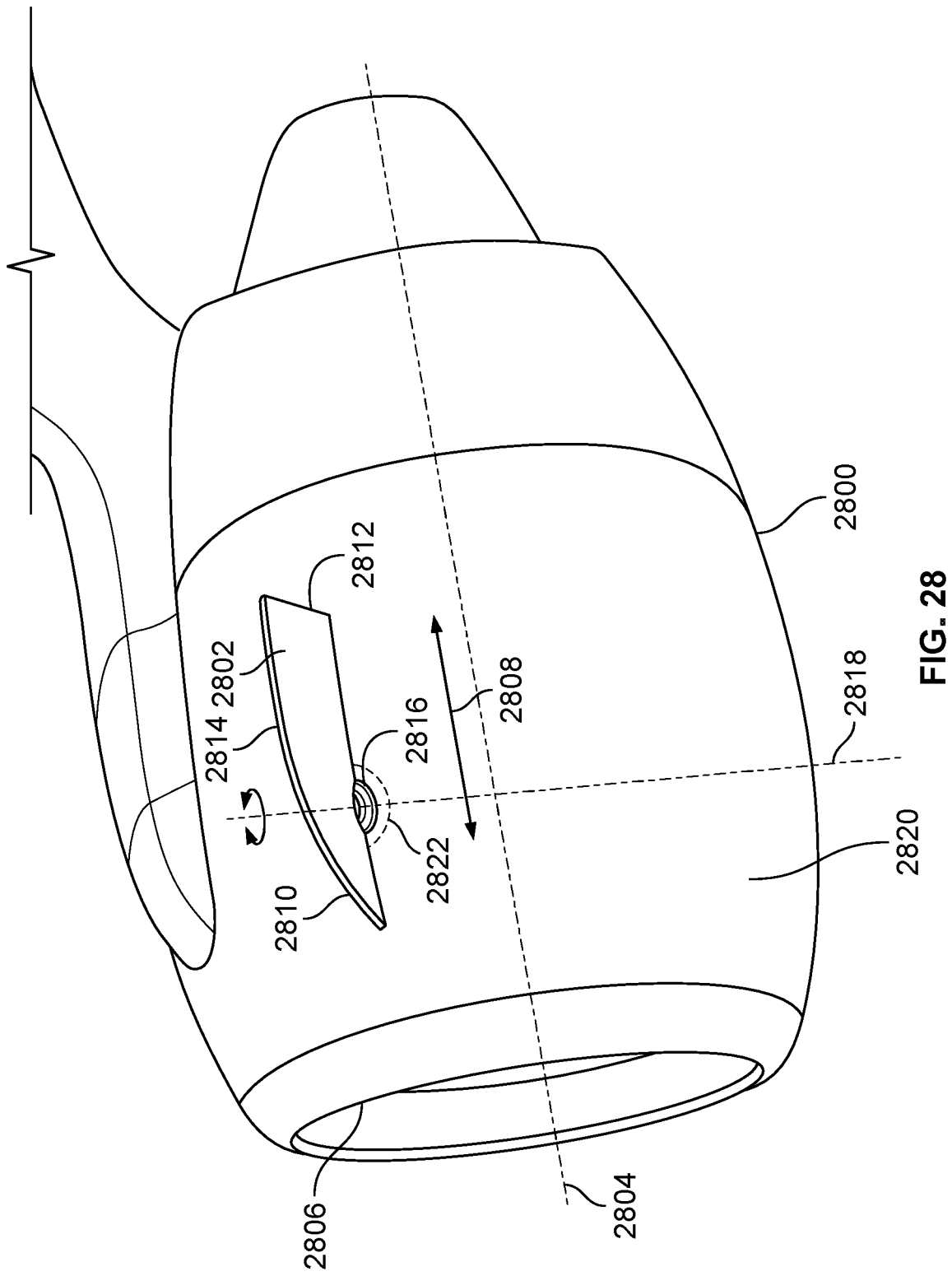
FIG. 28 is a perspective view of an example nacelle having an example chine positioned in a first example position.
Figure 29:
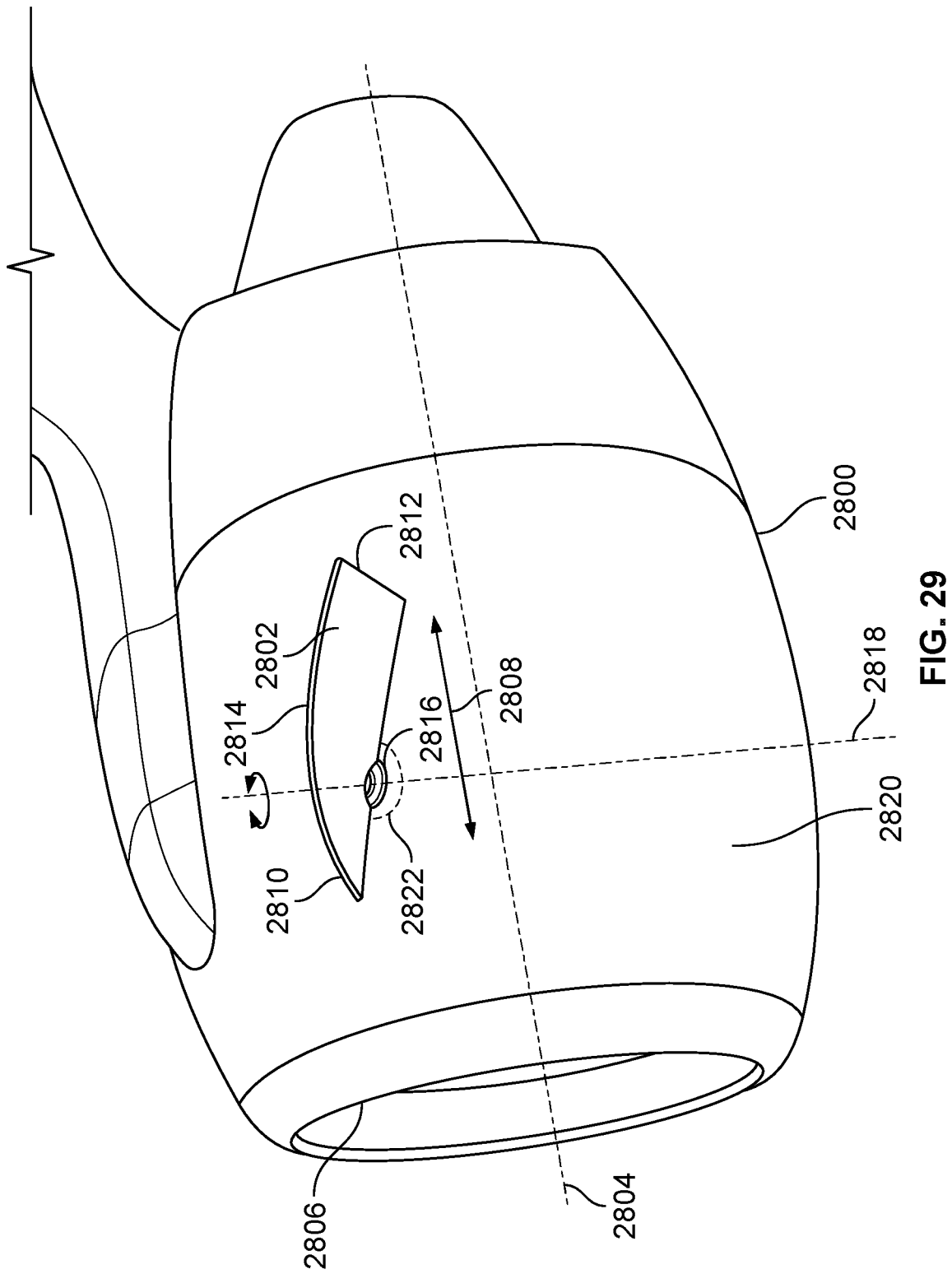
FIG. 29 is a perspective view of the nacelle of FIG. 28 having the chine of FIG. 28 rotated to a second example position.
Figure 30:
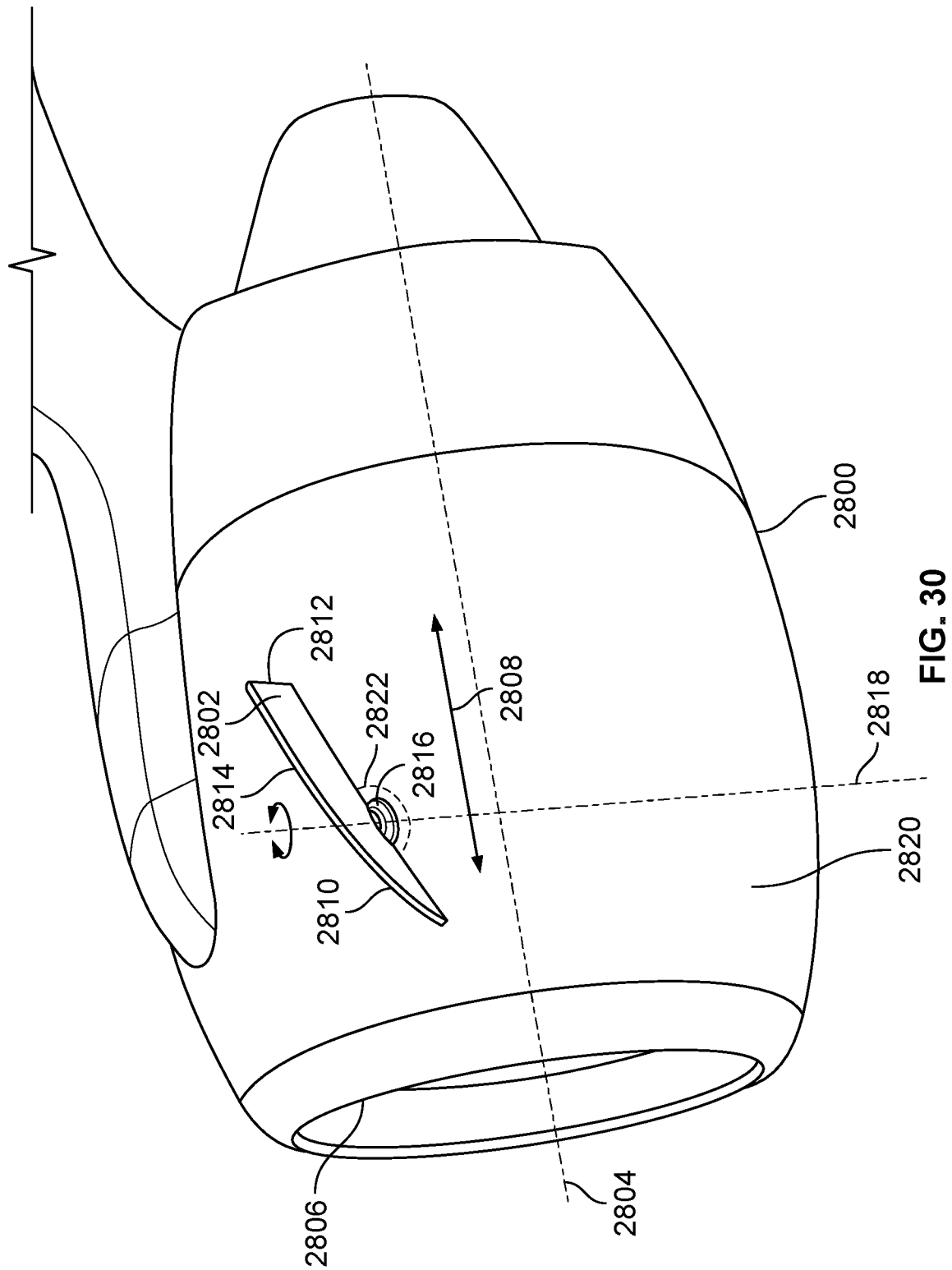
FIG. 30 is a perspective view of the nacelle of FIGS. 28 and 29 having the chine of FIGS. 28 and 29 rotated to a third example position.

FIG. 28 is a perspective view of an example nacelle 2800 having an example chine 2802 positioned in a first example position. FIG. 29 is a perspective view of the nacelle 2800 of FIG. 28 having the chine 2802 of FIG. 28 rotated to a second example position. FIG. 30 is a perspective view of the nacelle 2800 of FIGS. 28 and 29 having the chine 2802 of FIGS. 28 and 29 rotated to a third example position. The nacelle 2800 of FIGS. 28-30 can be coupled to a wing of an aircraft (e.g., the first wing 104 of the aircraft 100 of FIGS. 1-3). The chine 2802 of the nacelle 2800 of FIGS. 28-30 can be controlled and/or adjusted by a control system of an aircraft (e.g., the control system 3400 of FIG. 34 described below, which may be implemented in the aircraft 100 of FIGS. 1-3).

The nacelle 2800 of FIGS. 28-30 includes an example central axis 2804 and an example leading edge 2806. The central axis 2804 of the nacelle 2800 approximately defines an example fore-aft direction 2808 of the nacelle 2800. In some examples, the fore-aft direction 2808 of the nacelle 2800 is substantially parallel to the central axis 2804 of the nacelle 2800, with the central axis 2804 of the nacelle 2800 being defined by a rotational axis of an engine housed by the nacelle 2800. In other examples, the fore-aft direction 2808 of the nacelle 2800 can additionally or alternatively be substantially parallel to a longitudinal axis of a fuselage of an aircraft (e.g., the longitudinal axis 116 of the fuselage 102 of the aircraft 100 of FIGS. 1-3) that includes the nacelle 2800. In still other examples, the orientation of the fore-aft direction 2808 of nacelle 2800 can exceed the above-described substantially parallel relationship(s) relative to the central axis 2804 of the nacelle 2800 and/or the longitudinal axis of the fuselage of the aircraft.

The chine 2802 of FIGS. 28-30 includes an example leading edge 2810, an example trailing edge 2812 located opposite and/or rearward of the leading edge 2810 of the chine 2802, and an example outer mold line 2814 defined by the leading edge 2810 and the trailing edge 2812 of the chine 2802. The chine 2802 of FIGS. 28-30 has a substantially planar shape (e.g., as defined by the outer mold line 2814). In the illustrated example of FIGS. 28-30, the outer mold line 2814 of the chine 2802 extends outwardly (e.g., radially outwardly) from an example outer surface 2820 of the nacelle 2800. The chine 2802 of FIGS. 28-30 is rotatably coupled to the nacelle 2800 via an example shaft 2816. The shaft 2816 of FIGS. 28-30 defines an example axis of rotation 2818. In the illustrated example of FIGS. 28-30, the axis of rotation 2818 is substantially perpendicular to an example local area 2822 of the outer surface 2820 of the nacelle 2800. The chine 2802 of FIGS. 28-30 is movable and/or adjustable relative to the nacelle 2800 of FIGS. 28-30. More specifically, the chine 2802 of FIGS. 28-30 is rotatable relative to the nacelle 2800 of FIGS. 28-30 about the axis of rotation 2818. In the illustrated example of FIGS. 28-30, the chine 2802 is coupled to the nacelle 2800 (e.g., via the shaft 2816) at a location that is inboard relative to the central axis 2804 of the nacelle 2800. In other examples, the chine 2802 can alternatively be coupled to the nacelle 2800 at a location that is outboard relative to the central axis 2804 of the nacelle 2800.

In the illustrated example of FIGS. 28-30, the chine 2802 is movable (e.g., rotatable about the axis of rotation 2818) to a first position (e.g., a neutral position) shown in FIG. 28 in which the chine 2802 is oriented along the fore-aft direction 2808 of the nacelle 2800. The chine 2802 is movable (e.g., rotatable about the axis of rotation 2818) from the first position shown in FIG. 28 to either of a second position (e.g., an upward-pitched position) shown in FIG. 29 in which the leading edge 2810 of the chine 2802 is oriented at an upward angle relative to the position of the leading edge 2810 of the chine 2802 in the neutral position shown in FIG. 28, or a third position (e.g., a downward-pitched position) shown in FIG. 30 in which the leading edge 2810 of the chine 2802 is oriented at a downward angle relative to the position of the leading edge 2810 of the chine 2802 in the neutral position shown in FIG. 28.

The chine 2802 of FIGS. 28-30 can be moved (e.g., rotated about the axis of rotation 2818) in a controlled manner to any number of intermediate positions between the second position shown in FIG. 29 and the third position shown in FIG. 30, including to the neutral position shown in FIG. 28. The controlled movement (e.g., rotation) of the chine 2802 occurs via an actuation mechanism and a controller of a control system (e.g., the actuation mechanism 3404 and the controller 3406 of the control system 3400 of FIG. 34), as further described below.

The chine 2802 of FIGS. 28-30 is configured (e.g., located on and/or oriented relative to the nacelle 2800 of FIGS. 28-30) to generate a vortex in response to an airflow presented at the chine 2802. In some examples, the vortex generated by the chine 2802 favorably affects a boundary layer located on an upper surface of an aircraft wing to which the nacelle 2800 of FIGS. 28-30 is coupled. Thus, the chine 2802 provides a positive aerodynamic impact in response to an airflow presented at the chine 2802. The vortex generated by the chine 2802 of FIGS. 28-30 changes (e.g., changes its position and/or its strength) as the chine 2802 is moved (e.g., rotated about the axis of rotation 2818) between the first position (e.g., a neutral position) shown in FIG. 28, the second position (e.g., an upward-pitched position) shown in FIG. 29, and the third position (e.g., a downward-pitched position) shown in FIG. 30.

For example, when the chine 2802 is positioned in the first position shown in FIG. 28, the chine 2802 is configured to generate a first vortex. When the chine 2802 is positioned in the second position shown in FIG. 29, the chine 2802 is configured to generate a second vortex that differs from the first vortex. When the chine 2802 is positioned in the third position shown in FIG. 30, the chine 2802 is configured to generate a third vortex that differs from the first vortex and also differs from the second vortex. In some examples, the first vortex has a first associated vortex position, the second vortex has a second associated vortex position that differs from the first associated vortex position, and the third vortex has a third associated vortex position that differs from the first associated vortex position and also differs from the second associated vortex position. In some examples, the first vortex has a first associated vortex strength, the second vortex has a second associated vortex strength that differs from the first associated vortex strength, and the third vortex has a third associated vortex strength that differs from the first associated vortex strength and also differs from the second associated vortex strength.

Figure 31:
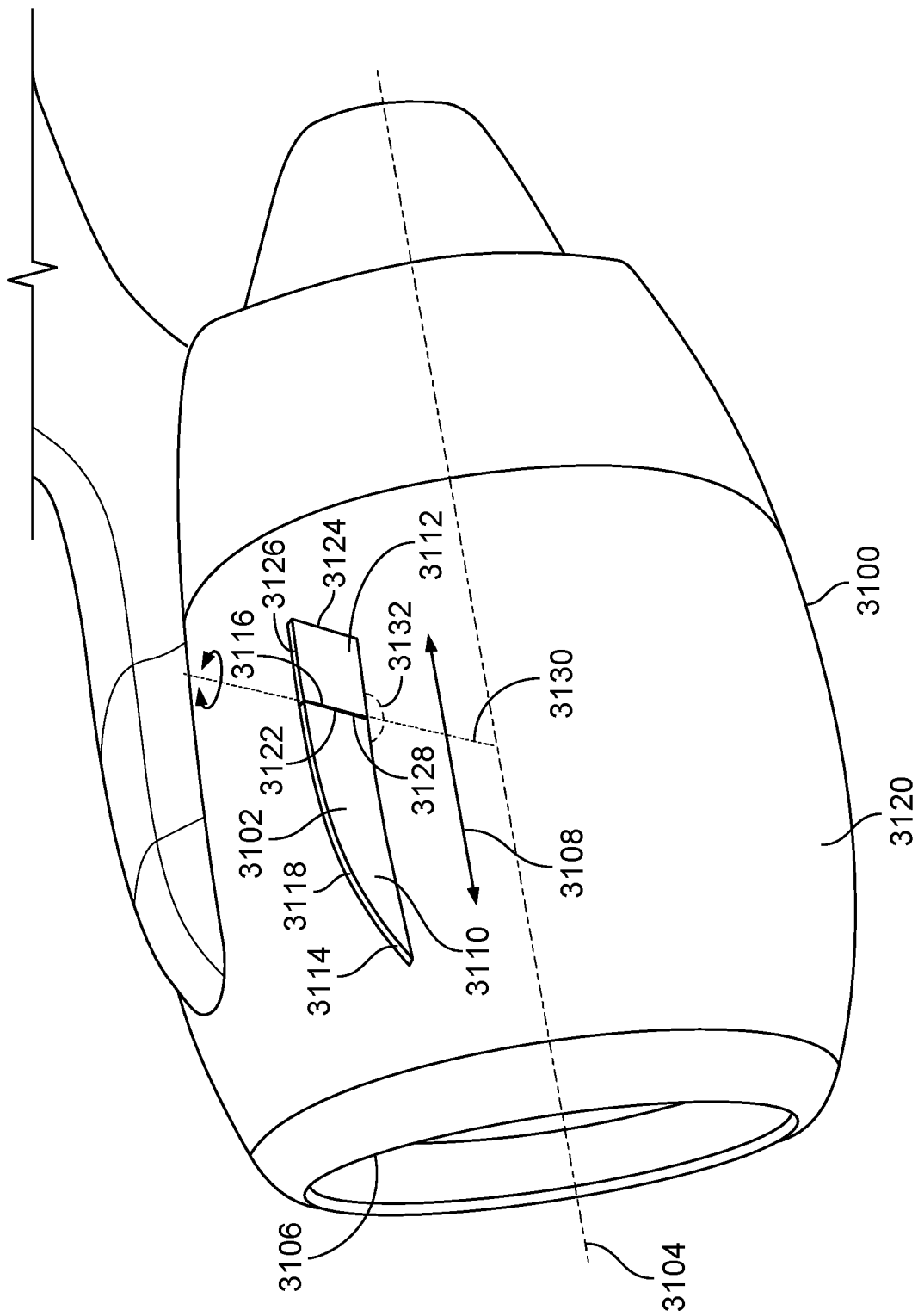
FIG. 31 is a perspective view of an example nacelle having an example multi-segment chine positioned in a first example configuration.
Figure 32:
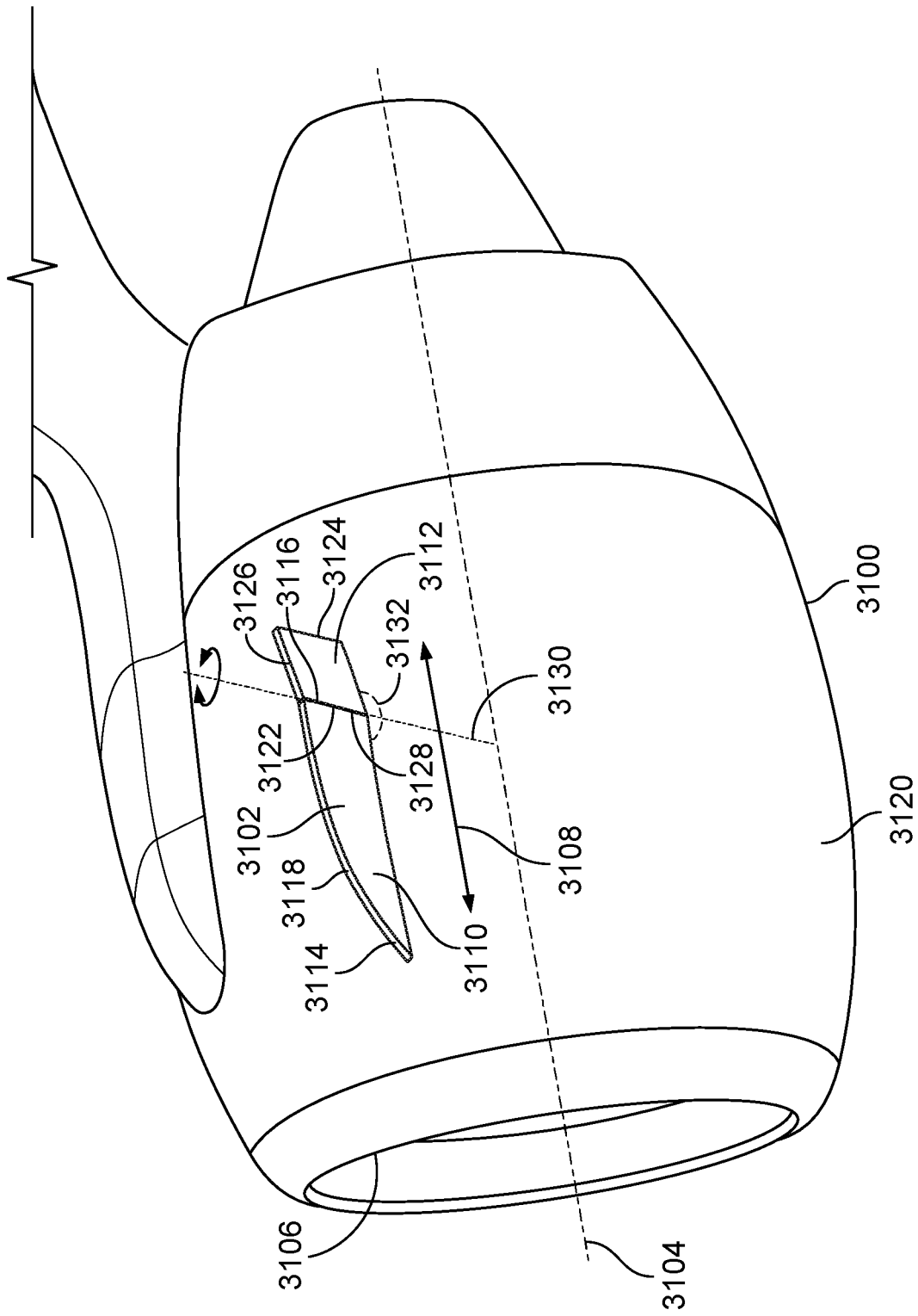
FIG. 32 is a perspective view of the nacelle of FIG. 31 having the multi-segment chine of FIG. 31 positioned in a second example configuration.
Figure 33:
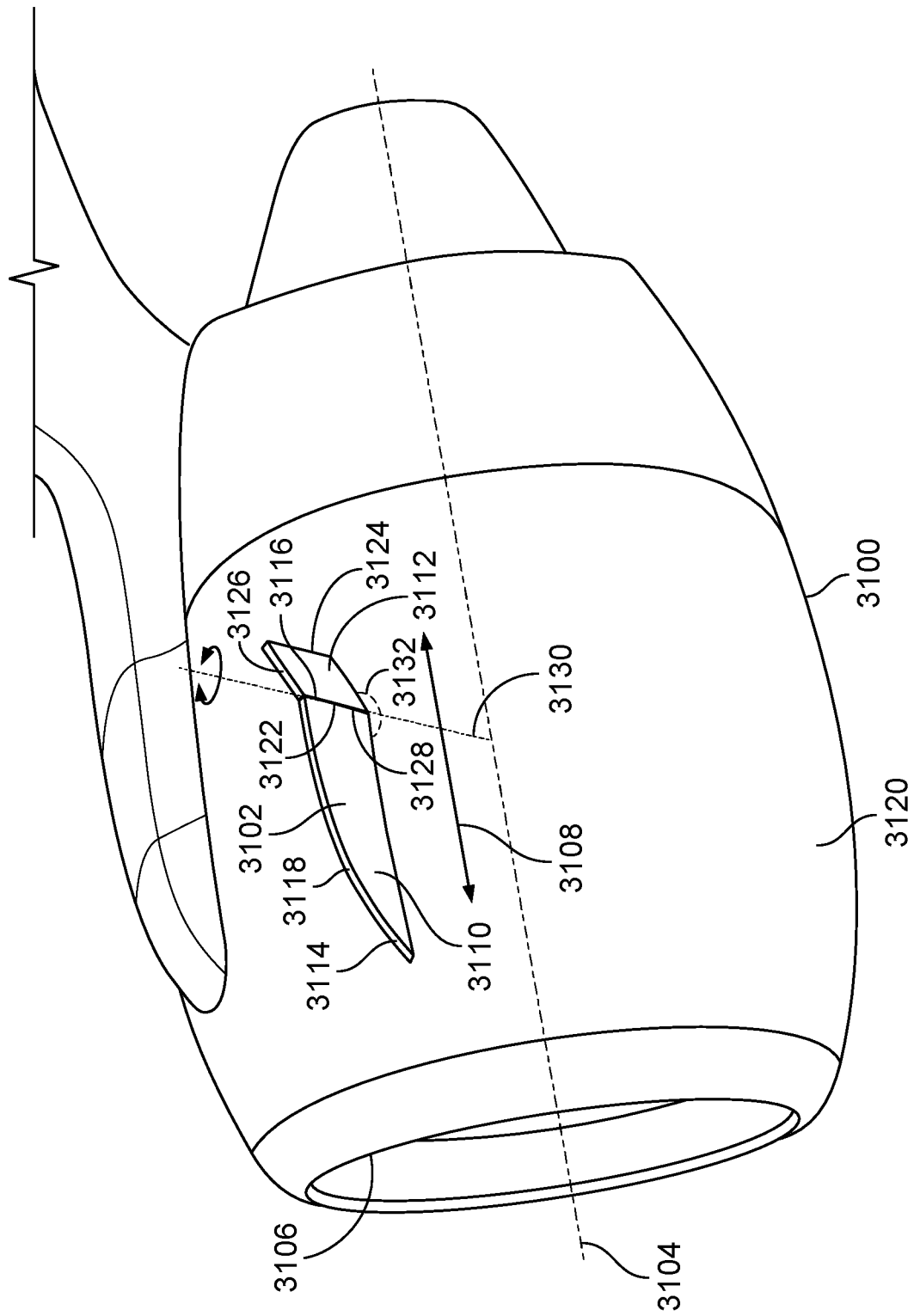
FIG. 33 is a perspective view of the nacelle of FIGS. 31 and 32 having the multi-segment chine of FIGS. 31 and 32 positioned in a third example configuration.

FIG. 31 is a perspective view of an example nacelle 3100 having an example multi-segment chine 3102 positioned in a first example configuration. FIG. 32 is a perspective view of the nacelle 3100 of FIG. 31 having the multi-segment chine 3102 of FIG. 31 positioned in a second example configuration. FIG. 33 is a perspective view of the nacelle 3100 of FIGS. 31 and 32 having the multi-segment chine 3102 of FIGS. 31 and 32 positioned in a third example configuration. The nacelle 3100 of FIGS. 31-33 can be coupled to a wing of an aircraft (e.g., the first wing 104 of the aircraft 100 of FIGS. 1-3). The multi-segment chine 3102 of the nacelle 3100 of FIGS. 31-33 can be controlled and/or adjusted by a control system of an aircraft (e.g., the control system 3400 of FIG. 34 described below, which may be implemented in the aircraft 100 of FIGS. 1-3).

The nacelle 3100 of FIGS. 31-33 includes an example central axis 3104 and an example leading edge 3106. The central axis 3104 of the nacelle 3100 approximately defines an example fore-aft direction 3108 of the nacelle 3100. In some examples, the fore-aft direction 3108 of the nacelle 3100 is substantially parallel to the central axis 3104 of the nacelle 3100, with the central axis 3104 of the nacelle 3100 being defined by a rotational axis of an engine housed by the nacelle 3100. In other examples, the fore-aft direction 3108 of the nacelle 3100 can additionally or alternatively be substantially parallel to a longitudinal axis of a fuselage of an aircraft (e.g., the longitudinal axis 116 of the fuselage 102 of the aircraft 100 of FIGS. 1-3) that includes the nacelle 3100. In still other examples, the orientation of the fore-aft direction 3108 of nacelle 3100 can exceed the above-described substantially parallel relationship(s) relative to the central axis 3104 of the nacelle 3100 and/or the longitudinal axis of the fuselage of the aircraft.

The multi-segment chine 3102 of FIGS. 31-33 includes an example first segment 3110 (e.g., a leading segment) and an example second segment 3112 (e.g., a trailing segment). The first segment 3110 of the multi-segment chine 3102 of FIGS. 31-33 includes an example leading edge 3114, an example trailing edge 3116 located opposite and/or rearward of the leading edge 3114 of the first segment 3110 of the multi-segment chine 3102, and an example outer mold line 3118 defined by the leading edge 3114 and the trailing edge 3116 of the first segment 3110 of the multi-segment chine 3102. The first segment 3110 of the multi-segment chine 3102 of FIGS. 31-33 has a substantially planar shape (e.g., as defined by the outer mold line 3118). In the illustrated example of FIGS. 31-33, the outer mold line 3118 of the first segment 3110 of the multi-segment chine 3102 extends outwardly (e.g., radially outwardly) from an example outer surface 3120 of the nacelle 3100.

The first segment 3110 of the multi-segment chine 3102 is coupled (e.g., rigidly coupled) to the nacelle 3100. For example, the first segment 3110 of the multi-segment chine 3102 can be fixedly coupled to a static (e.g., non-movable) structure located on and/or within the nacelle 3100. In the illustrated example of FIGS. 31-33, the first segment 3110 of the multi-segment chine 3102 is oriented along (e.g., is substantially parallel to) the fore-aft direction 3108 of the nacelle 3100. In other examples, the orientation of the first segment 3110 of the multi-segment chine 3102 can exceed the above-described substantially parallel relationship relative to the fore-aft direction 3108 of the nacelle 3100. In the illustrated example of FIGS. 31-33, the first segment 3110 of the multi-segment chine 3102 is coupled to the nacelle 3100 at a location that is inboard relative to the central axis 3104 of the nacelle 3100. In other examples, the first segment 3110 of the multi-segment chine 3102 can alternatively be coupled to the nacelle 3100 at a location that is outboard relative to the central axis 3104 of the nacelle 3100.

The second segment 3112 of the multi-segment chine 3102 of FIGS. 31-33 includes an example leading edge 3122, an example trailing edge 3124 located opposite and/or rearward of the leading edge 3122 of the second segment 3112 of the multi-segment chine 3102, and an example outer mold line 3126 defined by the leading edge 3122 and the trailing edge 3124 of the second segment 3112 of the multi-segment chine 3102. The second segment 3112 of the multi-segment chine 3102 of FIGS. 31-33 has a substantially planar shape (e.g., as defined by the outer mold line 3126). In the illustrated example of FIGS. 31-33, the outer mold line 3126 of the second segment 3112 of the multi-segment chine 3102 extends outwardly (e.g., radially outwardly) from the outer surface 3120 of the nacelle 3100.

The second segment 3112 of the multi-segment chine 3102 of FIGS. 31-33 is rotatably coupled to the first segment 3110 of the multi-segment chine 3102, and/or to the nacelle 3100, via an example hinge 3128. In the illustrated example of FIGS. 31-33, the hinge 3128 defines an example axis of rotation 3130 located at the trailing edge 3116 of the first segment 3110 of the multi-segment chine 3102 and at the leading edge 3122 of the second segment 3112 of the multi-segment chine 3102. In the illustrated example of FIGS. 31-33, the axis of rotation 3130 is substantially perpendicular to an example local area 3132 of the outer surface 3120 of the nacelle 3100.

The second segment 3112 of the multi-segment chine 3102 of FIGS. 31-33 is movable and/or adjustable relative to the first segment 3110 of the multi-segment chine 3102 of FIGS. 31-33, and/or relative to the nacelle 3100 of FIGS. 31-33. More specifically, the second segment 3112 of the multi-segment chine 3102 of FIGS. 31-33 is rotatable relative to the first segment 3110 of the multi-segment chine 3102 of FIGS. 31-33, and/or relative to the nacelle 3100 of FIGS. 31-33, about the axis of rotation 3130. The second segment 3112 and/or the hinge 3128 of the multi-segment chine 3102 can be coupled (e.g., operatively coupled) to an actuation mechanism located within the nacelle 3100 to facilitate movement (e.g., rotation) of the second segment 3112 of the multi-segment chine 3102 relative to the first segment 3110 of the multi-segment chine 3102, and/or relative to the nacelle 3100.

In the illustrated example of FIGS. 31-33, the second segment 3112 of the multi-segment chine 3102 is movable (e.g., rotatable about the axis of rotation 3130) to a neutral position (e.g., as shown in FIG. 31) in which the second segment 3112 of the multi-segment chine 3102 is substantially coplanar with the first segment 3110 of the multi-segment chine 3102. The second segment 3112 of the multi-segment chine 3102 is movable (e.g., rotatable about the axis of rotation 3130) from the neutral position shown in FIG. 31 to a first pitched position (e.g., as shown in FIG. 32) and/or to a second pitched position (e.g., as shown in FIG. 33). When the second segment 3112 of the multi-segment chine 3102 is positioned in the first pitched position shown in FIG. 32, the second segment 3112 is positioned at a first angle relative to the first segment 3110 of the multi-segment chine 3102. When the second segment 3112 of the multi-segment chine 3102 is positioned in the second pitched position shown in FIG. 33, the second segment 3112 is positioned at a second angle relative to the first segment 3110 of the multi-segment chine 3102 that is greater than the first angle.

The second segment 3112 of the multi-segment chine 3102 of FIGS. 31-33 can be moved (e.g., rotated about the axis of rotation 3130) in a controlled manner to any number of intermediate positions between the neutral position shown in FIG. 31 and the second pitched position shown in FIG. 33, including to the first pitched position shown in FIG. 32. Furthermore, although FIGS. 32 and 33 illustrate the trailing edge 3124 of the second segment 3112 of the multi-segment chine 3102 being deflected in an upward direction, in other examples the trailing edge 3124 of the second segment 3112 of the multi-segment chine 3102 can additionally or alternatively be deflected in a downward direction opposite the upward direction. The controlled movement (e.g., rotation) of the second segment 3112 of the multi-segment chine 3102 occurs via an actuation mechanism and a controller of a control system (e.g., the actuation mechanism 3404 and the controller 3406 of the control system 3400 of FIG. 34), as further described below.

The multi-segment chine 3102 of FIGS. 31-33 is configured (e.g., located on and/or oriented relative to the nacelle 3100 of FIGS. 31-33) to generate a vortex in response to an airflow presented at the multi-segment chine 3102. In some examples, the vortex generated by the multi-segment chine 3102 favorably affects a boundary layer located on an upper surface of an aircraft wing to which the nacelle 3100 of FIGS. 31-33 is coupled. Thus, the multi-segment chine 3102 provides a positive aerodynamic impact in response to an airflow presented at the multi-segment chine 3102. The vortex generated by the multi-segment chine 3102 of FIGS. 31-33 changes (e.g., changes its position and/or its strength) as the second segment 3112 of the multi-segment chine 3102 is moved (e.g., rotated about the axis of rotation 3130) between the neutral position shown in FIG. 31, the first pitched position shown in FIG. 32, and the second pitched position shown in FIG. 32.

For example, when the second segment 3112 of the multi-segment chine 3102 is positioned in the neutral position shown in FIG. 31, the multi-segment chine 3102 is configured to generate a first vortex. When the second segment 3112 of the multi-segment chine 3102 is positioned in the first pitched position shown in FIG. 32, the multi-segment chine 3102 is configured to generate a second vortex that differs from the first vortex. When the second segment 3112 of the multi-segment chine 3102 is positioned in the second pitched position shown in FIG. 33, the multi-segment chine 3102 is configured to generate a third vortex that differs from the first vortex and also differs from the second vortex. In some examples, the first vortex has a first associated vortex position, the second vortex has a second associated vortex position that differs from the first associated vortex position, and the third vortex has a third associated vortex position that differs from the first associated vortex position and also differs from the second associated vortex position. In some examples, the first vortex has a first associated vortex strength, the second vortex has a second associated vortex strength that differs from the first associated vortex strength, and the third vortex has a third associated vortex strength that differs from the first associated vortex strength and also differs from the second associated vortex strength.

Figure 34:
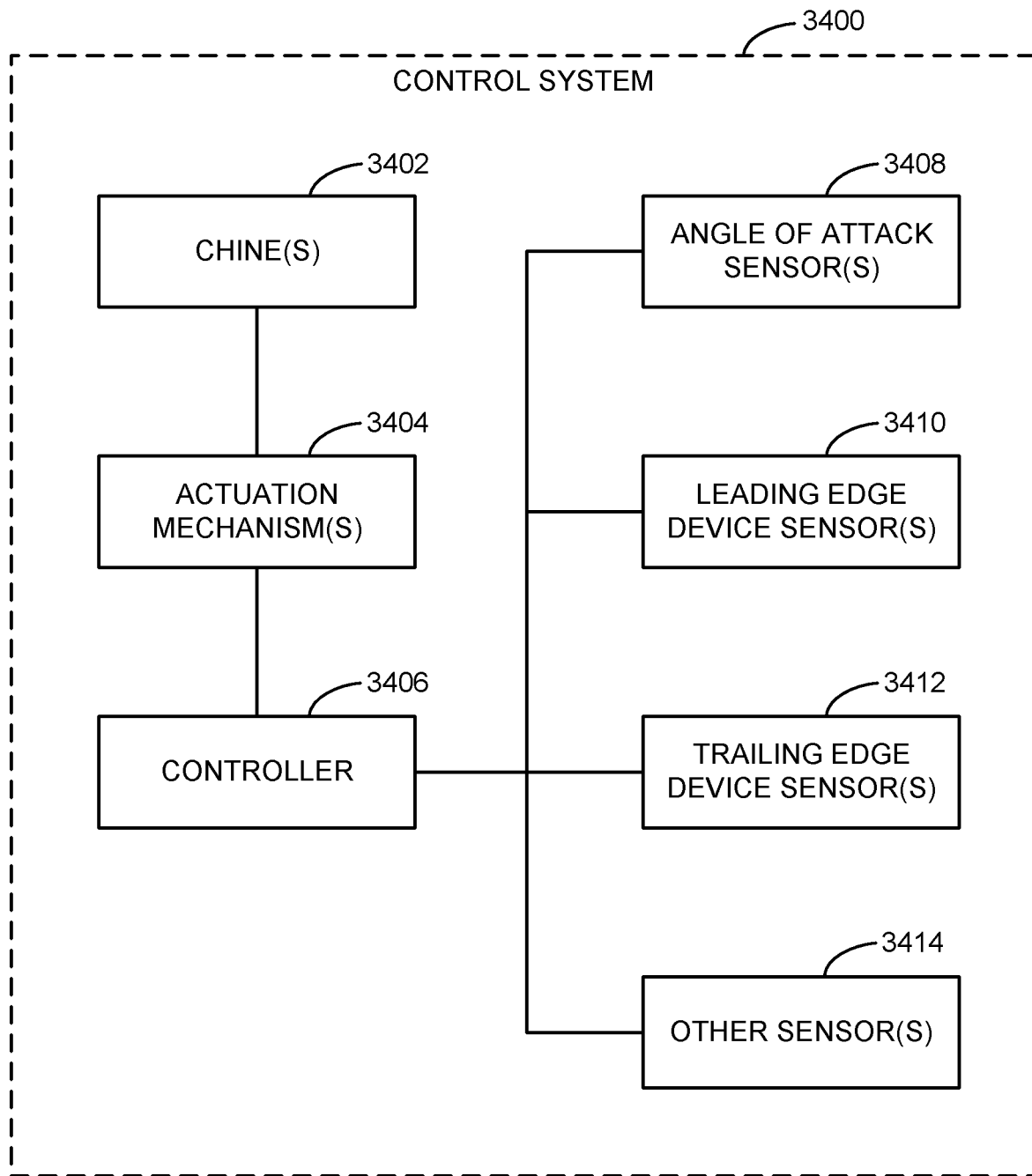
FIG. 34 is a block diagram of an example control system configured to control the movement of an adjustable chine of a nacelle.

FIG. 34 is a block diagram of an example control system 3400 configured to control the movement of an adjustable chine of a nacelle. The control system 3400 of FIG. 34 includes one or more example chine(s) 3402, one or more example actuation mechanism(s) 3404, an example controller 3406, one or more example angle of attack sensor(s) 3408, one or more example leading edge device sensor(s) 3410, and one or more example trailing edge device sensor(s) 3412. The control system 3400 of FIG. 34 can further include one or more other sensor(s) 3414 including, for example, one or more attitude sensor(s), one or more altitude sensor(s), one or more airspeed sensor(s), one or more Mach number sensor(s), etc. In the illustrated example of FIG. 34, the actuation mechanism(s) 3404 is/are operatively coupled to the chine(s) 3402. For example, a first one of the actuation mechanism(s) 3404 can be operatively coupled to a first one of the chine(s) 3402, and a second one of the actuation mechanism(s) 3404 can be operatively coupled to a second one of the chine(s) 3402. The controller 3406 is operatively coupled to the actuation mechanism(s) 3404. For example, the controller 3406 can be operatively coupled to a first one and a second one of the actuation mechanism(s) 3404. The angle of attack sensor(s) 3408, the leading edge device sensor(s) 3410, the trailing edge device sensor(s) 3412, and the other sensor(s) 3414 are respectively operatively coupled to the controller 3406.

The control system 3400 of FIG. 34 can be implemented in the aircraft 100 of FIGS. 1-3. For example, the chine(s) 3402 of the control system 3400 can be implemented by and/or as the first chine 112 coupled to the first nacelle 108 of the aircraft 100 of FIGS. 1-3, and/or by the second chine 114 coupled to the second nacelle 110 of the aircraft 100 of FIGS. 1-3. The actuation mechanism(s) 3404 of the control system 3400 can be located (e.g., partially or fully located) within and/or on the first nacelle 108 and/or the second nacelle 110 of the aircraft 100 of FIGS. 1-3, and may include portions and/or components located within and/or on the first wing 104, the second wing 106, and/or the fuselage 102 of the aircraft 100 of FIGS. 1-3. The controller 3406 of the control system 3400 can be located within and/or on any of the first nacelle 108, the second nacelle 110, the first wing 104, the second wing 106, and/or the fuselage 102 of the aircraft 100 of FIGS. 1-3. The angle of attack sensor(s) 3408 of the control system 3400 can be located within and/or on any of the first nacelle 108, the second nacelle 110, the first wing 104, the second wing 106, and/or the fuselage 102 of the aircraft 100 of FIGS. 1-3. The leading edge device sensor(s) 3410 of the control system 3400 can be located within and/or on one or more of the leading edge device(s) 122 of the first wing 104 and/or one or more of the leading edge device(s) 130 of the second wing 106 of the aircraft 100 of FIGS. 1-3, within and/or on the first wing 104 and/or the second wing 106 of the aircraft 100, or within and/or on the fuselage 102 of the aircraft 100. The trailing edge device sensor(s) 3412 of the control system 3400 can be located within and/or on one or more of the trailing edge device(s) 124 of the first wing 104 and/or one or more of the trailing edge device(s) 132 of the second wing 106 of the aircraft 100 of FIGS. 1-3, within and/or on the first wing 104 and/or the second wing 106 of the aircraft 100, or within and/or on the fuselage 102 of the aircraft 100. The other sensor(s) 3414 of the control system 3400 can be located within and/or on any of the first nacelle 108, the second nacelle 110, the first wing 104, the second wing 106, and/or the fuselage 102 of the aircraft 100 of FIGS. 1-3.

The chine(s) 3402 of the control system 3400 of FIG. 34 can be implemented by and/or as any of the example chines described above in connection with FIGS. 4-30 and, more specifically, by any movable and/or adjustable components of such example chines. For example, the chine(s) 3402 of FIG. 34 can be implemented by and/or as the chine 402 of FIGS. 4 and 5. The chine(s) 3402 of FIG. 34 can alternatively be implemented by and/or as the multi-segment chine 602 of FIGS. 6-10 and, more specifically, by and/or as the first segment 618 and/or the second segment 620 of the multi-segment chine 602 of FIGS. 6-10. The chine(s) 3402 of FIG. 34 can alternatively be implemented by and/or as the chine 1102 of FIGS. 11-13. The chine(s) 3402 of FIG. 34 can alternatively be implemented by and/or as the chine 1402 of FIGS. 14-16. The chine(s) 3402 of FIG. 34 can alternatively be implemented by and/or as the multi-segment chine 1702 of FIGS. 17 and 18 and/or, more specifically, by and/or as the first segment 1718 of the multi-segment chine 1702 of FIGS. 17 and 18. The chine(s) 3402 of FIG. 34 can alternatively be implemented by and/or as the multi-segment chine 1902 of FIGS. 19-21 and/or, more specifically, by and/or as the first segment 1918 of the multi-segment chine 1902 of FIGS. 19-21. The chine(s) 3402 of FIG. 34 can alternatively be implemented by and/or as the multi-segment chine 2202 of FIGS. 22-25 and/or, more specifically, by and/or as the first segment 2214, the second segment 2216, and/or the third segment 2218 of the multi-segment chine 2202 of FIGS. 22-25. The chine(s) 3402 of FIG. 34 can alternatively be implemented by and/or as the first chine 2602 of FIGS. 26 and 27. The chine(s) 3402 of FIG. 34 can alternatively be implemented by and/or as the chine 2802 of FIGS. 28-30. The chine(s) 3402 of FIG. 34 can alternatively be implemented by and/or as the multi-segment chine 3102 of FIGS. 31-33 and/or, more specifically, by and/or as the second segment 3112 of the multi-segment chine 3102 of FIGS. 31-33.

The actuation mechanism(s) 3404 of the control system 3400 of FIG. 34 can be implemented by and/or as any type of actuation mechanism that is capable of being configured to fit partially and/or fully within or on a nacelle to which the chine(s) 3402 of FIG. 34 is/are coupled, and which is capable of being configured to move (e.g., translate and/or rotate) all or part of the chine(s) 3402 of FIG. 34 over a desired and/or specified range of positions. In some examples, the actuation mechanism(s) 3404 of FIG. 34 can be implemented by and/or as an electro-mechanical actuation system that includes one or more electronic component(s). In other examples, the actuation mechanism(s) 3404 of FIG. 34 can be implemented by and/or as a hydro-mechanical actuation system that includes one or more hydraulic component(s). In still other examples, the actuation mechanism(s) 3404 of FIG. 34 can be implemented by and/or as a pneumatic-mechanical actuation system that includes one or more pneumatic component(s). The actuation mechanism(s) 3404 of FIG. 34 can include any number of mechanical components including, for example, any number of motors, valves, latches, pistons, rods, shafts, links, pulleys, chains, belts, hinges, pins, biasing elements, shape memory alloys, etc.

The controller 3406 of the control system 3400 of FIG. 34 can be implemented by and/or as any type of hardware element capable of being configured to control the actuation mechanism(s) 3404 of the control system 3400 of FIG. 34, and/or capable of being configured to receive and/or process data sensed, measured and/or detected by the angle of attack sensor(s) 3408, the leading edge device sensor(s) 3410, the trailing edge device sensor(s) 3412, and/or the other sensor(s) 3414 of the control system 3400 of FIG. 34. The controller 3406 of FIG. 34 can be implemented by one or more controller(s), processor(s), microcontroller(s), microprocessor(s), and/or circuit(s).

The angle of attack sensor(s) 3408 of the control system 3400 of FIG. 34 is/are configured to sense, measure and/or detect the angle of attack of an aircraft wing (e.g., the angle between the chord line of the aircraft wing and the relative direction of airflow against the aircraft wing), or the angle of attack relative to a fuselage of the aircraft 100 (e.g., the angle between the fuselage centerline and the relative direction of airflow against the fuselage). The leading edge device sensor(s) 3410 of the control system 3400 of FIG. 34 is/are configured to sense, measure and/or detect the position and/or angle of one or more leading edge device(s) of an aircraft wing (e.g., the position and/or angle of the leading edge device(s) relative to a reference location and/or orientation of the aircraft wing). The trailing edge device sensor(s) 3412 of the control system 3400 of FIG. 34 is/are configured to sense, measure and/or detect the position and/or angle of one or more trailing edge device(s) of an aircraft wing (e.g., the position and/or angle of the trailing edge device(s) relative to a reference location and/or orientation of the aircraft wing). The other sensor(s) 3414 of the control system 3400 of FIG. 34 is/are configured to sense, measure and/or detect one or more other parameter(s) associated with the aircraft including, for example, an attitude of the aircraft, an altitude of the aircraft, an airspeed of the aircraft, a Mach number of the aircraft, etc.

The chine(s) 3402 of the control system 3400 of FIG. 34, and/or one or more segment(s) of the chine(s) 3402 of the control system 3400 of FIG. 34, can be moved (e.g., translated and/or rotated, depending upon the implementation of the chine(s) 3402) in a controlled manner to any number of positions over a possible range of positions of the chine(s) 3402. The controlled movement (e.g., translation and/or rotation) of the chine(s) 3402 and/or the segment(s) of the chine(s) 3402 occurs via the actuation mechanism(s) 3404 of the control system 3400 of FIG. 34, with the actuation mechanism(s) 3404 being managed and/or controlled via the controller 3406 of the control system 3400 of FIG. 34. The controller 3406 of FIG. 34 generates and/or transmits one or more command(s) that cause(s) the actuation mechanism(s) 3404 of FIG. 34 to move (e.g., translate and/or rotate) the chine(s) 3402 and/or the segment(s) of the chine(s) 3402 of FIG. 34 to one or more position(s) (e.g., a forward position, a rearward position, an upward position, a downward position, a stowed position, a deployed position, an upward-pitched position, a downward-pitched position, any number of intermediate positions over a possible range of positions, etc.) specified by, indicated by, and/or derived from the command(s).

In some examples, the controller 3406 of FIG. 34 is configured to generate a command that causes the actuation mechanism(s) 3404 of FIG. 34 to move the chine(s) 3402 and/or the segment(s) of the chine(s) 3402 of FIG. 34 to a specified position in response to the controller 3406 determining and/or detecting that a threshold parameter associated with an angle of attack has been sensed, measured and/or detected by the angle of attack sensor 3408 of FIG. 34. In some examples, the controller 3406 of FIG. 34 is configured to generate a command that causes the actuation mechanism(s) 3404 of FIG. 34 to move the chine(s) 3402 and/or the segment(s) of the chine(s) 3402 of FIG. 34 to a specified position in response to the controller 3406 determining and/or detecting that a threshold parameter associated with a position and/or an angle of one or more leading edge device(s) has been sensed, measured and/or detected by the leading edge device sensor(s) 3410 of FIG. 34. In some examples, the controller 3406 of FIG. 34 is configured to generate a command that causes the actuation mechanism(s) 3404 of FIG. 34 to move the chine(s) 3402 and/or the segment(s) of the chine(s) 3402 of FIG. 34 to a specified position in response to the controller 3406 determining and/or detecting that a threshold parameter associated with a position and/or an angle of one or more trailing edge device(s) has been sensed, measured and/or detected by the trailing edge device sensor(s) 3412 of FIG. 34. In some examples, the controller 3406 of FIG. 34 is configured to generate a command that causes the actuation mechanism(s) 3404 of FIG. 34 to move the chine(s) 3402 of FIG. 34 to a specified position in response to the controller 3406 determining and/or detecting that one or more threshold parameter(s) associated with an attitude of the aircraft, an altitude of the aircraft, an airspeed of the aircraft, a Mach number of the aircraft, etc. has/have been sensed, measured and/or detected by one or more of the other sensor(s) 3414 of FIG. 34.

From the foregoing, it will be appreciated that the above-disclosed aircraft nacelles having adjustable chines provide advantages over known chine implementations. For example, known chine implementations lack an ability to actively adjust and/or tune (e.g., granularly adjust and/or tune) the position of a vortex generated by the chine during flight, and further provide only near-binary control (e.g., on or off) of the strength of the generated vortex during flight. Unlike the known solutions and/or known chine implementations described above, aircraft nacelles having adjustable chines disclosed herein advantageously provide the ability to actively adjust and/or tune (e.g., granularly adjust and/or tune) the position and/or the strength of a vortex generated by the chine during flight, thereby improving near-stall and post-stall pitch control of the aircraft and increasing the maximum coefficient of lift associated with the wings of the aircraft.

In some examples, an apparatus is disclosed. In some disclosed examples, the apparatus comprises a multi-segment chine rotatably coupled to a nacelle. In some disclosed examples, the multi-segment chine includes at least two segments. In some disclosed examples, the at least two segments include a first segment and a second segment. In some disclosed examples, the first segment and the second segment are independently rotatable relative to the nacelle about an axis of rotation.

In some disclosed examples, the first segment is a leading segment of the multi-segment chine, and the second segment is a trailing segment of the multi-segment chine.

In some disclosed examples, the axis of rotation is substantially parallel to a central axis of the nacelle.

In some disclosed examples, the first segment is rotatable about the axis of rotation between a first deployed position and a first stowed position, and the second segment is rotatable about the axis of rotation between a second deployed position and a second stowed position.

In some disclosed examples, the an outer mold line of the first segment extends along an outer surface of the nacelle when the first segment is in the first stowed position and extends outwardly from the outer surface of the nacelle when the first segment is in the first deployed position. In some disclosed examples, the an outer mold line of the second segment extends along the outer surface of the nacelle when the second segment is in the second stowed position and extends outwardly from the outer surface of the nacelle when the second segment is in the second deployed position.

In some disclosed examples, the first segment is substantially coplanar with the second segment when the first segment is in the first deployed position and the second segment is in the second deployed position.

In some disclosed examples, the first segment is substantially coplanar with the second segment when the first segment is in the first stowed position and the second segment is in the second stowed position.

In some disclosed examples, the multi-segment chine is configured to generate a first vortex when the first segment is in the first deployed position and the second segment is in the second deployed position. In some disclosed examples, the multi-segment chine is further configured to generate a second vortex when the first segment is in the first stowed position and the second segment is in the second deployed position. In some disclosed examples, the second vortex differs from the first vortex.

In some disclosed examples, the apparatus further comprises an actuation mechanism operatively coupled to at least one of the first or second segments. In some disclosed examples, the actuation mechanism is configured to rotate the at least one of the first or second segments about the axis of rotation. In some disclosed examples, the apparatus further comprises a controller operatively coupled to the actuation mechanism. In some disclosed examples, the controller is configured to control the actuation mechanism.

In some disclosed examples, the controller is configured to command the actuation mechanism to rotate the at least one of the first or second segments in response to the controller detecting at least one of a first threshold parameter associated with an angle of attack of an aircraft to which the nacelle is coupled, a second threshold parameter associated with a leading edge device of a wing of the aircraft, a third threshold parameter associated with a trailing edge device of the wing, a fourth threshold parameter associated with an attitude of the aircraft, a fifth threshold parameter associated with an altitude of the aircraft, a sixth threshold parameter associated with an airspeed of the aircraft, or a seventh threshold parameter associated with a Mach number of the aircraft.

In some examples, a method is disclosed. In some disclosed examples, the method comprises rotating a first segment of a multi-segment chine. In some disclosed examples, the multi-segment chine is rotatably coupled to a nacelle. In some disclosed examples, the multi-segment chine has at least two segments including the first segment and a second segment. In some disclosed examples, the method further comprises rotating the second segment of the multi-segment chine. In some disclosed examples, the first and second segments are independently rotatable relative to the nacelle about an axis of rotation.

In some disclosed examples, the first segment is a leading segment of the multi-segment chine, and the second segment is a trailing segment of the multi-segment chine.

In some disclosed examples, the axis of rotation is substantially parallel to a central axis of the nacelle.

In some disclosed examples, the first segment is rotatable about the axis of rotation between a first deployed position and a first stowed position, and the second segment is rotatable about the axis of rotation between a second deployed position and a second stowed position.

In some disclosed examples, an outer mold line of the first segment extends along an outer surface of the nacelle when the first segment is in the first stowed position and extends outwardly from the outer surface of the nacelle when the first segment is in the first deployed position. In some disclosed examples, an outer mold line of the second segment extends along the outer surface of the nacelle when the second segment is in the second stowed position and extends outwardly from the outer surface of the nacelle when the second segment is in the second deployed position.

In some disclosed examples, the first segment is substantially coplanar with the second segment when the first segment is in the first deployed position and the second segment is in the second deployed position.

In some disclosed examples, the first segment is substantially coplanar with the second segment when the first segment is in the first stowed position and the second segment is in the second stowed position.

In some disclosed examples, the method comprises generating a first vortex via the multi-segment chine when the first segment is in the first deployed position and the second segment is in the second deployed position. In some disclosed examples, the method further comprises generating a second vortex via the multi-segment chine when the first segment is in the first stowed position and the second segment is in the second deployed position. In some disclosed examples, the second vortex differs from the first vortex.

In some disclosed examples, the method further comprises controlling an actuation mechanism via a controller operatively coupled to the actuation mechanism. In some disclosed examples, the actuation mechanism is operatively coupled to at least one of the first or second segments. In some disclosed examples, the actuation mechanism is configured to rotate the at least one of the first or second segments about the axis of rotation.

In some disclosed examples, controlling the actuation mechanism includes commanding the actuation mechanism, via the controller, to rotate the at least one of the first or second segments in response to the controller detecting at least one of a first threshold parameter associated with an angle of attack of an aircraft to which the nacelle is coupled, a second threshold parameter associated with a leading edge device of a wing of the aircraft, a third threshold parameter associated with a trailing edge device of the wing, a fourth threshold parameter associated with an attitude of the aircraft, a fifth threshold parameter associated with an altitude of the aircraft, a sixth threshold parameter associated with an airspeed of the aircraft, or a seventh threshold parameter associated with a Mach number of the aircraft.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus, comprising:
a nacelle of an aircraft engine; and
a multi-segment chine including at least two segments rotatablycoupled to and located on the nacelle, the at least two segments including a first segment and a second segment, the first segment and the second segment independently rotatable relative to the nacelle about an axis of rotation; and
a controller configured to position the first segment at a first angle while the second segment is positioned at a second angle different from the first angle.

2. The apparatus of claim 1, wherein the first segment is a leading segment of the multi-segment chine, and the second segment is a trailing segment of the multi-segment chine.

3. The apparatus of claim 1, wherein the axis of rotation is substantially parallel to a central axis of the nacelle.

4. The apparatus of claim 1, wherein the first segment is rotatable about the axis of rotation between a first deployed position and a first stowed position, and the second segment is rotatable about the axis of rotation between a second deployed position and a second stowed position.

5. The apparatus of claim 4, wherein an outer mold line of the first segment extends along an outer surface of the nacelle when the first segment is in the first stowed position and extends outwardly from the outer surface of the nacelle when the first segment is in the first deployed position, and wherein an outer mold line of the second segment extends along the outer surface of the nacelle when the second segment is in the second stowed position and extends outwardly from the outer surface of the nacelle when the second segment is in the second deployed position.

6. The apparatus of claim 4, wherein the first segment is substantially coplanar with the second segment when the first segment is in the first deployed position and the second segment is in the second deployed position.

7. The apparatus of claim 4, wherein the first segment is substantially coplanar with the second segment when the first segment is in the first stowed position and the second segment is in the second stowed position.

8. The apparatus of claim 4, wherein, in response to an airflow presented at the multi-segment chine, the multi-segment chine is configured to:
generate a first vortex when the first segment is in the first deployed position and the second segment is in the second deployed position; and
generate a second vortex when the first segment is in the first stowed position and the second segment is in the second deployed position, the second vortex differing from the first vortex.

9. The apparatus of claim 1, further comprising:
an actuation mechanism operatively coupled to at least one of the first or second segments, the actuation mechanism configured to rotate the at least one of the first or second segments about the axis of rotation,
wherein the controller is operatively coupled to the actuation mechanism, the controller configured to control the actuation mechanism.

10. The apparatus of claim 9, wherein the controller is configured to command the actuation mechanism to rotate the at least one of the first or second segments in response to the controller detecting at least one of a first threshold parameter associated with an angle of attack of an aircraft to which the nacelle is coupled, a second threshold parameter associated with a leading edge device of a wing of the aircraft, a third threshold parameter associated with a trailing edge device of the wing, a fourth threshold parameter associated with an attitude of the aircraft, a fifth threshold parameter associated with an altitude of the aircraft, a sixth threshold parameter associated with an airspeed of the aircraft, or a seventh threshold parameter associated with a Mach number of the aircraft.

11. The apparatus of claim 1, wherein the multi-segment chine is located on the nacelle inboard of a central axis of the nacelle.

12. The apparatus of claim 1, further comprising a wing, wherein the nacelle is coupled to the wing via a pylon extending downward from the wing, and wherein a leading edge of the nacelle and a leading edge of the first segment are located forward of and below a leading edge of the wing.

13. A method, comprising:
rotating a first segment of a multi-segment chine to a first angle, the multi-segment chine including at least two segments rotatably coupled to and located on a nacelle of an aircraft engine, the at least two segments including the first segment and a second segment, the first and second segments independently rotatable relative to the nacelle about an axis of rotation; and
rotating the second segment of the multi-segment chine to a second angle different than the first angle while the first segment remains at the first angle.

14. The method of claim 13, wherein the first segment is a leading segment of the multi-segment chine, and the second segment is a trailing segment of the multi-segment chine.

15. The method of claim 13, wherein the axis of rotation is substantially parallel to a central axis of the nacelle.

16. The method of claim 13, wherein the first segment is rotatable about the axis of rotation between a first deployed position and a first stowed position, and the second segment is rotatable about the axis of rotation between a second deployed position and a second stowed position.

17. The method of claim 16, wherein an outer mold line of the first segment extends along an outer surface of the nacelle when the first segment is in the first stowed position and extends outwardly from the outer surface of the nacelle when the first segment is in the first deployed position, and wherein an outer mold line of the second segment extends along the outer surface of the nacelle when the second segment is in the second stowed position and extends outwardly from the outer surface of the nacelle when the second segment is in the second deployed position.

18. The method of claim 16, wherein the first segment is substantially coplanar with the second segment when the first segment is in the first deployed position and the second segment is in the second deployed position.

19. The method of claim 16, wherein the first segment is substantially coplanar with the second segment when the first segment is in the first stowed position and the second segment is in the second stowed position.

20. The method of claim 16, further comprising, in response to an airflow presented at the multi-segment chine:

generating a first vortex via the multi-segment chine when the first segment is in the first deployed position and the second segment is in the second deployed position; and generating a second vortex via the multi-segment chine when the first segment is in the first stowed position and the second segment is in the second deployed position, the second vortex differing from the first vortex.

21. The method of claim 13, further comprising:

controlling an actuation mechanism via a controller operatively coupled to the actuation mechanism, the actuation mechanism operatively coupled to at least one of the first or second segments, the actuation mechanism configured to rotate the at least one of the first or second segments about the axis of rotation.

22. The method of claim 21, wherein controlling the actuation mechanism includes commanding the actuation mechanism, via the controller, to rotate the at least one of the first or second segments in response to the controller detecting at least one of a first threshold parameter associated with an angle of attack of an aircraft to which the nacelle is coupled, a second threshold parameter associated with a leading edge device of a wing of the aircraft, a third threshold parameter associated with a trailing edge device of the wing, a fourth threshold parameter associated with an attitude of the aircraft, a fifth threshold parameter associated with an altitude of the aircraft, a sixth threshold parameter associated with an airspeed of the aircraft, or a seventh threshold parameter associated with a Mach number of the aircraft.

* * * * *